United States Patent [19]
Hall et al.

[11] 4,159,521
[45] Jun. 26, 1979

[54] DIGITAL SCALE WITH ANTIFRAUD FEATURES

[75] Inventors: Donivan L. Hall, Worthington; Edward G. Pryor, Westerville, both of Ohio

[73] Assignee: Reliance Electric Company, Cleveland, Ohio

[21] Appl. No.: 729,911

[22] Filed: Oct. 5, 1976

[51] Int. Cl.² .......................... G01G 23/36; G06F 9/16
[52] U.S. Cl. ...................................... 364/466; 177/25; 364/567
[58] Field of Search .................... 364/466, 567; 177/3, 177/6, 25

[56] References Cited
U.S. PATENT DOCUMENTS

| | | | |
|---|---|---|---|
| 3,608,655 | 9/1971 | Ray et al. .................... | 177/DIG. 3 |
| 3,740,536 | 6/1973 | Takahashi et al. .............. | 235/151.33 |
| 3,851,151 | 11/1974 | Stambera et al. ............... | 177/26 |
| 3,861,479 | 1/1975 | Pryor ......................... | 177/25 |
| 3,869,004 | 3/1975 | Gallo .......................... | 177/25 |
| 3,962,569 | 6/1976 | Loshbough et al. ............. | 235/151.33 |
| 3,984,667 | 10/1976 | Loshbough ..................... | 235/151.33 |
| 4,055,748 | 10/1977 | Boshinski et al. ............... | 364/466 |
| 4,055,753 | 10/1977 | Rogers et al. .................. | 364/466 |

*Primary Examiner*—Felix D. Gruber

[57] ABSTRACT

Improved electronic apparatus for weighing and computing the value from the weight and price per unit weight, for each of a plurality of successive weighing operations. An integrated circuit microcomputer is supplied with the article weight from a load cell and an analog-to-digital converter. The price per unit weight is supplied from a manual keyboard. The microcomputer includes as an arithmetic logic unit, data registers and sequence controller which is programmed to correct for scale errors, to check for no motion of the scale, to compensate the measured gross weight for any tare weight, to check various interlocks, and to compute an article value for each successive weighing. Null or zeroing and tare interlocks, checks, and safeguards are provided to reduce the possibility of fraud.

30 Claims, 21 Drawing Figures

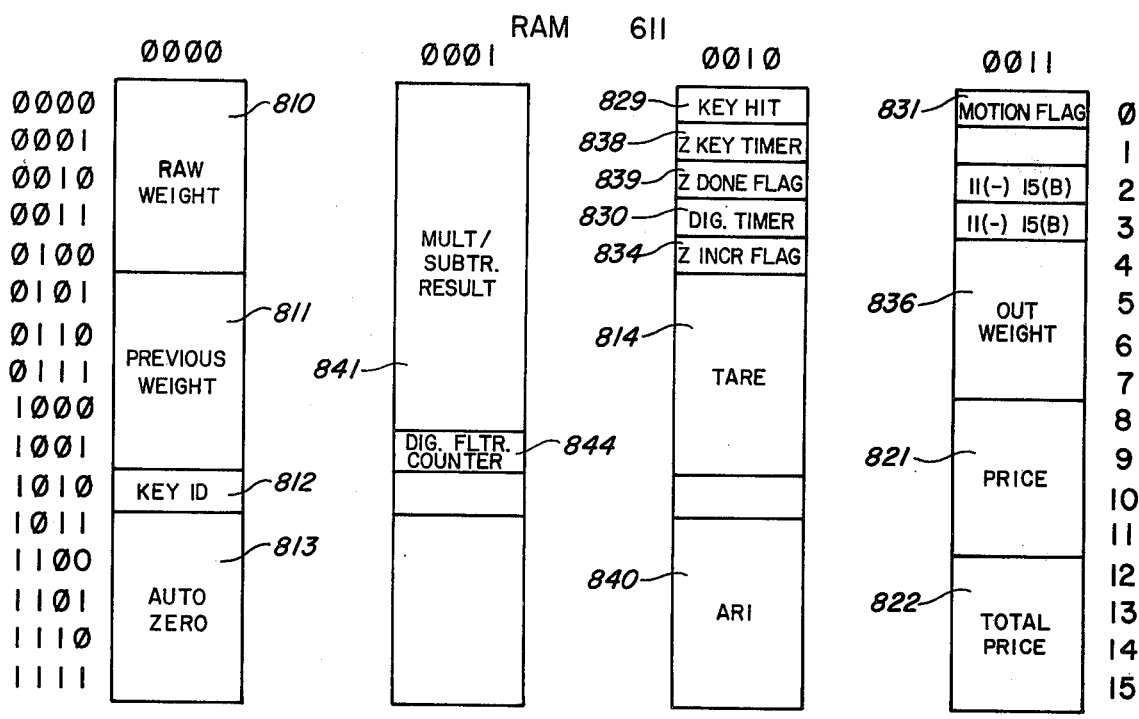
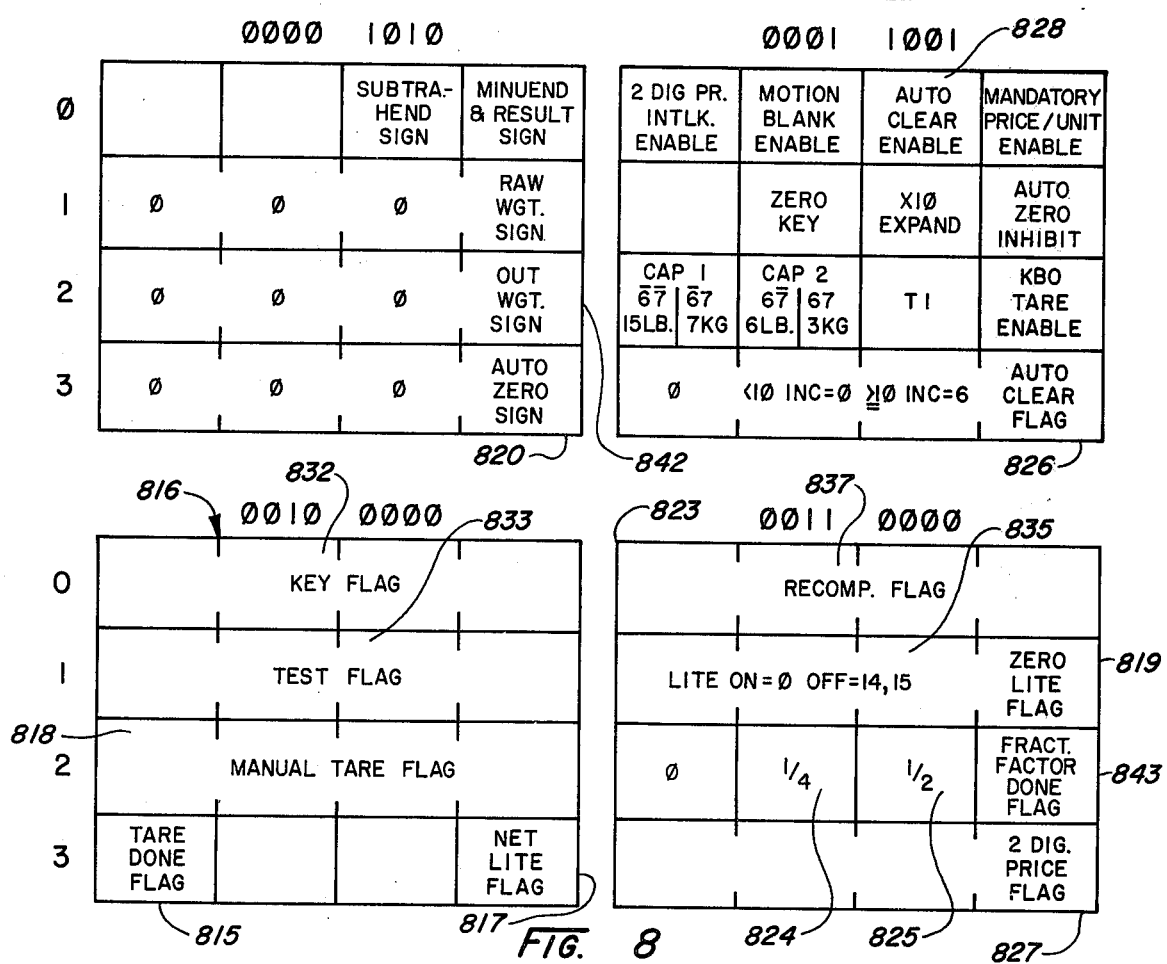
FIG. 8

DIGITAL SCALE WITH ANTIFRAUD FEATURES

REFERENCE TO BACKGROUND PATENT APPLICATIONS AND PATENTS

U.S. patent application Ser. No. 573,149 filed Apr. 30, 1975, by R. C. Loshbough et al and entitled "Digital Weight Measuring and Computing Apparatus With Automatic Zero Correction", U.S. Pat. No. 3,986,012 issued Oct. 12, 1976, discloses an arrangement for automatic zero correction similar to the automatic zero correction arrangement described herein. U.S. patent application Ser. No. 573,242 filed Apr. 30, 1975, by R. C. Loshbough, entitled "Motion Detecting Scale" U.S. Pat. No. 3,984,667 issued Oct. 5, 1976 discloses a motion detecting arrangement similar to motion detecting arrangement described herein. U.S. patent application Ser. No. 573,147 filed Apr. 30, 1975, by R. C. Loshbough et al entitled "Value Computing Scale" U.S. Pat. No. 3,962,569 issued June 8, 1976 discloses an arrangement for interconnecting a microcomputer with a scale and an analog-to-digital converting means similar to the arrangement described herein. U.S. Pat. No. 3,847,238 granted to D. L. Hall and W. E. Kopper for "Weighing Scale With Restrictive Vertical Movement" on Nov. 12, 1974, and divisional Pat. Nos. 3,891,041 granted June 24, 1975, and 3,894,593 granted July 15, 1975, discloses a weighing scale arrangement with a flexure link movement similar to the scale arrangement employed in the exemplary embodiment of the present invention described herein. The disclosure of the above identified patents are incorporated herein by reference.

BACKGROUND OF THE INVENTION

This invention relates to an improved weight measuring and value computing scale arrangement with a digital output display. In recent years the demand for increased efficiency has created a need for high speed measuring apparatus capable of automatically weighing successive articles and for each weighed article, computing the value based upon a predetermined price per unit weight, and displaying the weight and computed value. In scales of this type, as well as in other scales, it is frequently desirable to null or zero the scale before making a weight measurement, so that the measurement may be accurately made. In addition, sometimes it is desirable to enter a tare weight either from a keyboard or manually by placing an empty container on the scale and then entering the weight of the container as the tare weight in the scale so that the net weight of an article or material may be accurately and automatically displayed, and the net weight employed in computing the total value of the weighed material. However, such arrangements in the past have been subject to abuse and manipulation by the operator, thus permitting a customer to be defrauded. As a result, the weights and measures authorities have prohibited such zeroing or nulling operations and have greatly restricted the use of such desirable features.

SUMMARY OF THE INVENTION

In accordance with the present invention an improved method and apparatus are provided for the zeroing or nulling of the scale and for the entry of tare values and at the same time providing various interlocks which prevent the manipulation of these features without the customer becoming aware of such manipulations and thus prevent or reduce the possibility of fraud, either overt or inadvertent, so that these features may be provided with approval of weights and measures authorities.

A "Z" key or button is provided for zeroing or nulling the scale which key must be operated for a predetermined interval of time after power is applied to the scale. By requiring the button to be operated for a predetermined period of time the customer can become aware of the fact that such an operation is taking place. In addition, the scale platter or platform must be at rest during this entire time interval in order for the null or zero operation to be completed, thus preventing the operator from manipulating the scale during the time the Z button is depressed.

Without the operation of the Z button, every time power is applied to the scale, and after every brief interruption of power it is impossible to enter unit price in the scale and thus the scale will not compute a value. Moreover an additional interlock feature is provided which, when employed, prevents the display of the weight above a predetermined small amount if unit price is not entered in the scale. Thus, by employing these two features it is impossible for the scale to be properly used without a performing of both the zero or null operation and the entering of a unit price in the scale.

Other checks and interlocks include requiring the scale to display zero or non-negative values of weight less than a predetermined amount when the tare is being entered and to prevent performance of other tare or zero operations if tare has been entered by either one of the tare arrangements.

In addition, a verification arrangement is provided for verifying that all of the display elements are operating properly. A further safeguard is provided in the event of power failure requiring that the scale be nulled or zeroed after each such failure and the null or zero operation requires a predetermined minimum time interval clearly observable and recognized by any customer in a retail transaction.

In addition, a lb. or kg lamp is provided. When lighted it indicates no motion of the scale. A net lamp is provided to indicate when the weight indicated is the net weight. A zero lamp is also provided to indicate when the weight is within a $\pm\frac{1}{4}$ increment of zero.

Provision is made for readily changing the scale from measuring weight in pounds to measuring weight in kilograms. In order to condition the computer for operation with the different scale capacities, switches located under the scale cover must be set in accordance with the scale capacity. These switches, in combination with a factor table stored in the computer, conditions the computer to multiply the output of the analog-to-digital converter to obtain the correct weight.

In accordance with another feature of this invention it is necessary for the zero operation to be performed and the scale on zero and the scale platter at rest before tare weight can be entered from the keyboard provided for entering tare weight. Thus the operator is effectively prevented from manipulating the scale to first enter a proper tare weight and then cause this tare to be improperly changed. Once the tare weight is entered by the keyboard the keyboard is ineffective to enter another tare weight without a weighing operation being performed or without the previous tare weight being removed by the keyboard, and then a new tare weight entered, all of which operations are very obvious to a customer.

An additional provision has been made for manually entering a tare weight by placing an empty container on the scale platform and then operating the tare key. At this time the platform must be at rest and not in motion. In addition, when tare is entered by either the keyboard or manually, as described above, it cannot be entered or altered by the other type of operation for entering tare weight.

In addition, a zero lamp is provided to indicate that the zero operation has been performed and that the scale is at zero before beginning a weighing operation.

A net lamp is provided to indicate that tare has been entered when it has been entered, thus indicating that the weight displayed will be the net weight and not the gross weight on the scale. If no tare has been entered, then the net lamp will not light so that the scale indicates that the displayed weight will be the gross weight. In addition, another lamp is provided which is designated either pounds or kilograms, and when lighted indicates that the scale platform or platter is at rest and not in motion.

A further extension of the invention is directed to a verification key which is employed to verify that the display lamps and segments are all operating. The first operation of this key causes all of the lamps to be extinguished, thus indicating that none of them are permanently lighted. The second operation of the key then causes all of the lamps and signals to be lighted to indicate that none of them are burned out or inoperative.

A further extension of the invention relates to arrangement for calculating a scale or weight factor which may be changed to convert the scale from weighing and displaying the weight in pounds to displaying the weight in kilograms.

Provision has also been made for preventing resetting of the tare if the output weight indication from the scale is greater than a predetermined number of increments thus preventing manipulation of any tare operations after the weighing operation has started.

The means, apparatus, and structure, by which the above novel improvements, in accordance with the present invention, are achieved in the exemplary embodiment described herein, comprises various registers, counters, timers, flags, storage spaces, together with specific routines for the control of the respective apparatus or means by the central controlled unit. In addition, numerous switches, lamps and display devices cooperate with the central control unit and the various storage spaces, counters, timers, etc., which apparatus comprises input and output means for the system.

BRIEF DESCRIPTION OF THE DRAWINGS

FIG. 7 shows the manner in which FIGS. 2-6 are arranged adjacent to one another.

FIG. 8 shows the space assignments in the memory of the exemplary embodiment described in the application.

GENERAL DESCRIPTION

Figure 1:
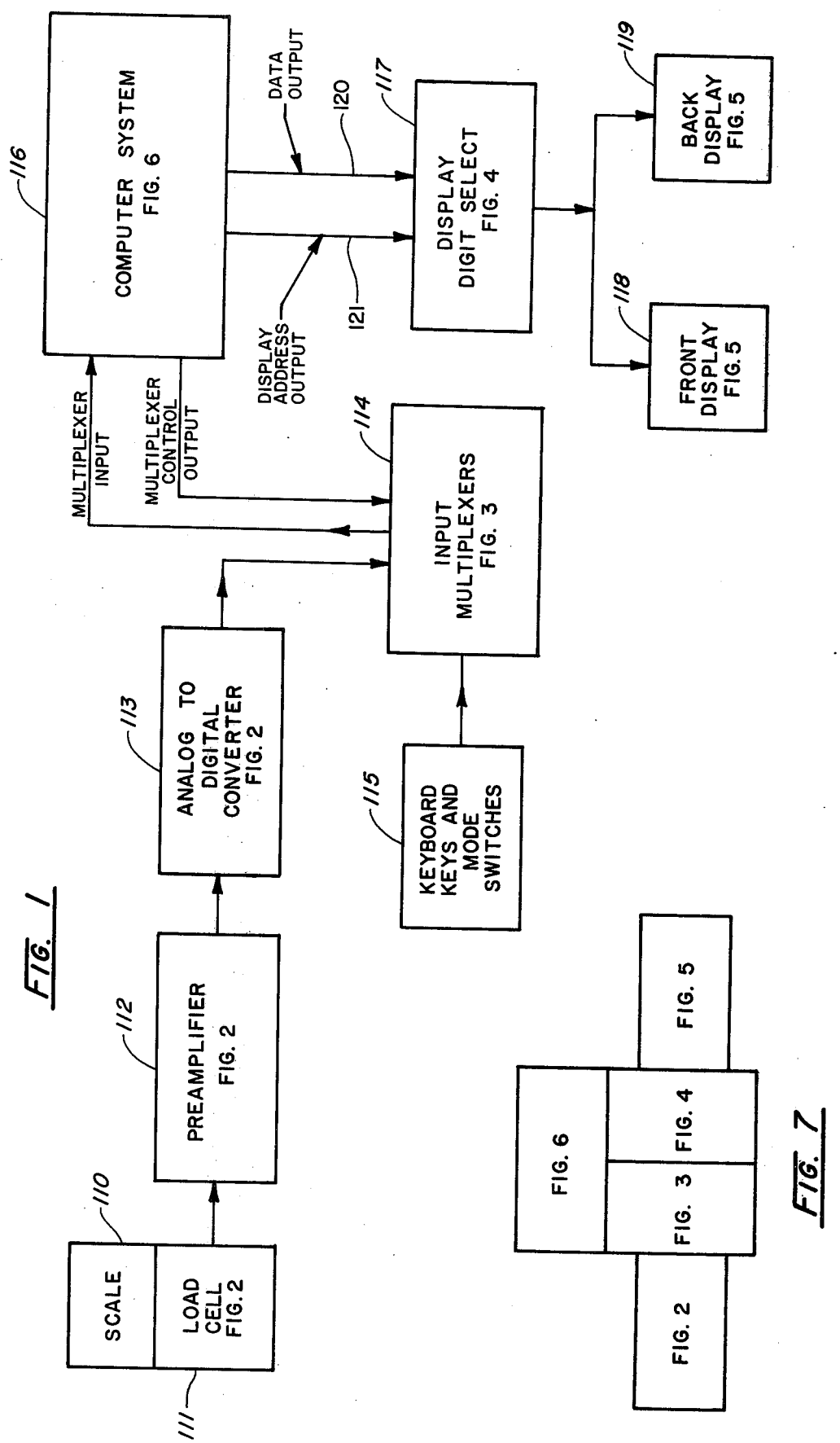
FIG. 1 is a schematic block diagram of the various elements of the improved scale embodying the present invention and the manner in which these various elements are interconnected.

FIG. 1 shows in outline form the various components of an exemplary weighing system embodying the present invention.

As shown in FIG. 1, a scale mechanism 110 is provided which employs a load cell 111 in combination with a strain gage to develop an analog output voltage which represents the weight upon the scale 110. A typical scale mechanism suitable for cooperating with the exemplary embodiment of the invention described herein is shown in U.S. Pat. No. 3,847,238 granted to D. L. Hall et al on Nov. 12, 1974.

The output from the load cell is then applied to the preamplifier 112. The output of the preamplifier 112 then controls the output of the analog-to-digital converter 113 which translates or converts the amplified analog voltage representing the weight on the scale into a plurality of digital signals. These digital signals are in the form of binary coded decimal digital signals.

These digital signals are then transmitted through the input multiplexers 114 to the computer 116. In addition, a plurality of keyboard keys and mode switches 115 are also interconnected through the input multiplexers 114 to the digital computer 116.

In an exemplary embodiment of the invention, the control unit or digital computer 116 may be any suitable type commercially available. In the exemplary embodiment described herein, this control unit or digital computer comprises a Model MCS-4 microcomputer manufactured by Intel Corporation of Santa Clara, Calif. Such a microcomputer, as is employed in the exemplary embodiment of the present invention described herein, includes a central processing unit, a random access memory and five read only memories. For example, the central processing unit is an Intel type 4004 integrated circuit, the random access memory (RAM) is an Intel type 4002 integrated circuit and the read only memories (ROM's) are Intel type 4001 integrated circuits. However, other commercially available integrated circuit microcomputers or other types of commercially available computers will operate equally well in combination with the other elements of the exemplary embodiment of the present invention.

The output from the control unit or computer 116 is employed to control the display digit selector 117 which in turn controls the front display unit 118 and the rear display unit 119. The control from the computer 116 comprises a set of leads 121 for selecting the particular display digit the value of which is transmitted over a second group of conductors or leads 120.

The keyboard and mode switches 115 comprise a set of keyboard push buttons or switches and a set of mode switches. The keyboard switches are employed to enter the unit price and the tare weight. In addition, a manual zero key is provided as well as a tare key and a verify key. The verify key is employed to verify that all of the elements of the display are functioning properly. The mode switches are provided to control the mode of operation of the scale. These switches are under the scale cover and thus not normally available to the vendor operating the scale. Instead, they are set at the time of installation of the scale to provide the proper mode of operation desired. They are also provided to check the operation during servicing and adjusting of the scale.

The displays are arranged to display the weight, the unit price and the total price of a commodity or article being weighed on the scale.

In view of the contemplated conversions from English measuring units to the metric system, it is desirable to have scales that can be readily converted to measuring kilograms from pounds so that when the conversion becomes official it is relatively simple to change the scale weight measurements from pounds to kilograms or perhaps conversely if the conversion does not take place in all items at the same time.

Accordingly, the scale in accordance with the exemplary embodiment described herein is arranged to provide for four different capacities as follows:

15 lb.×0.01 lb.
7 kg ×5 g
6 lb.×0.005 lb.
3 kg×2 g

In order to provide these four different capacities one or the other of two different load cells are used. One for the scale having the 15 lb. or 7 kg capacity and the other load cell for scales having a 6 lb. or 3 kg capacity. However, the same computer arrangement is provided and this is conditioned by two mode or capacity switches as described herein. Thus, it is necessary for the computer to determine the setting of the switches and then modify or multiply the raw weight obtained from the analog-to-digital converter by proper factors so that the analog-to-digital converter may be adjusted so the proper weight will be displayed.

The smallest weight unit received by the computer 116 from the analog-to-digital converter is called a count herein. The smallest weight unit displayed is called an increment herein.

DETAILED DESCRIPTION

FIGS. 2 through 6 inclusive when arranged as shown in FIG. 7 show the various component circuits in greater detail and the manner in which these various circuits are interconnected one with another.

Figure 2:
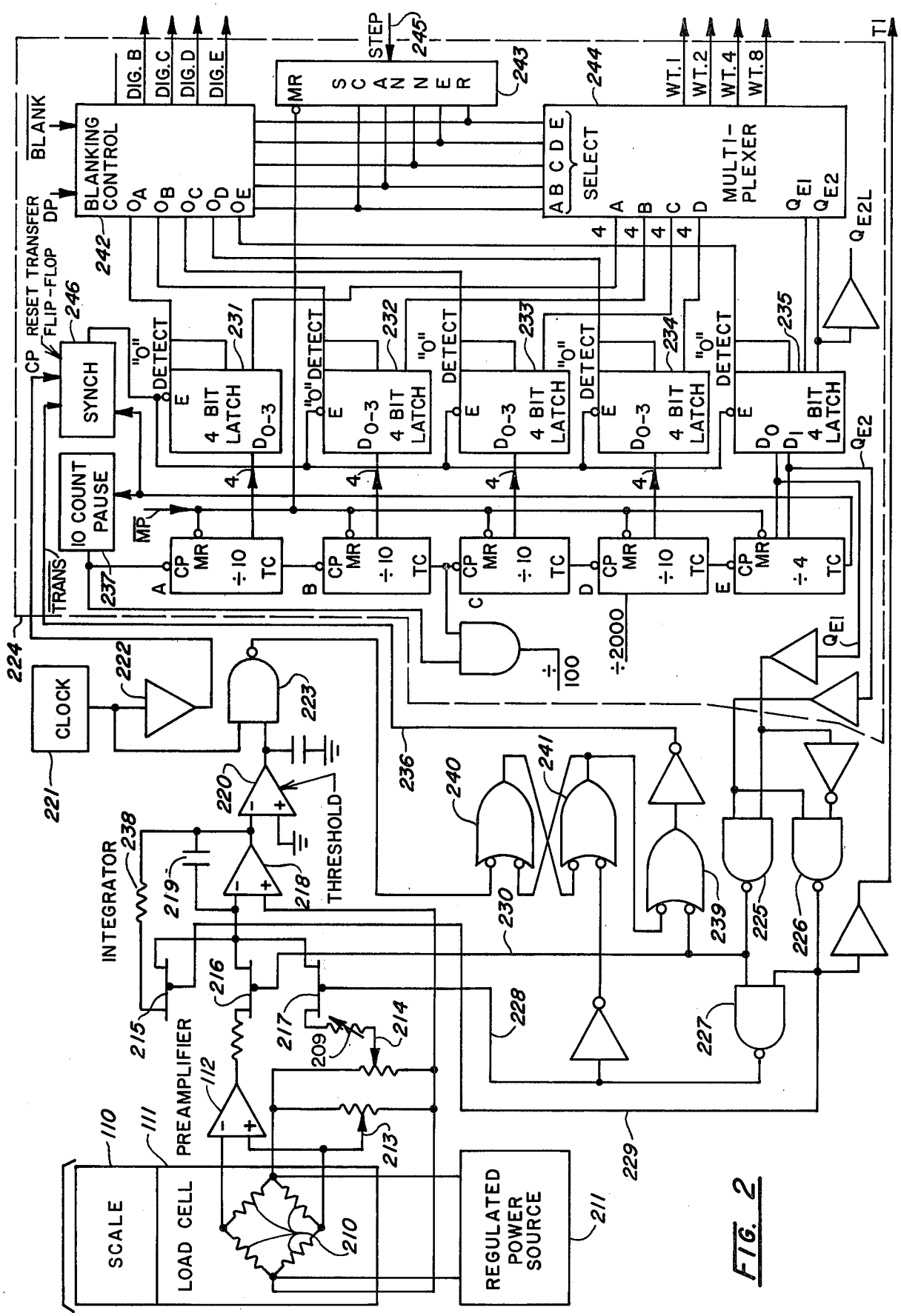
FIG. 2 shows the scale, load cell, preamplifier and digital converter employed in combination with the other elements of the exemplary embodiment described herein, incorporating applicants' improved invention.

FIG. 2 shows scale 110 and load cell 111 together with the strain gages 210 which are mounted on the load cell. These strain gages are connected in a conventional bridge circuit arrangement. Regulated power from regulated power source 211 is connected across one pair of opposite terminals of the bridge and the output of the load cell is connected across the other pair of opposite terminals of the bridge to preamplifier 112. An analog zero adjustment is provided by means of potentiometer 213 which applies a small voltage to the input of the preamplifier 112 to adjust the zero output of the amplifier.

An integrating circuit comprising an operational amplifier 218 and capacitor 219 is provided with three different inputs controlled by the three field effect transistors 215, 216, and 217. These transistors are in turn controlled by voltages on conductors 229, 230, and 228 which voltages are obtained from NAND circuits 225, 226, and 227, which circuits are in turn controlled by the fifth stage counter of integrated circuit 224. The integrated circuit 224 is a commercially available MOS integrated circuit No. 3814 manufactured by the Fairchild Corporation. This integrated circuit comprises a five-stage counter, the stages of which are designated A, B, C, D, and E. The first four stages A, B, C, and D are full decade counters which effectively divide by ten and thus will count to 10,000. The output of each of these stages may thus represent four binary coded decimal digits. The fifth stage of the counter effectively divides by four so that the five stages count 40,000 clock pulses and return to zero.

In the exemplary embodiment described herein, the states of the two outputs of the fifth counter stage E are as follows:

| Count | $Q_{E1}$ | $Q_{E2}$ |
|---|---|---|
| 00,000 to 09,999 | 1 | 1 |
| 10,000 to 19,999 | 0 | 0 |
| 20,000 to 29,999 | 1 | 0 |
| 30,000 to 39,999 | 0 | 1 |

During the third count to 10,000 by counter stages A, B, C, D, and E a low "turn on" voltage is applied to conductor 229 which turns on the field effect transistor 215.

During the fourth count of 10,000 by the stages A, B, C, D, and E a low voltage is applied to conductor 230 which causes the field effect transistor 216 to be turned on. At the end of the count of 40,000 (i.e. 00,000 to 39,999) by the counter stages A, B, C, D, and E, the fifth counter stage E will return to its initial state thus resetting the entire counter to zero. A 10 count circuit 237 is provided in the integrated circuit 224 to permit time for switching so that switching transients do not adversely effect the operation of the integrated circuit 224.

In operation, the counters of the integrated circuit 224 count clock pulses from the clock circuit 221, which pulses are amplified by amplifier 222. The clock 221 runs continuously as do the counters of the integrated circuit 224.

The technique of analog-to-digital conversion employed by the exemplary embodiment utilizes the Dual Slope Integration method which involves integrating an unknown current directly related to the unknown voltage for a fixed period of time, followed by the integration of a standard current until the integrator output returns to zero.

In order to more readily understand the operation of the analog-to-digital converter comprising the integrating circuit 218 and 219 and the threshold circuit 220, it is more convenient to start the description during the third count to 10,000 (i.e. 20,000 to 29,999 counts) of the counter stages A, B, C, D, and E. As pointed out above, during this third count to 10,000 a "turn on" low voltage is applied to conductor 229 to turn on the transistor 215. The transistor 215 connects resistor 238 around the integrating capacitor 219 thus discharging this capacitor.

Then during the next or fourth count of 10,000 (i.e. 30,000 to 39,999 counts) by the counter stages A through E inclusive, a "turn off" voltage is applied to conductor 229 to turn off the field effect transistor 215 and a low "turn on" voltage is applied to conductor 230 turning on the field effect transistor 216. The low "turn on" voltage on conductor 230 is obtained from the NAND gate 225 because at this time the two outputs $Q_{E1}$ and $Q_{E2}$ of the fifth counter stage E will be in their one state or high logic level thus activating this NAND gate to apply a low "turn on" voltage to the conductor 230. The low voltage on conductor 230 at this time prevents an output from the NAND circuit 239 as discussed more fully below.

With the field effect transistor 216 turned on, the integrating circuit and in particular capacitor 219 is charged to a voltage which is a function of the charging time and the voltage of the output of the preamplifier 112. The charging time of this capacitor 219 is a fixed or constant time which is determined by the time required for the counter stages A through E inclusive to count 10,000 clock pulses. Thus the voltage or charge on capacitor 219 is now a function of the load on the scale 110. In addition, the counter stages A through E are all set to zero at the end of this fourth count of 10,000 clock pulse. The reset transfer flip-flop 246 is also set to zero so that it will be in condition to respond to the next transfer pulse.

With the output $Q_{E1}$ and $Q_{E2}$ returned to their zero states during the first count of 10,000 (i.e. 00,000 to 09,999) the low or "turn on" voltage on conductor 230 is replaced by the "turn off" voltage so that the field effect transistor 216 is turned off with the result that the capacitor 219 is not charged further at this time from the output of the preamplifier 112. In addition, application of the "turn off" voltage to conductor 230 conditions the gate 239 so that it will respond when a voltage is applied to its upper terminal as more fully described below.

The resetting of the fifth counter stage E causes the application of a "turn off" voltage to conductor 230 which permits a low or "turn on" voltage to be obtained from the NAND circuit 227, which voltage is applied to conductor 228 with result that the field effect transistor 217 is turned on. As a result the integrating capacitor 219 is discharged at a fixed rate by the preset potentiometer 214 and resistor 209, which potentiometer and resistor are used to adjust this rate and thus control a span of the scale output. This potentiometer is located under the scale cover so it can only be adjusted by maintenance or service personnel. This discharge continues during the first of the counts of 10,000 (i.e. 00,000 to 09,999 counts) by the counters A through E and at the end of this time the first stage of the counter E is set to its one state with the result that the low output voltage of NAND circuit 227 is maintained on conductor 228 so that field effect transistor 217 remains conductive and the discharge of the integrating capacitor 219 continued.

When the capacitor 219 is discharged to approximately zero volts during either the first or second count of 10,000 clock pulses, i.e., when the voltage of this capacitor crosses the threshold value of the threshold amplifier circuit 220, the output of this amplifier circuit changes. As a result, when the next clock pulse from clock circuit 221 is applied to the AND circuit 223 an output pulse will be obtained from this circuit and cause the flip-flop comprising the circuit 240 and 241 to change state and apply a signal to the upper terminal of circuit 239.

The output signal of circuit 239 is inverted and applied to the transfer lead 236 of the integrated circuit 224. This circuit is so arranged that upon receipt of the leading edge of this transfer signal, the setting of the counting stages A, B, C, D, and E are transferred substantially simultaneously to the latches 231, 232, 233, and 235. Thus the setting of the latches now represents the weight upon the scale 110. The transfer signal may take place any time during the first and second counts of the counter stages A through E inclusive of 10,000.

At the end of the second count to 10,000 of the counter stages A through E inclusive, a "turn off" voltage will be applied to conductor 228 thus turning off the field effect transistor 217.

In addition, a "turn on" voltage will be again applied to the conductor 229 thus turning on the field effect transistor 215 which, as described above, causes the integrating capacitor 219 to be discharged. In addition, a voltage representing a one signal is applied to the T1 conductor extending to the multiplexing interface units between the analog-to-digital converter of FIG. 2 of the computer of FIG. 6. This voltage is maintained on the T1 conductor during the time it is required for the counter stages A through E to count 10,000 clock pulses from the clock circuit 221. Voltage on this conductor T1 indicates that a bona fide conversion representing the weight on the scale in digital form is available from the five, 4-bit latches 231, 232, 233, 234, and 235. During this time the computer through the interface circuits described hereinafter causes the various digits representing the weight to be transferred from the latches 231 and 235 to the registers within the computer as will be described hereinafter. The value of each of the decimal digits is represented by binary code and transmitted over four conductors to the multiplexing unit.

The blanking control circuit 242, the scanner circuit 243 and the multiplexer 244 all cooperate with each other and with the five 4-bit latches 231, 232, 233, 234 and 235 so that when a zero signal is on the digit B, digit C, digit D, and digit E conductors, the conditions of the four bit latch 231 will be transmitted by the multiplexer 244 to the WT1, WT2, WT4 and WT8 output conductors. Thereafter, when a step signal or pulse is received over conductor 245 by the scanner circuit 243, this circuit will advance one step and cause a "one" signal to be transmitted over the output DIG B conductor and zero signals over the other DIG C, DIG D, and DIG E conductors. In addition, the binary coded decimal digit stored in the four bit latch 232 will be transmitted from the multiplexer circuit 244 over the WT1, WT2, WT4 and WT8 conductors. In a similar manner, when the next step signal or pulse is received over conductor 245, the scanner again advances and causes the blanking control circuit 242 to apply a one signal to the DIG C conductor. At this time, a zero signal will be applied to the DIG B, DIG D, and DIG E conductors. Thus, upon the receipt of a step signal or pulse on conductor 245, the scanner is advanced one step and a different one of the four bit latch output conductors are connected through the multiplexer 244 to the output conductors WT1, WT2, WT4, and WT8. During any reading cycle, five step pulses or signals are applied to the conductor 245 by the computer as will be described hereinafter which cause signals representing the binary coded decimal digit stored in the respective four bit latches 231 through 235 to be transmitted through the multiplexer 244 in succession to the output conductors WT1, WT2, WT4, and WT8.

Figure 5:
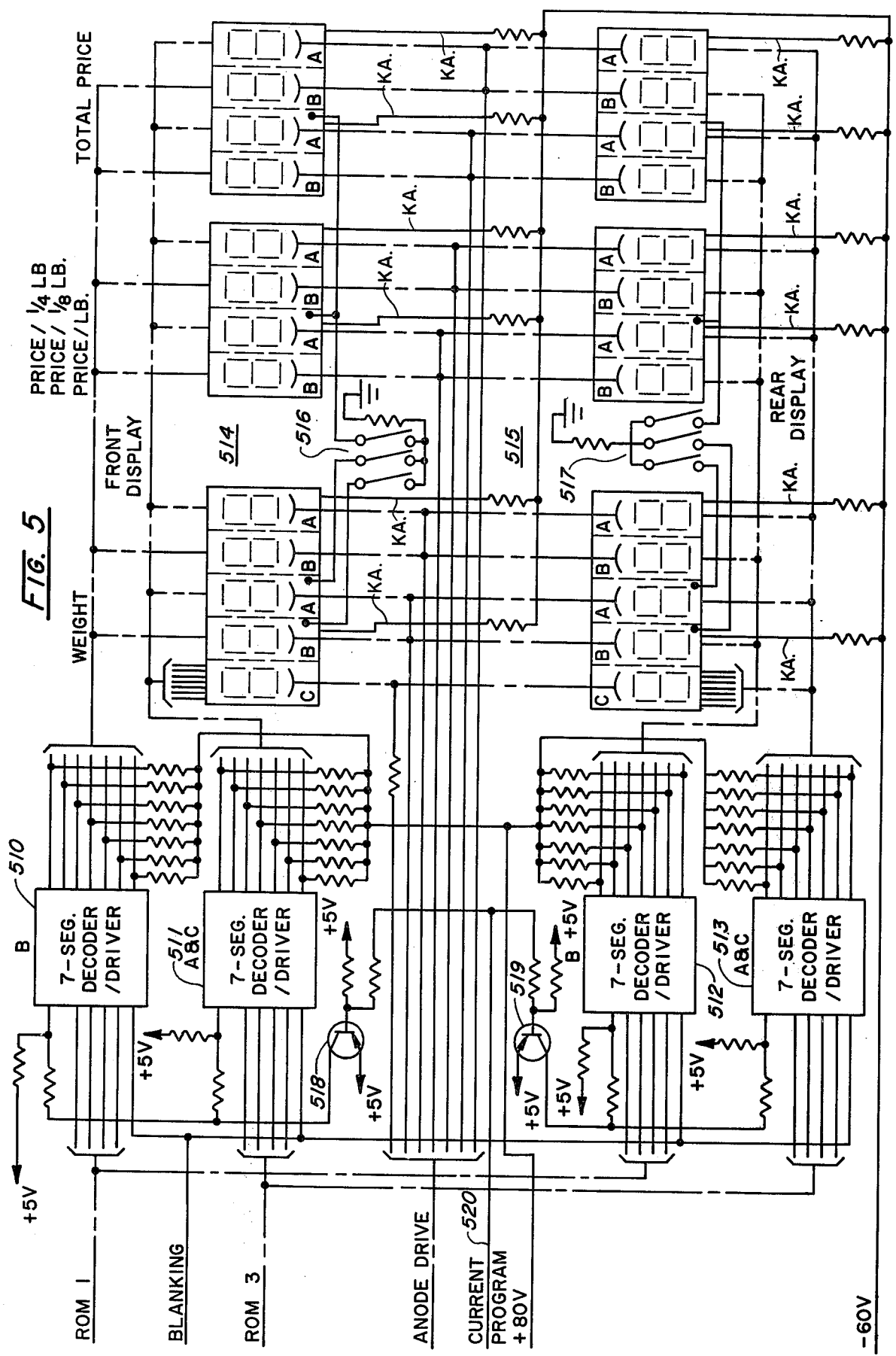
Figure 6:
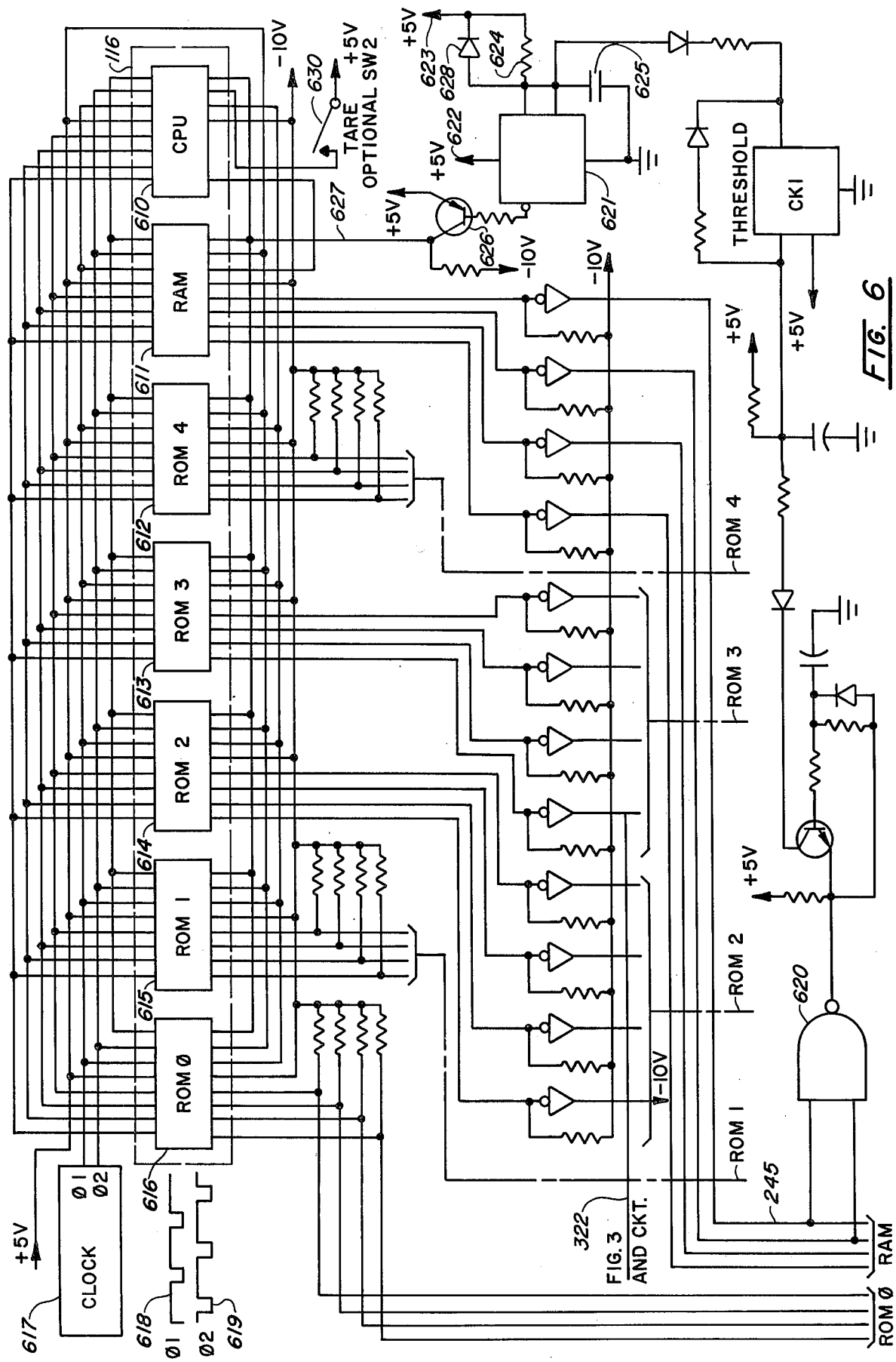
FIG. 6 shows the microcomputer employed in combination with the remaining portions of applicants' improved scale arrangement.

The manner in which the various elements of the computer 116 are interconnected is shown in FIG. 6. These elements are interconnected through the incoming multiplexing circuit shown in FIG. 3. These multiplexing circuits comprise an interface between the analog-to-digital converter shown in FIG. 2 and the computer 116 shown in FIG. 6. In addition, the various elements of the computer are connected through the circuits of FIG. 4 to the front and back display circuits and tubes of FIG. 5.

As indicated above, while the present invention is not limited thereto, the exemplary embodiment of the present invention employs an Intel Microcomputer Model MCS4 manufactured by the Intel Corporation of Santa Clara, Calif. As shown in FIG. 6, the computer 116 comprises a central processing unit CPU 610 together with a random access memory RAM 611 and a group of five read only memories ROM's 612, 613, 614, 615, and 616. In the exemplary arrangement described herein the CPU 610 is an Intel type 4004 integrated circuit. The RAM 611 is an Intel type 4002 integrated circuit and the ROM's 612 through 616 inclusive are Intel type 4001 integrated circuits. However, other commercially available integrated circuit microcomputers or other types of commercially available computers will operate equally well in accordance with the principles of the present invention described herein. These various circuits are described in the User's Manual for this computer published by the Intel Corporation. This User's Manual is incorporated herein by reference.

The various CPU, RAM and ROM units are interconnected in the manner shown in FIG. 6 as required in order for these units to cooperate one with another as required by the circuit configurations of these standard commercially available units. The connections are clearly described in the User's Manual for the MCS4 microcomputer and published by the Intel Corporation. Briefly, the ROM's, the RAM and the CPU are all connected in parallel by the date bus system shown at the top of FIG. 6. These connections permit the cooperation between the ROM's, RAM and CPU. Thus, the CPU will transmit an address over the bus system which defines a storage space in one of the ROM's for example. The ROM having this storage space has internal control circuitry which will respond to this address and in turn cause information stored at the designated address to be transmitted back over the data bus system to the CPU which then responds to this information in the usual or intended manner.

The RAM 611 in addition to comprising a random access memory which is readily controlled by the CPU 610 also includes four I/O ports which, in the exemplary embodiment of the invention described herein, are arranged to operate as output ports so that output control information from the CPU unit 610 may be transmitted from these output ports. In the exemplary embodiment described herein, the information transmitted from these ports is employed to control the multiplex decoding equipment of FIG. 3 and to apply stepping pulses over the step conductor 245 to the analog-to-digital converter described above.

Each of the ROM's 0 through 4 is also provided with four ports. The four ports of ROM 0 are employed as input ports and receive the value of the various decimal digits of the weight from the analog-to-digital decoder and other input information. The ports of the remaining ROM's are all employed as output ports. The ports of ROM's 1 and 3 are employed to control or select the various display digits. The ports of ROM 2 are employed to control the respective display digits so that they will display the correct value of the corresponding digit.

Rom 4 is employed to control the display lamps indicating the graduations and other information relative to the operation of the scale. In addition, certain of the ports of the ROM's are employed to control other features and apparatus as will be described.

The various ports of the ROM's and RAM provide interface and latching circuitry so that the output information will be obtained from the ports until it is changed by the central processing unit of the computer. In addition, the output ports are provided with amplifiers which further isolate the various output devices and the computer and to provide sufficient power to adequately control the various devices.

Figure 3:
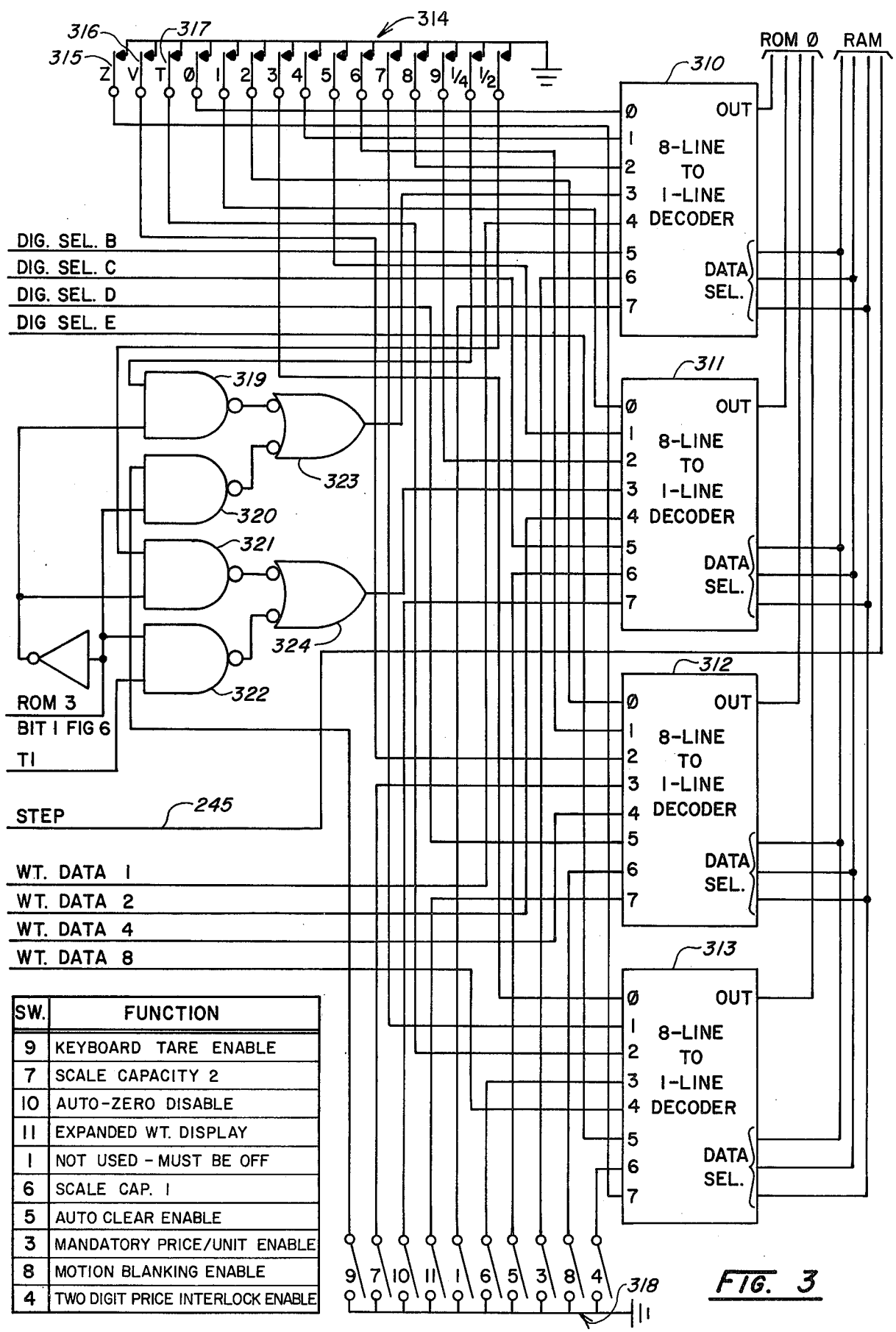
FIG. 3 shows the input multiplexing arrangement for interconnecting the analog-to-digital converter, keyboard, and mode switches with the computer of FIG. 6.

The input decoding multiplex equipment is employed as an interface between the analog-to-digital converter, the switches and the computer as shown in FIG. 3. This equipment comprises four 8-line to 1-line decoders. The output is transmitted to ROM 0 as an input. The operation of each of the decoders is controlled by the output of the first three leads from the RAM 611. These 8-line to 1-line decoders are represented in the drawing at 310, 311, 312, and 313. These devices are well-known in the art and readily obtainable commercially. The keyboard switches are represented at 314 and include a key for each of the decimal digits 0 through 9. They also include a key for a quarter and a key for a half. In addition, a zero key 315 designated Z in the drawing is provided to permit the operator or attendant to null or zero the scale as will be described hereinafter. A verification key 316 is provided to permit the operator or attendant to check or verify the circuits of the various display segments to insure that some of them are open or burned out and that none of them are shorted or always turned on. Also, a tare key 317 is provided to permit tare to be entered in the scale in a manner to be described hereinafter.

A group of mode or function switches 318 is provided to control the mode of operation of the scale and display. Which switches are usually located below the cover of the scale and not available to the operator. These switches are usually set when the scale is installed and maintained in this condition. However, when the scale is serviced or its mode of operation changed then these switches may be correspondingly changed.

Switch SW1 is not used and must be in the "OFF" position. Switch SW2 (designated 630 on FIG. 6) is designated tare optional and when OFF, entry of a tare is required before a price can be entered. When ON the tare entry is optional but if entered it must be done before the price is entered.

Switch SW3 is mandatory price/unit. When this switch if OFF display of fractional pricing is allowed. When the switch is ON however, price per quarter unit or per half unit will be displayed as price per unit. That is, even though a price may be entered as a price per quarter unit or half unit, the price will be displayed as a price per unit computed from the entered price per quarter unit or half unit.

The switch SW4 is the two digit price interlock switch. When this switch is ON a weight display of greater than 10 positive increments is inhibited until two or more price digits are entered. When OFF the weight will display regardless of price entry.

Switch SW5 is the 10 increment auto clear switch. When this switch is ON, price and tare will be cleared automatically from the scale when the net weight returns to below 10 positive increments after having been above this value for more than 1.5 seconds. When OFF tare may be cleared via the operation of the numerical zero key followed by operation of the tare key within the prescribed time limit. Entry of tare weight always clears the price entry so that price per unit value must be again entered after tare is entered.

Switch SW6 is the capacity select number 1 switch and SW7 is capacity select number 2 switch. The settings of these switches are combined to select the scale weighing capabilities or capacities as follows:

TABLE A

| Capacity | SW 6 | SW 7 |
|---|---|---|
| 15.00 lb × .01 lb | OFF | OFF |
| 7.000 kg × 5g | OFF | ON |
| 6.000 lb × .005 lb | ON | OFF |
| 3.000 kg × 2g | ON | ON |

Switch SW8 is the motion blank switch. When this switch is ON the weight display the total price display will display zeros while the indicated weight is changing, that is the scale platform or platter is in motion. When the switch is OFF the weight display and the total price display do not blank out during motion, instead the weight and total price displays are continuously updated when the platter is both in motion and at rest.

Switch SW9 is the keyboard tare enabling switch. When this switch is ON either a manual tare or a keyboard tare entry is allowed. When the switch is OFF only a manual tare entry is allowed.

Switches SW10 and SW11 are provided for testing and checking purposes. Switch SW10 is the automatic zero disabling switch. When this switch is ON the auto zero function is disabled so that the operation of the scale mechanism may be more readily checked. The switch SW11 is the raw weight display switch. When this switch is ON the raw weight as obtained from the analog-to-digital converter is expanded and displayed thus facilitating the servicing, testing, and adjusting of the scale. When these switches are OFF, the scale operates in the normal manner.

All of the keyboard and mode switches except SW2 are interconnected with the computer of FIG. 6 through the multiplexing decoders 310, 311, 312, and 313. In addition, four NAND circuits 319, 320, 321, and 322 and two NOR circuits 323 and 324 are provided to interconnect the T1 lead from the analog-to-digital converter, the quarter graduation and the half graduation switches of the keyboard switches, the number nine switch of the mode switch and the one bit line from ROM 3, with the multiplexing decoders 310 and 311 and through these decoders to the computer shown in FIG. 6.

Figure 4:
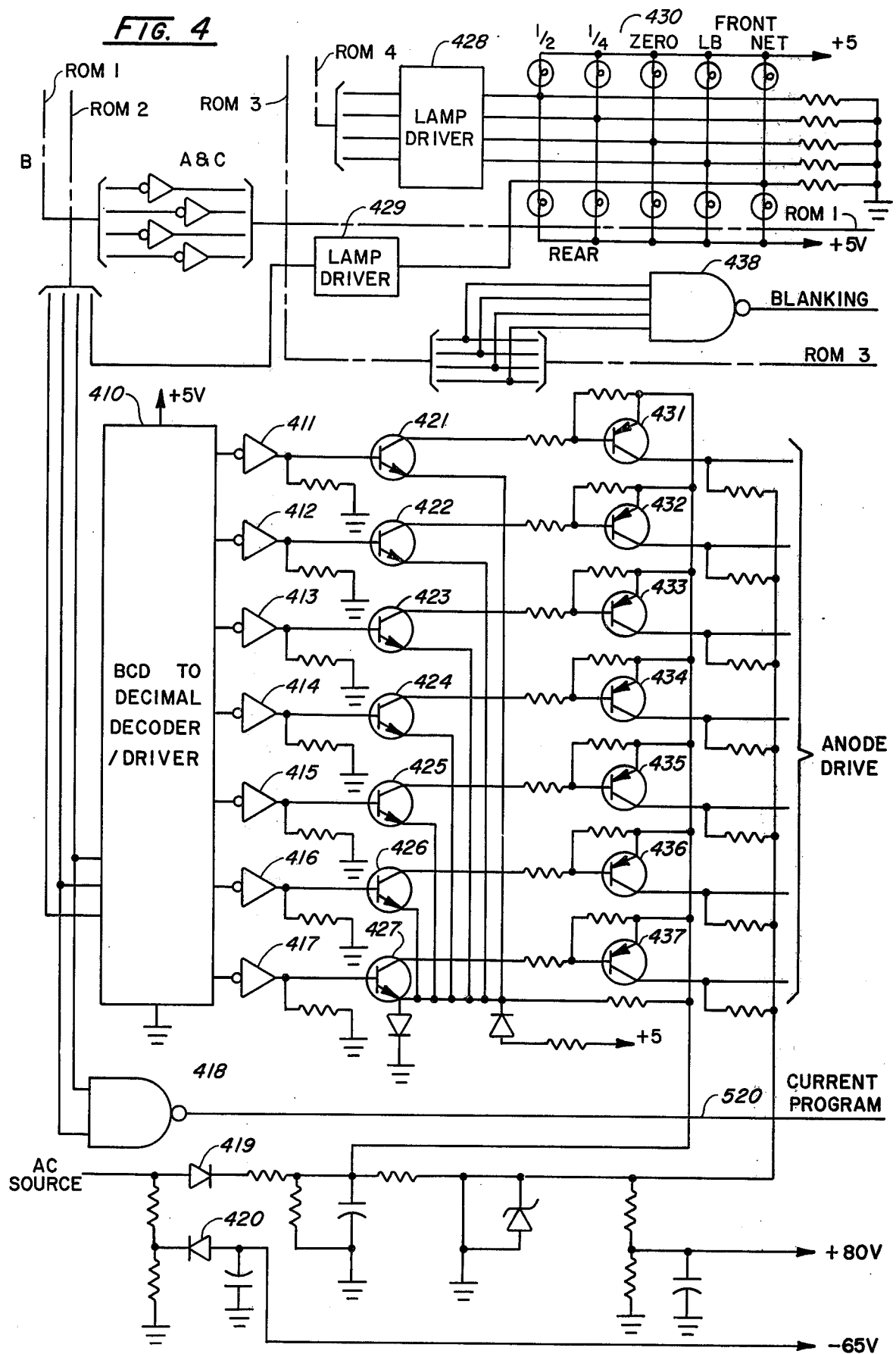
FIGS. 4 and 5 show the output display arrangement for displaying the weight, unit price, and the total price, as well as the various decoders, translators and driving circuits.

The ports of ROM's 1 through 4 inclusive as stated above are arranged to operate as outputs and control the display lamps and seven-segment decimal indicators. As shown in FIG. 5, a set of numerical indicators are provided for a front display 514 and another set 515 for the rear display. Usually the front display is for the customer and the rear display for the clerk or operator of the scale. In the exemplary embodiment of the invention described herein, each of the front and back displays comprise a five-digit weight display, a four-digit price-per-pound display and a four-digit total price or value display. Since the seven-segment indicators should be operated alternately one digit at a time, the output ports of ROM 1 are employed to control the B digits or denominational orders in both the front and back displays through the respective seven-segment decoders and drivers 510 and 512. Similarly the output from ROM 3 is employed to control the A and C digits or denominational orders of the indicators through the seven-segment decoders and drivers 510, 511, 512, and 513 are controlled through the transistors 518 and 519 and these transistors in turn are controlled by conductor 520 and NAND gate circuit 418 from the output of ROM 2 as shown in FIG. 4.

The seven-segment decoders 510, 511, 512, and 513 supply cathode current to the various segments of the various decimal digits or denominational orders of the front and back displays. The anode current for these various segments of the respective digits is obtained from the driver circuits shown in FIG. 4. These circuits comprise buffer amplifiers 411 through 417, 421 through 427, and 431 through 437. There are seven such amplifiers, shown in FIG. 4, provided for the decimal digits of the front and back displays. These drivers are controlled by the binary coded decimal to decimal decoder and driver 410 which decoder is in turn controlled by the output obtained from the output ports of ROM 2. As shown in FIG. 4, a gate circut 438 is provided which gate circuit is controlled by the output of ROM 3 to provide a blanking signal to the seven-segment decoders and drivers 510, 511, 512, and 513.

A set of lamps 430 is provided for both the front and rear displays. The net lamp for both front and rear displays is controlled from driver 429 which is in turn controlled by one of the outputs from ROM 2. The remaining lamps of the display are controlled by the lamp driver 428 which in turn is controlled by the output from the ROM 4. The blanking gate circuit 438 is controlled by the output from ROM 3 as shown in FIG. 4 and in turn controls the seven-segment decoder drivers 510, 511, 512, and 513 to blank the output as will be described herein.

The various gate circuits as well as the 8-line to 1-line decoder, the seven-segment decoder, drivers, the various lamp and display drivers are all commercially available and operate in their usual and well understood manner.

FIG. 8 shows the information stored at the various locations in the random access memory RAM.

Information stored in the read only memory referred to herein as ROM's comprises fixed data and also a series of control orders or instructions for controlling the operating sequence of the computer 116. As is well understood by persons of ordinary skill in the programming and computer art, these series of orders and instructions are employed by the computer 116 and more particularly by the central processing unit 610. These orders and instructions are permanently stored in the ROM's at the time of manufacture in accordance with the desired sequence of operations. If it is desired to change any of the orders or sequence, it is necessary to obtain new ROM's since the original ROM's cannot be changed. The various sequences of orders are sometimes called routines which are familiar to persons skilled in the programming and computer art. In obtaining these routines, a series of flow charts defining the various sequence of operations is usually prepared. These flow charts may then be readily translated into the computer language as required by the particular microcomputer and as set forth in the instructions in the User's Manual for the respective computers. A program listing for performing the operations specified in the flow chart shown in the drawing is attached as an Appendix to this specification. Such a program is in the language required for the MSC-4 microcomputer employed in the exemplary embodiment of this invention as specified in the User's Manual for such MCS-4 microcomputer set.

When different computers are employed in combination with the present invention the flow charts will be translated in other computer language specific to the specific computer employed.

As indicated in FIG. 8 the RAM is provided with four memory register areas. Each of these register areas is arranged to store four binary digit words which, in the exemplary embodiment described herein, usually are coded to represent a decimal digit. Each of the memory areas is arranged to store 16 of these four binary digit words or other informaion.

The RAM 611 also includes four status registers shown in the lower part of FIG. 8. Each of these status registers has an address similar to the corresponding memory register area as indicated above for the status registers. The rectangles in the status registers represent a storage space for a single bit, thus each of the status register may store four 4-digit words. In addition, each of the digits or bits of each of the words may be employed to store a binary bit, which is independent of the other binary bits of the particular word at the particular address. In other words, as indicated, the auto zero sign register 820 is used to store the sign of auto zero correction.

While many different arrangements may be employed to store the different information in the register spaces and status registers of the RAM, FIG. 8 shows one suitable arrangement which is employed in the exemplary embodiment of the present invention described herein. Thus the first five words in the register spaces 810 in the first register space (register φφφφ) are employed to store the 5 binary coded decimal digits of the raw weight received from the weighing apparatus and are designated raw weight register. The next 5 four bit register word spaces 811 in the first register space are employed to store the five binary coded decimal digits of the previous weight which is employed to determine whether or not the scale platform is in motion or not.

The next register space 812 is employed to store the identity of any key of the keyboard which may be found to be depressed or operated. The last 5 four bit word spaces 813 of the first register space φφφφ are employed to store the auto zero correction factor.

The other portions of the register spaces are similarly employed to store the information as indicated in FIG. 8.

The various status register spaces at the bottom of FIG. 8 are similarly designated with the name of the bit or bits employed to record the various information required to provide the various features of the present invention as described herein.

Thus the Z key timer 838, together with the control thereof, including the various routines of the program as described herein, comprise timing means for timing the operation of the Z key. As described herein, if the Z key is not held operated sufficiently long, the scale will not be zeroed and placed in condition for operation. Again the Z done flag 839, together with the control thereof, as described herein, provides means for preventing the entry of the unit price and the operation of the scale until Z key and timer have zeroed the scale. This flag also permits the entry of the unit price and operation of the scale system after the Z key has been held operated sufficiently long to zero the scale.

The digit timer 830, together with the control thereof, provides means for timing the operation of the digit keys. If these keys are not operated sufficiently rapidly wrong values may be entered. In order to prevent this, the digit timer 830 provides means for insuring that the digit keys are operated in the proper manner to cause the proper entry of information into the scale system. The motion flag 831, together with the control thereof, including the routine sequence of orders, described here, provides means for detecting and registering either motion or no motion of the scale platform. The zero light flag 819, and the control thereof, provides means for turning on or off the zero light. Similarly the other registers, storage spaces and flags provide means for providing the various novel features, operations, and indications described and claimed herein.

FIGS. 9A through 9L, show a flow diagram for an exemplary operation sequence for the computer system 116 shown in FIG. 1 which computer system is shown in greater detail in FIG. 6. The flow charts which are diagrammed as shown in FIGS. 9A through 9L consist of a series of blocks having different shapes. The rectangular blocks represent routines of orders for the computer for performing various functions stated in the rectangles.

Diamond-shaped blocks represent an order or series of orders for performing a decision or answering a question either by "yes" or "no". Depending on the answer to the question the operating sequence proceeds in either one or the other of two different directions. The hexagonal figures represent a more comprehensive routine such as shown on some one or the other of the FIGS. 9A through 9L. The trapezoidal figures represent input and output operations of the computer equipment. The ovals represent a return to the next order of the main program or routine. All of these operations are common and well known in the computer and computer programming art. In addition, the circles above and to the left represent positions and places for entry into the various operating sequences from other places or positions of the flow charts. The circles to the bottom and to the right represent exit positions or transfer positions to which the sequence of operation is transferred from a circle to a designated circle above or on the left in the same or a different figure. In addition, to the various input and output locations are designated with labels listed in the exemplary program comprising an appendix hereto.

The following table B lists various legends as shown on the flow chart and at the end of the list of program orders or instructions stored in the ROM's as shown in the appendix hereto. For convenience in describing and understanding the operation of the exemplary embodiment of the present invention described herein, the flow charts have been divided up into FIGS. 9A–9L.

TABLE B

| | |
|---|---|
| ACLCK | Auto Clear Check |
| ADD | Label Within SUBTR Denoting Addition Loop |
| ARICL | Arithmetic Work Area Clear Routine |
| BLNK1 | Label Within Blank |
| CAPCK | Scale Capacity Check |
| CKDLY | 4 Millisecond delay performed by no Auto Zero Correction |
| CKMTN | Check for Presence of Motion |
| CKRCP | Check Recompute Flag |
| CKT1 | Check for T1 Signal True |

TABLE B-continued

| | |
|---|---|
| CLRSB | Clear Memory Field Routine |
| CLRT | Clear Tare Subroutine |
| CMPUT | Compute Total Price |
| CPBTP | Clear Price, Blank Total Price |
| CRTAZ | Correct Auto Zero One Increment |
| CZTIM | Clear Zero Key Timer |
| DFLT2 | Label After DGFLT |
| DFLT3 | Label After DGFLT |
| DGFLT | Output Digital Filter |
| DLAY4 | 4 Millisecond Delay Routine |
| DNORM | Normal Display Path |
| DPSCN | Display Scan Loop |
| DSPLK | Link from keyboard to Display |
| DSPLY | Display Routine |
| DVFY | Display Verify Path |
| D1 | Label Within DSPLY |
| EWSGN | Enter Raw Weight Sign and Substract |
| FINDF | Find Factor For Scale Capacity Routine |
| FTABL | Factor Table Used by FINDF |
| GWMCK | Gross Weight Minus Check |
| HLFCK | Check for per ½ Key |
| IDLE | Idling Loop Waiting for T1 Signal |
| IDLLK | Link to IDLE |
| INCZL | Increment Zero Lamp Flag Toward O (Zero Lamp On) |
| KB0 | Label Within Keyboard Routine |
| KB1 | Label Within Keyboard Routine |
| KB11B | Label Within Keyboard Routine |
| KB11C | Label Within Keyboard Routine |
| KB11D | Label Within Keyboard Routine |
| KB17 | Label Within Keyboard Routine |
| KB18 | Label Within Keyboard Routine |
| KB2 | Label Within Keyboard Routine |
| KB4 | Label Within Keyboard Routine |
| KB5 | Label Within Keyboard Routine |
| KB6 | Label Within Keyboard Routine |
| KB6A | Label Within Keyboard Routine |
| KB6B | Label Within Keyboard Routine |
| KB6C | Label Within Keyboard Routine |
| KB7 | Label Within Keyboard Routine |
| KB7A | Label Within Keyboard Routine |
| KB8 | Label Within Keyboard Routine |
| KSCAN | Keyboard Scan Subroutine |
| LDMEM | Load Memory Character Routine |
| LTMAX | Less Than Maximum Auto Zero Value |
| MANTR | Manual Tare |
| MAXAZ | Maximum Auto Zero Check Routine |
| MCRET | Magnitude Check Subroutine Return |
| MFCTR | Multiply Scale Factor Times Raw Weight |
| MGCHK | Magnitude Check Subroutine |
| MINMI | Minuend Minus in SUBTR |
| MOV4 | Move Four Digits Routine |
| MOV5 | Move Five Digits Routine |
| MTFCK | Manual Tare Flag Check |
| MULT | Multiply Routine |
| MULT1 | Label Within Multiply Routine |
| MULT2 | Label Within Multiply Routine |
| MULT3 | Label Within Multiply Routine |
| MULT4 | Label Within Multiply Routine |
| MULT5 | Label Within Multiply Routine |
| MULT6 | Label Within Multiply Routine |
| NIXZL | Set Zero Lamp Flag to Turn Off Zero Lamp |
| NMOTN | No Motion |
| NOTEQ | Not Equal Zero |
| NOTOT | Not 0 Key Followed by T Key |
| PRCMP | Price Computation |
| PRXWT | Multiply Price Times Weight |
| QSCAN | Quick Keyboard Scan |
| QTRCK | Check for Per ¼ Key |
| RDINP | Read Input |
| RDT1 | Read T1 Signal Routine |
| RESET | Reset Scale |
| RETN | Return From Routine Labels |
| RETRN | Return From Routine Labels |
| RNDOF | Round Off Routine |
| RNDWT | Round Off Final Weight |
| RNDW1 | Label in Round off Final Weight |
| RNDW2 | Label in Round off Final Weight |
| RNDX5 | Round off by 5 |
| ROFF1 | Label within RNDOF |
| ROFF2 | Label within RNDOF |
| RSTLK | Link to Reset |

TABLE B-continued

| | |
|---|---|
| SDONE | Substact Routine Done |
| STARE | Subtract Tare |
| STMIN | Set Output Weight Minus Sign Routine |
| STRSB | Store Result Routine |
| SUB | Label Within SUBTR Denoting Subtraction Loop |
| SUBAZ | Subtract Auto Zero From Raw Weight |
| SUBTR | Subtract Routine |
| SUB1 | Label in Sub Loop |
| SUB2 | Label in Sub Loop |
| SWSGN | Set Raw Weight Sign and Update Raw Weight Routine |
| TARCK | Check for Tare Key |
| UDMTN | Update Motion Flag |
| UDTGT | Update Motion Target (previous weight) |
| VBLLK | Link to VBLNK |
| VBLNK | Total Price (value) Blank |
| VFCKA | Label After VFYCK |
| VFYCK | Check for Verify Key |
| WBLNK | Weight Blank |
| WMGCK | Weight Magnitude Check Routine |
| WREAD | Weight Read |
| WTOUT | Weight Output Register Update Routine |
| XIDLE | Expand × 10 routine idle with T1 false |
| ZCAPT | Zero Balance Capture |
| ZLITE | Zero Light Update |

OPERATION OF THE SYSTEM

Assume now that power has been applied to the scale and the entire arrangement with the result that the load cell and strain gages will generate an output voltage which is applied through preamplifier 112 and the gate circuit 216, to the analog-to-digital converter. The analog-to-digital converter will then start to convert the analog signal to a digital output signal.

In addition the power is simultaneously supplied to the computer 116 and to the various input and output circuits cooperating therewith.

In addition power is applied to the terminals 622 and 623 of the mono-pulser 621. The application of power to terminal 623 causes capacitor 625 to charge through the charging resistor 624. As a result the upper terminal of capacitor 625 starts to charge to a positive voltage. However, during the charging time of this capacitor, a lower voltage is supplied to the right hand input of mono-pulser 621 and this lower voltage together with the power applied to terminal 622 causes mono-pulser to apply an output voltage or pulse to the base of transistor 626 which transistor in turn causes a reset and clearing pulse to be applied to the clear and reset bus 627 of the computer 116. As a result the various registers, circuits and other elements of the computer are all reset to their initial state and the central processing unit 610 conditioned to read the first program order.

During the charging time of the capacitor 625 the diode 628 is back biased so that it does not short circuit or alter the charging resistor 624. However, should power be interrupted, even for a very brief moment, the diode 628 will become conducting and will rapidly discharge the upper terminal of capacitor 624 so that upon the reapplication of power to the system, mono-pulser 621 applies a pulse through the transistor 626 to the clear and reset conductor 627 in the manner described above with the result that the computer circuits are all reset to their initial condition and the central processing unit 610 is again directed to the first order in the zero ROM.

Figure 9A:
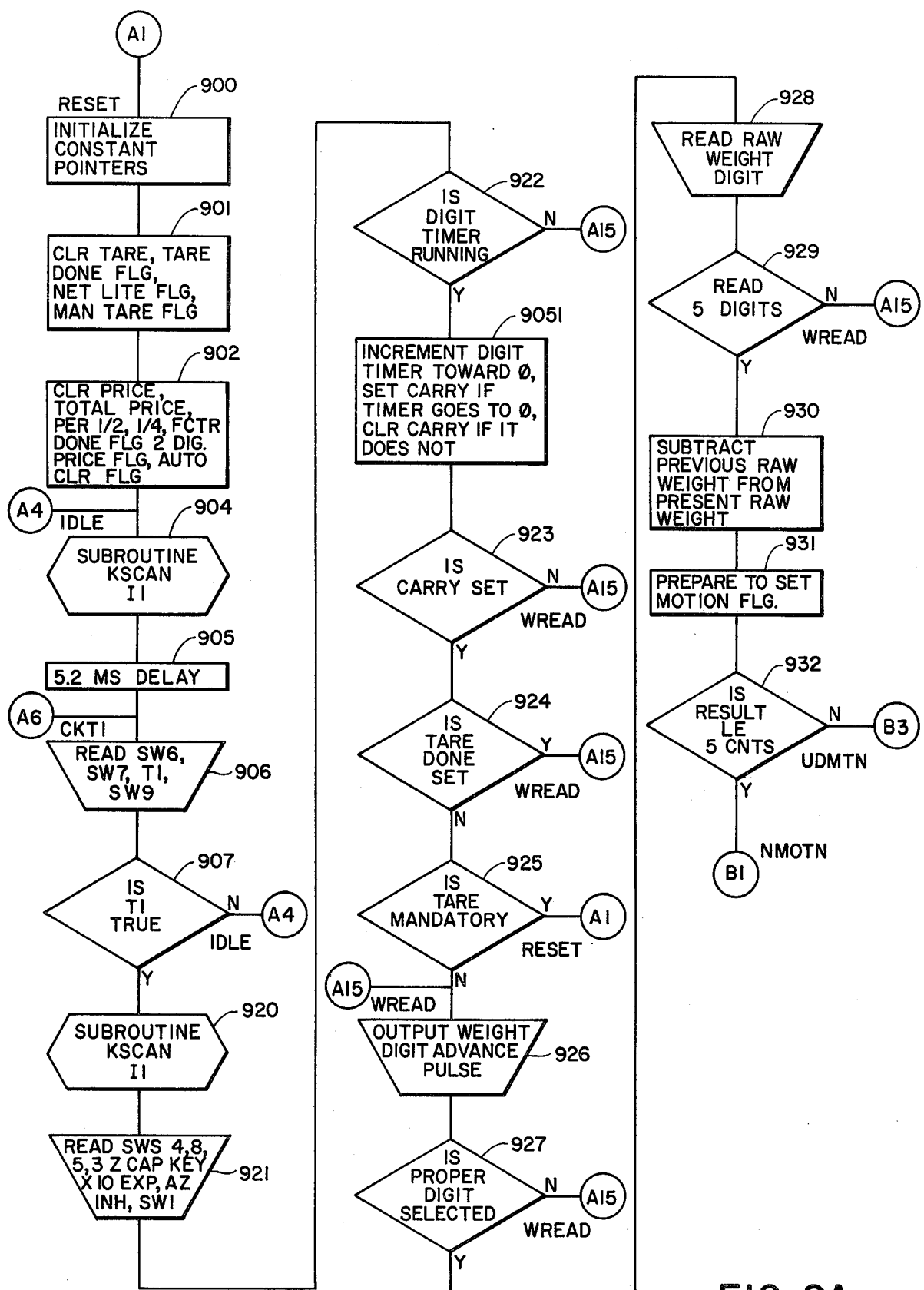
FIGS. 9A-9L inclusive show flow charts of the various subroutines employed to control the microcomputer of an exemplary embodiment of applicants' improved scale arrangement.
Figure 9B:
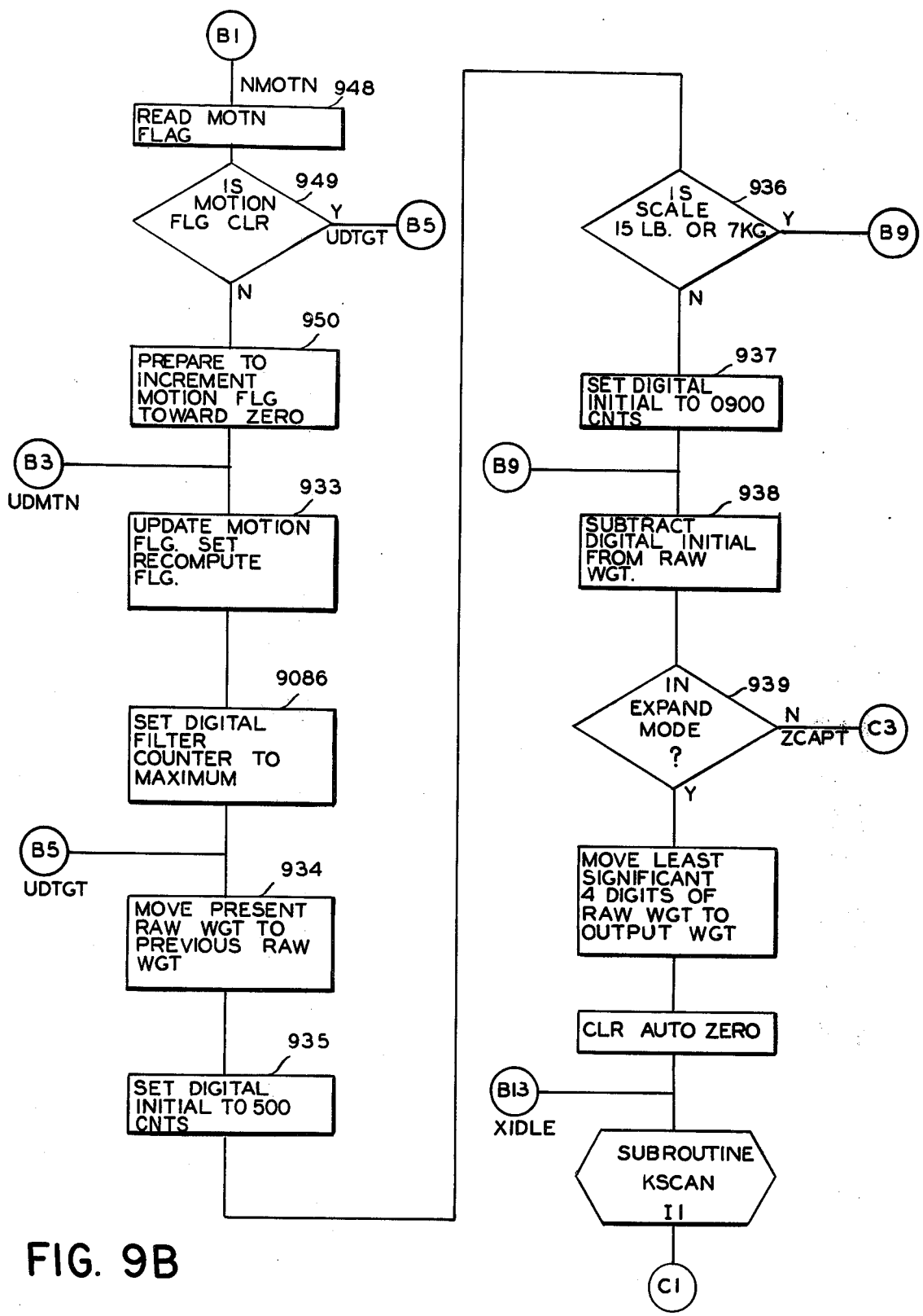

The first series of orders or routine to which the central processing unit CPU 610 responds is a reset routine or series of orders called RESET which routine is represented in the flow chart of FIG. 9A beginning in the upper left hand corner of the drawing. Thus the main control is transferred by the pulse on the clear and reset conductor 627 to the input A1 at the top of FIG. 9A. The first rectangle 900 represents the operations to the computer to initialize the various constant pointers or registers and storage spaces in the CPU perform the reset operations. The rectangles 901 and 902 represent the series of ordes or routines within the reset routine which are employed to clear the various register spaces within the RAM 611.

Thus the tare weight storage space 814, shown in FIG. 8, is cleared by entering zeros in all of the storage spaces within this tare register. The tare done flag space 815 in the status register space 816 is cleared by recording a zero in this register space. Likewise zeros are stored in the manual tare flag space 818 and in the net lite flag register 817.

Likewise the price register 821 and the total price or value register 822 are cleared by recording zeros in all of their register spaces. Also zeros are recorded in the ¼ register space 824 and in the ½ register space 825, in the two digit price flag 827 and in the autoclear flag register space 826.

Thereafter the control sequence advances to the routine KSCAN represented by block 904 in FIG. 9A. The KSCAN is employed to scan the keyboard keys to determine which ones if any are operated or depressed. This routine is shown in FIG. 9I.

KSCAN ROUTINE

The first block 908 of the KSCAN routine directs that the pointers are initialized by transferring the appropriate constants to the registers of the central processing unit so that the various keys 314 except the Z key 315 shown in FIG. 3 will be scanned to determine whether or not any of these keys are depressed. After the pointers are initialized the control is transferred to block 909 which is employed to check key identity register 812 of FIG. 8. Under the assumed conditions this register will be zero so that the control will be advanced to block 910 where the address word identifying the first 4 keys of the keyboard keys 314 is obtained from the memory and then in accordance with block 911 these keys are tested to see if any of the first four keys 0-3 is operated. Assume that none of these keys is operated so that the control sequence then advances to block 912 where it is determined whether or not all of the keys have been checked. On the first cycle of checking, four keys are checked so that all fourteen keys will not be checked with the result that the control is then transferred via transfer 13 back to block 910 where the address word for a second set of the four keys is read out of memory and the keys then tested. This loop is repeated four times to determine whether any one of the fourteen keys 314, except the Z key, 315, is depressed. Under the assumed conditions, none of the keys will be depressed and all of the keys will have been checked by repeating this loop four times with a result that the control advances to block 913 where the key hit register 829 is cleared by entering zeros in all of the register spaces of this register.

Thereafter, control is transferred via transfer L11 to the display routine DSPLY. In accordance with the first block 914 (FIG. 9L) of this routine the verifying key 316 is checked. Under the assumed condition this key will not be depressed so that the control is then transferred via L17 to DNORM sequence. The first block 915 of this sequence is employed to check the various flag registers so that the corresponding lamp will be controlled in accordance with the stored information. Then in accordance with block 916 the weight, price, and total price or value will be transmitted to the corresponding displays shown in FIG. 5. Under the assumed conditions zeros will be displayed by all of these displays. Next the output lamps shown at the top of FIG. 4 will be set in accordance with block 917. Under the assumed conditions where zeros were entered in the various registers as described above in accordance with the blocks 901 and 902. The lb. lamp, which is controlled by the motion flag, 831, will be turned on while the net lamp, the ¼ lamp and the ½ lamp will be turned off or remain off. Thereafter the control of the CPU 610 is advanced to block 918 and since no key has been depressed the zero is still recorded in the key hit register 829 so control then is returned to the main program as indicated in block 919. In other words the control then returns to the next operation, block 905 of the main program shown in FIG. 9A.

Block 919 causes the control sequences to return to the next operation of the main program which is block 905. This block causes a 5.2 millisecond delay. This time is measured by counting cycles of operation of the CPU unit 610 in the registers within this control unit.

At the end of the 5.2 millisecond delay the control sequence advances to block 906 where switches SW6, SW7 and SW9 and the condition of the T1 lead are read into the central control unit 610. Next the control advances to block 907 where the condition of the T1, read by block 906, is determined. If the T1 lead has a zero signal on it indicating that the analog converter has not fully determined a bonified digital output the control is transferred back to block 904 via transfer A4 and the above cycle through the IDLE sequence beginning with block 904, is repeated. That is the above described routines through blocks 908, 909, 910, 911, 912, 913 as well as through the display DSPLY and DNORM routine of blocks 914, 915, 916, 917, 918, and 919 are repeated. This cycle which also includes blocks 905, 906, 907, is then repeated until the analog-to-digital converter has completed a weight conversion, at which time a one signal is applied by the analog digital converter to the T1 conductor. When this signal is recognized by central control unit CPU 610 in accordance with clock 907 the control sequence then advances to block 920 whih causes the CPU 610 to again advance through the KSCAN routine described above. Still assuming that none of the keyboard keys are operated or depressed so the sequence advances to block 919 and then the control is transferred back to the next operation of the main program which will be the operations specified by block 921. In accordance with this block the various settings of the mode or function switches 4, 8, 5, 3, 7, 11, 10, and 1 are determined and stored in the corresponding status registered spaces shown in FIG. 8. The next operation as shown by block 922 is to determine whether or not the digital timer, which employs the register space 830, is performing a timing operation or running. Under the assumed condition the digital timer will not be running so operation is transferred via A15 to blocks 926, 927, 928, and 929 which causes the digital weight signals represented by the five digit weight indications from the analog-to-digital converter to be obtained from the analog-to-digital converter and stored in the raw weight register 810 shown in FIG. 8.

As indicated by block 930 the previous raw weight stored in the register 811 of FIG. 8 is then subtracted from the present raw weight register 810. Block 930 causes the CPU 610 to be conditioned to update the motion flag register 831 by storing 14 in a CPU register. Then block 932 then determines whether the result of the subtraction of block 930 is stored in raw weight is greater than 5 counts. Assume that the result is greater than 5 counts since under the assumed conditions when power is first applied all zeros will be recorded in the previous raw weight register 811, consequently the control is transferred to the updating motion sequence via B3 transfer to the block 933 of FIG. 9B.

In accordance with block 933 the motion flag register 831 is set to indicate motion by storing 14 in this motion flag register space 831 in RAM 611. In addition, in accordance with block 933, the recomputed flag register 837 is set to order a recomputation. This flag comprises the four status register spaces 837 shown in FIG. 8.

From block 933 the control advances to block 9086 which directs the digital timer register to be set to 3. Then control advances to block 934 which causes the present raw weight to be transferred to the previous raw weight register 811. From block 934 control is then advanced to block 935 which causes the initial digital weight to be set to 500 counts. Thereafter the control is advanced to block 939 which determines whether the scale is employed for 15 lbs. or 7 kg and if it is the control is transferred to block 938 via transfer B9. If the scale is not set for 15 lbs. or 7 kg the control advances to block 937 which changes the initial weight to 900 counts and thereafter the control advances to block 938 which causes the digital weight to be subtracted from the raw weight. Next the control advances to block 939 and since the scale is not operating in the expand mode control advances to block 940 via transfer C3.

Figure 9C:
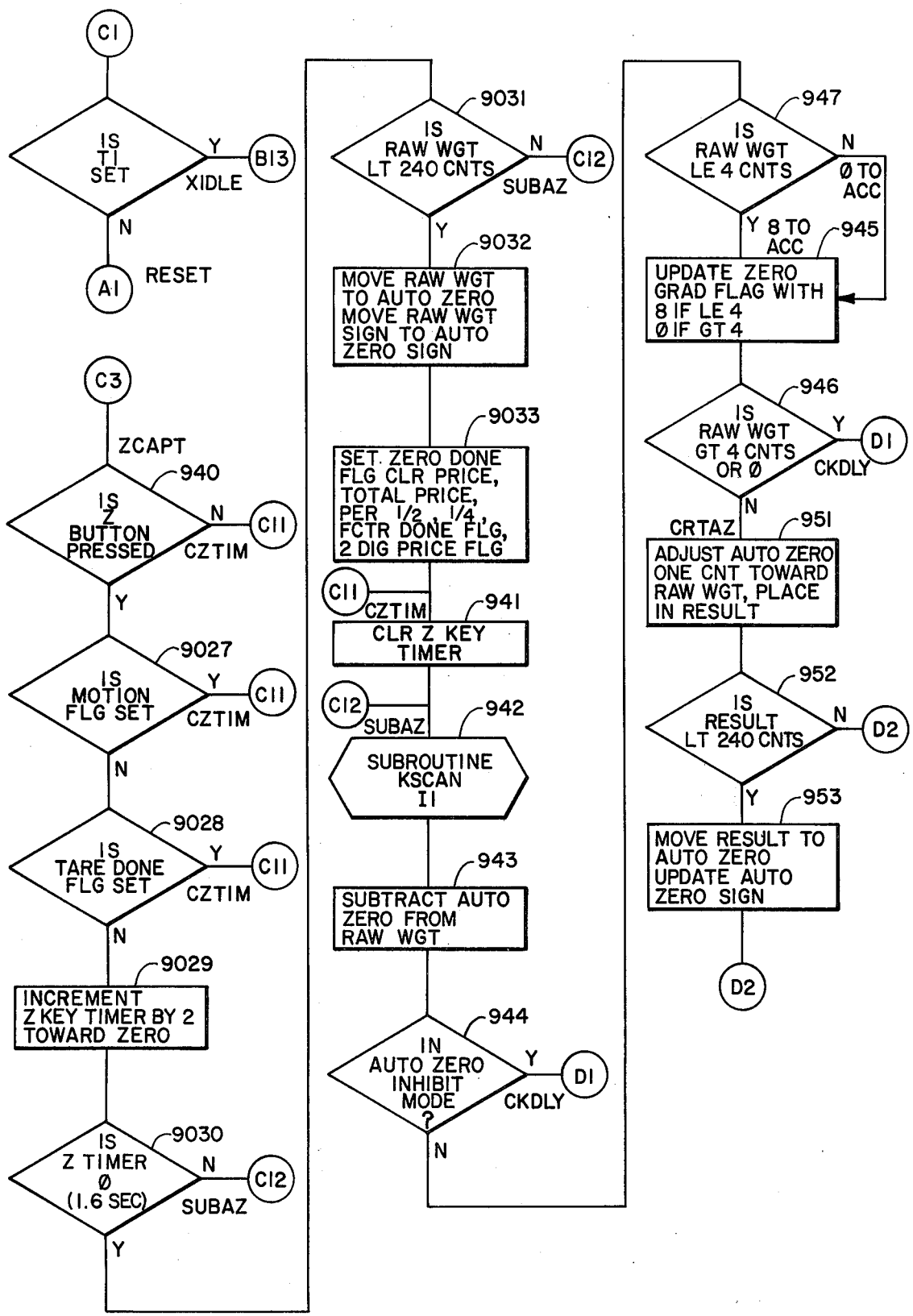

As indicated by block 904 of FIG. 9C the status of the Z key 315 is determined and since it is assumed that this key is not pressed the control is transferred via C11 to block 941 which causes the Z key timer register space 838 to be cleared or set to zero.

Figure 9D:
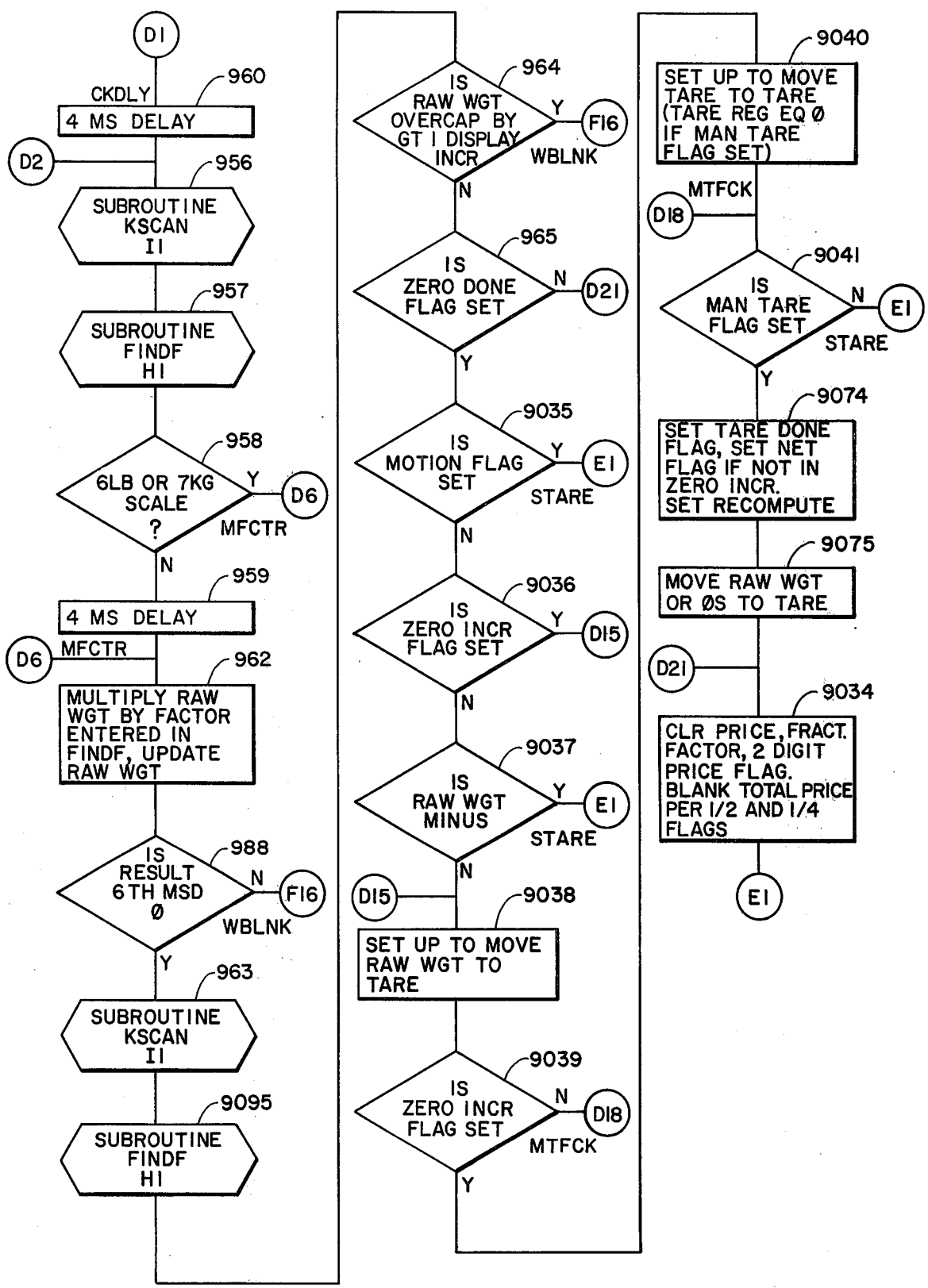
Figure 9E:
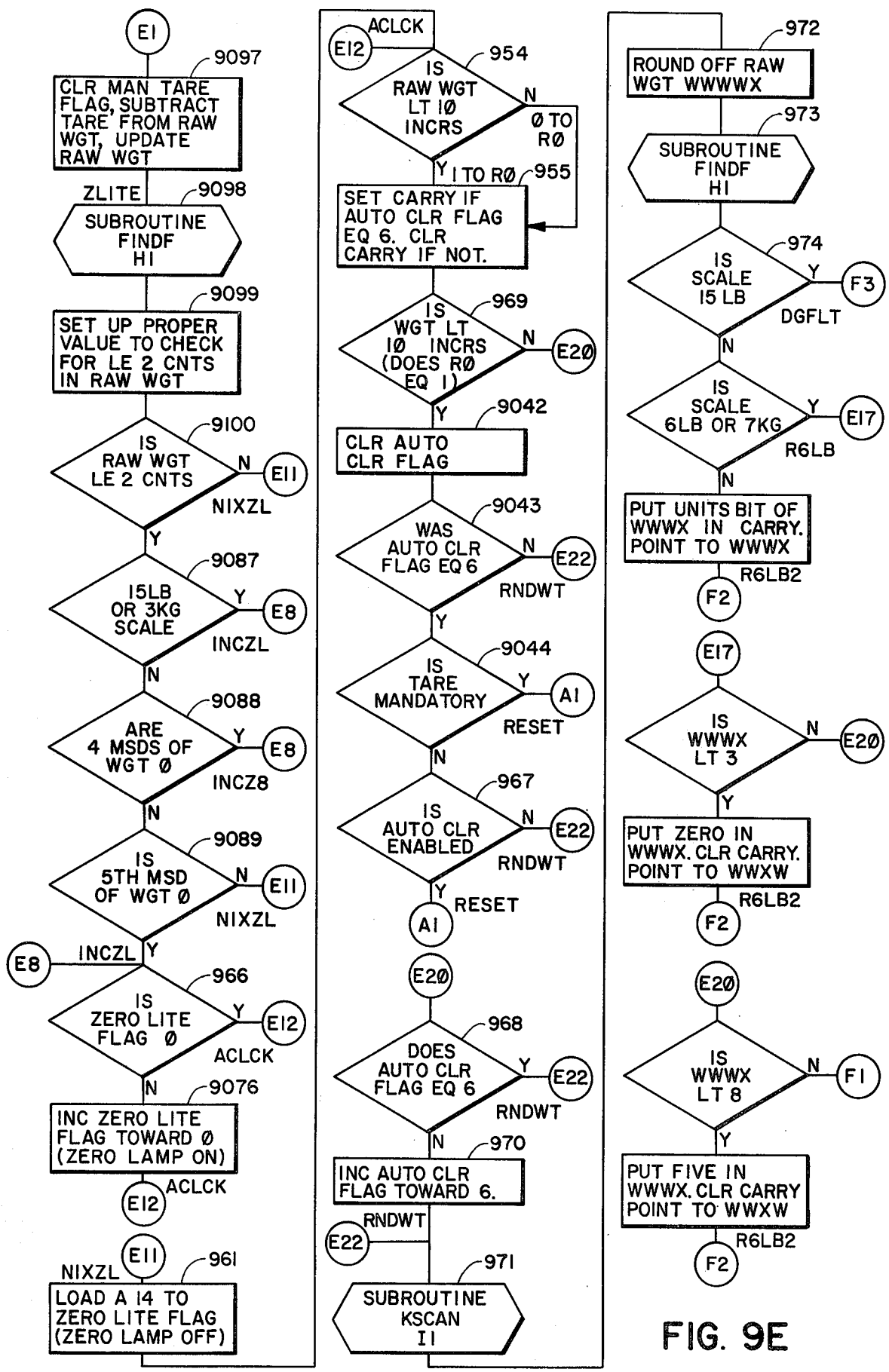
Figure 9F:
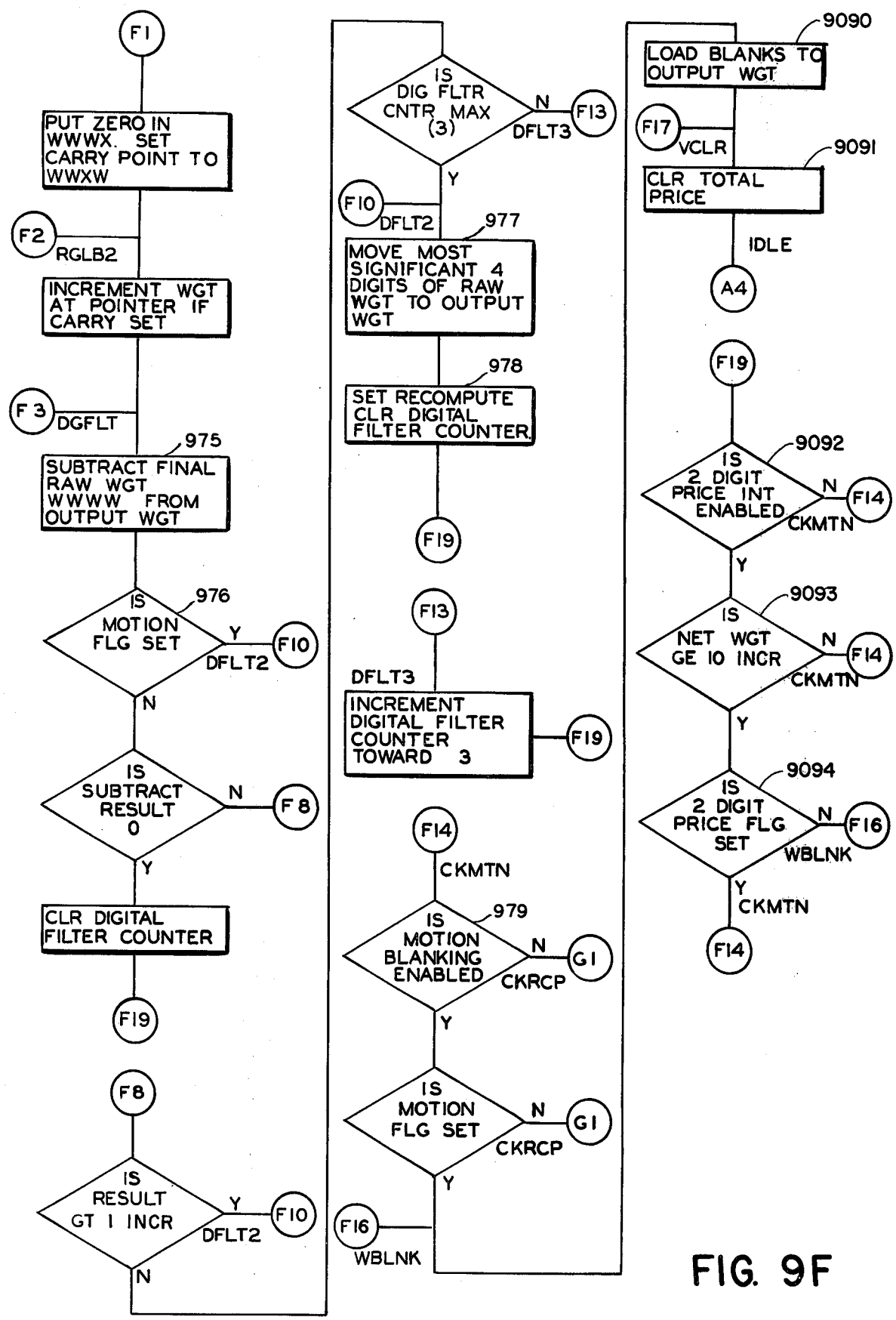
Figure 9G:
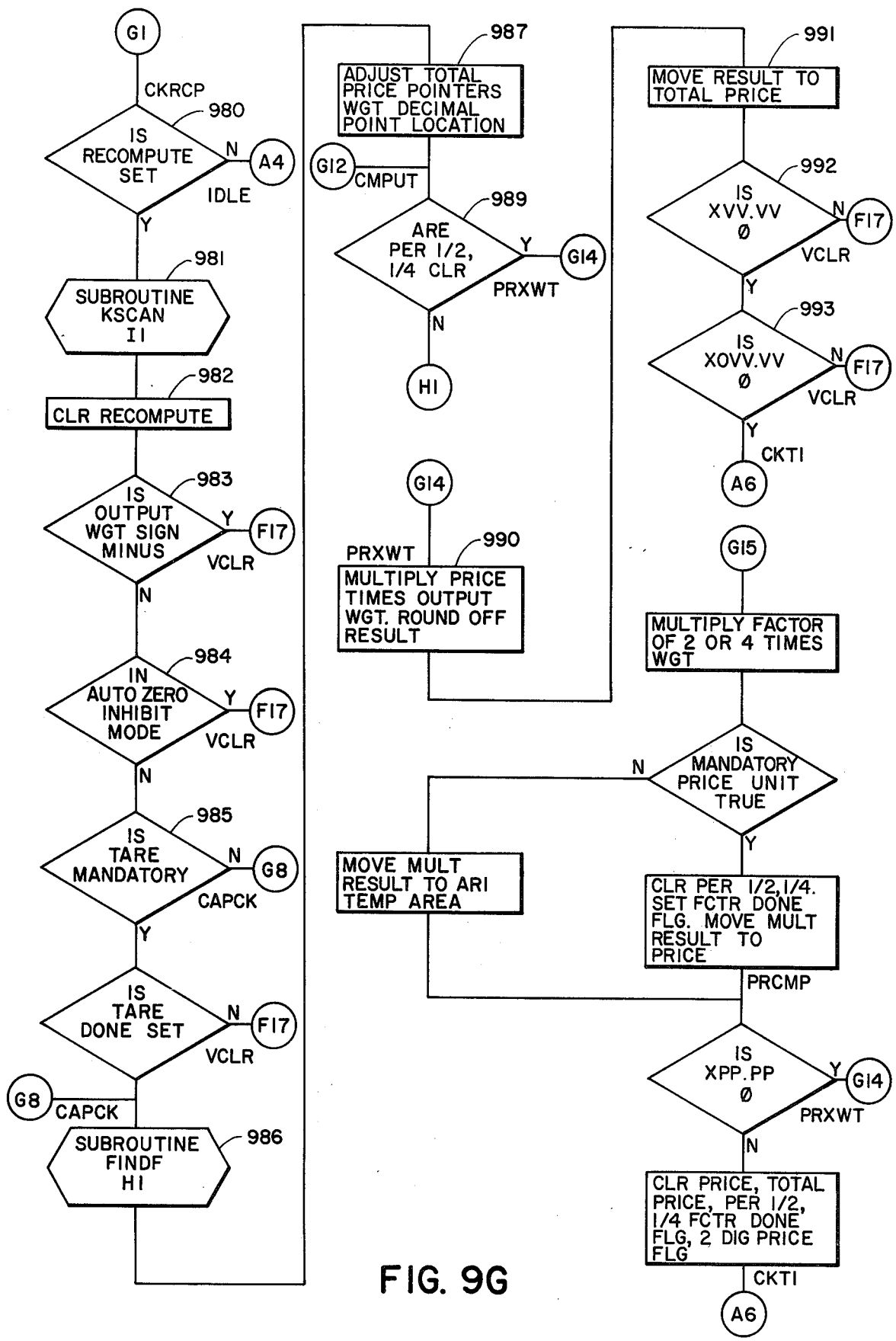
Figure 9H:
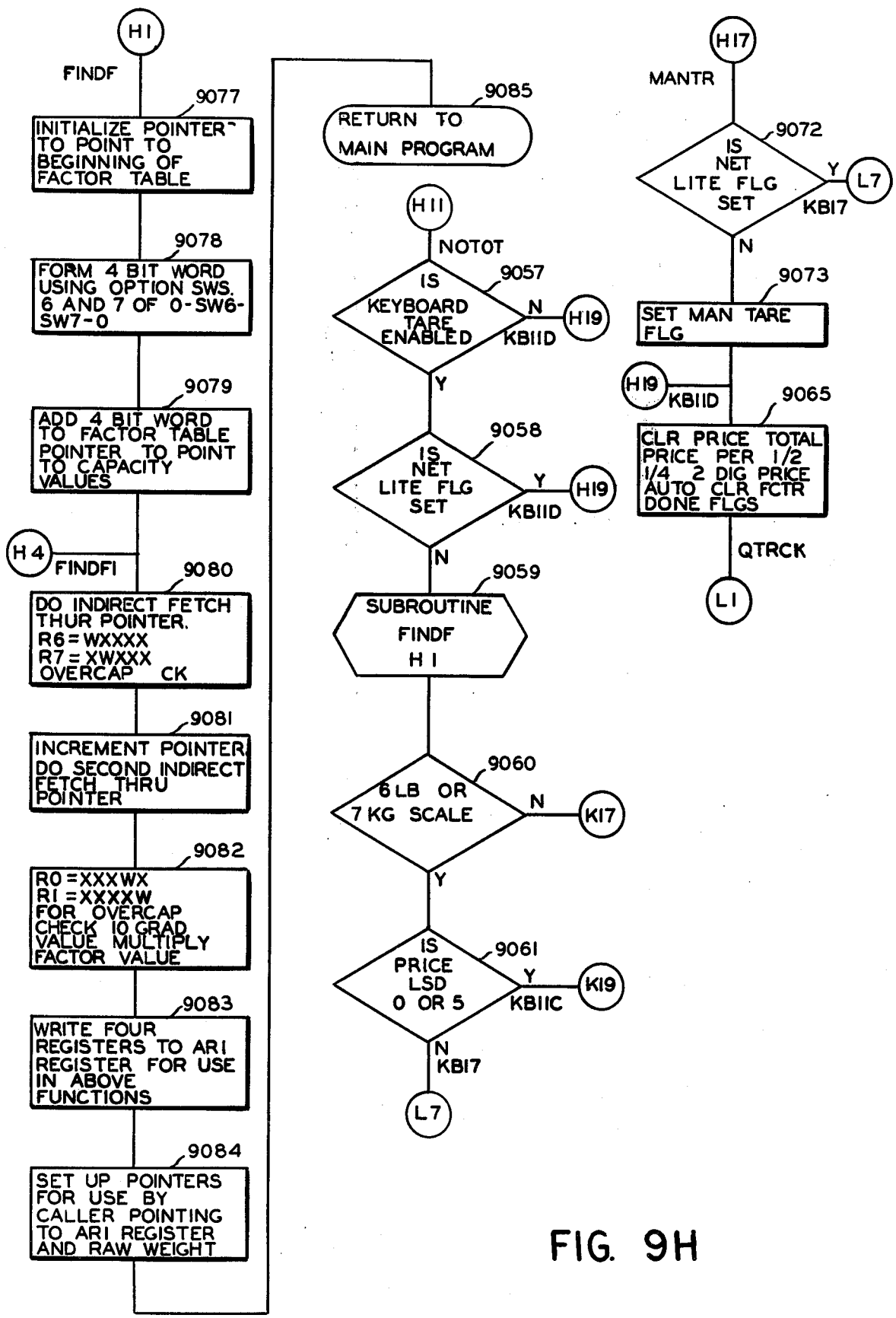
Figure 9I:
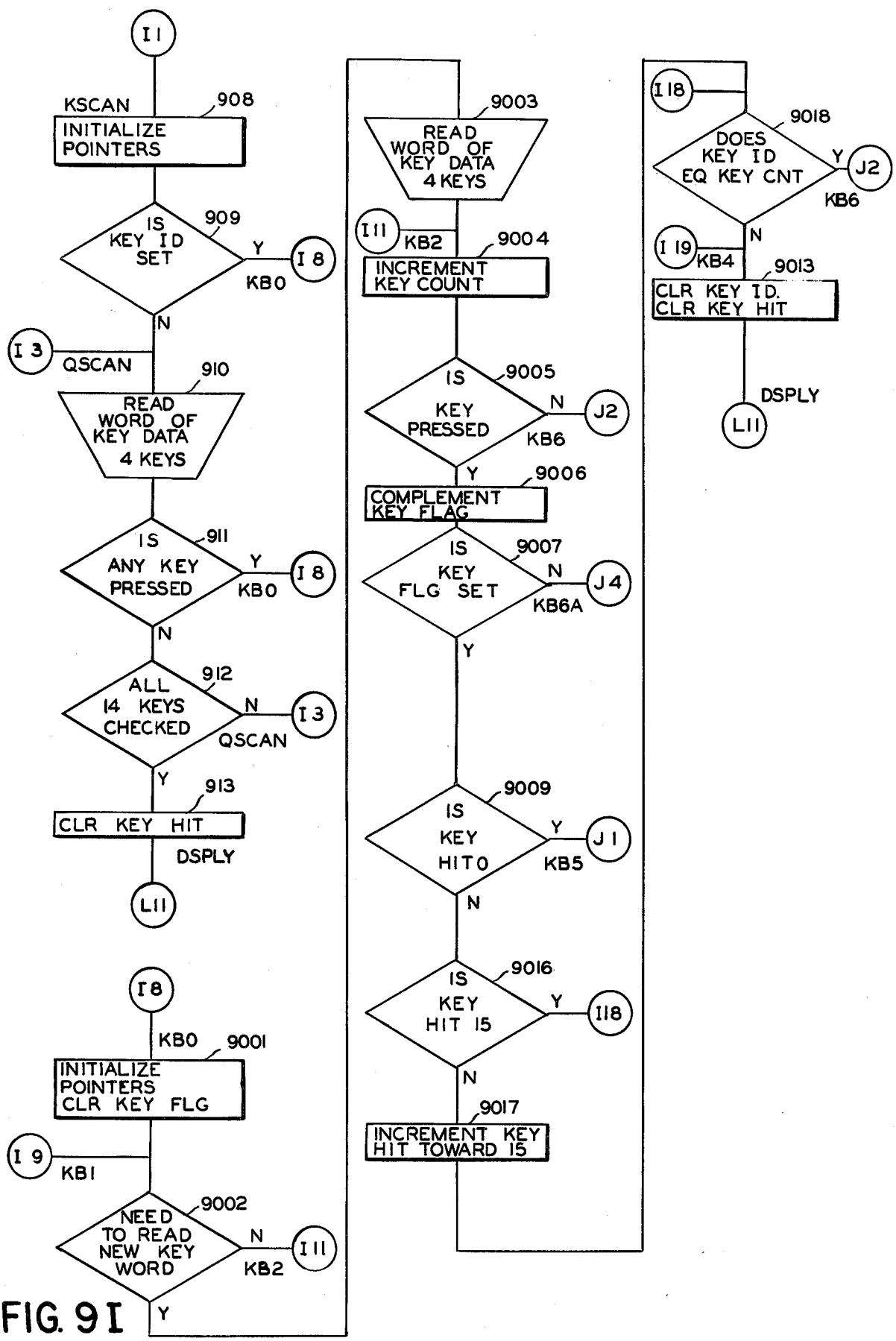
Figure 9J:
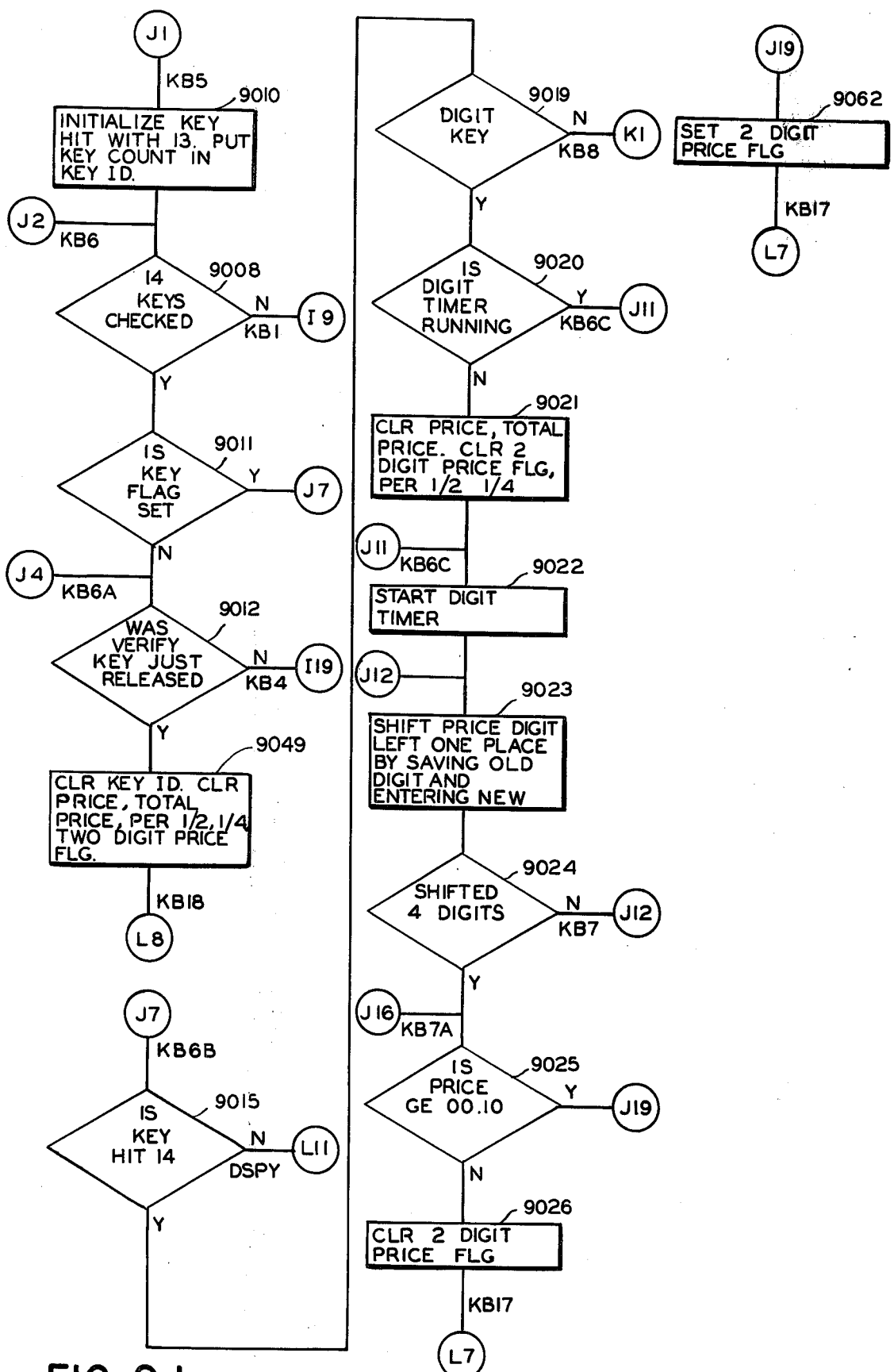
Figure 9K:
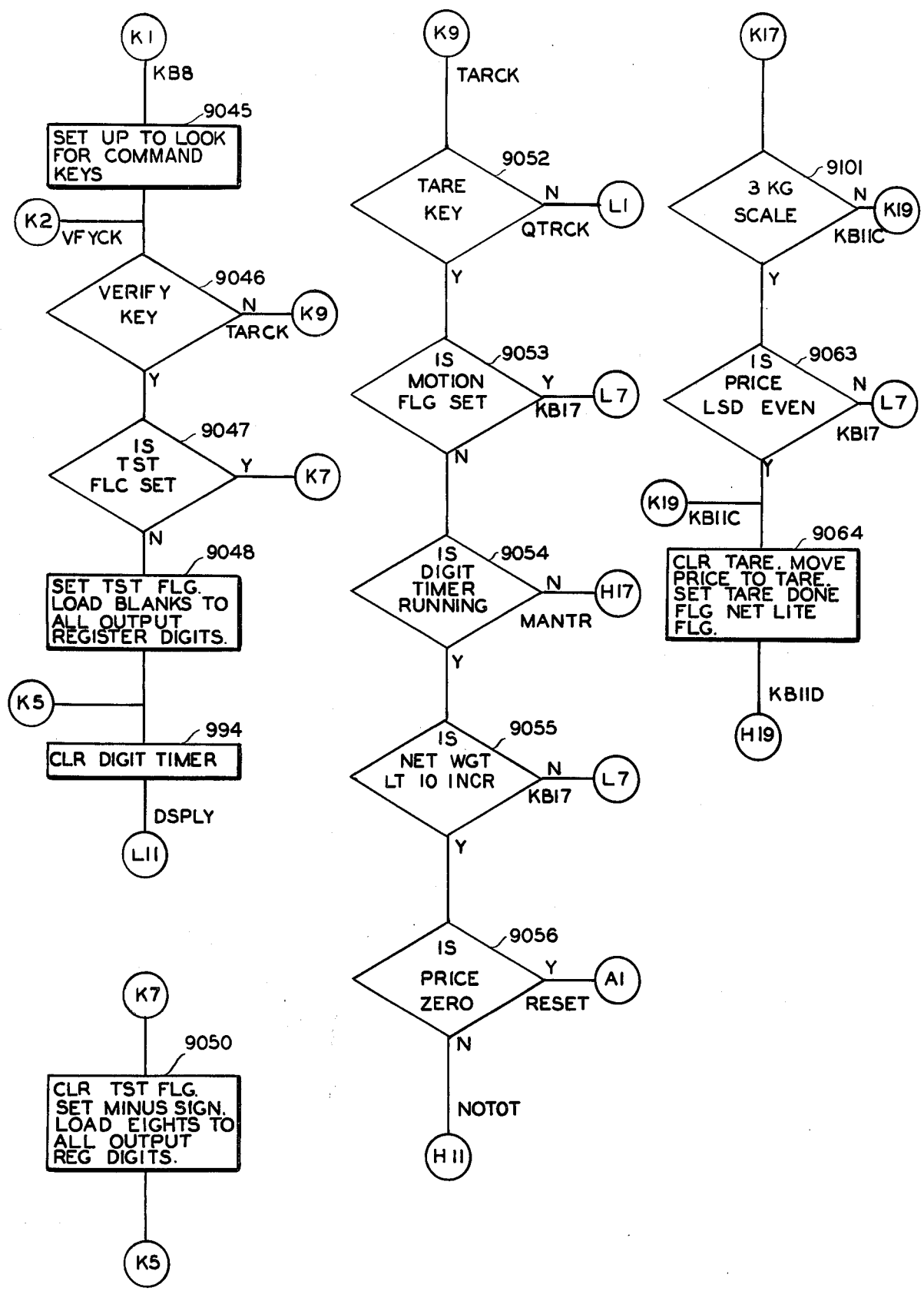
Figures 9L, 10:
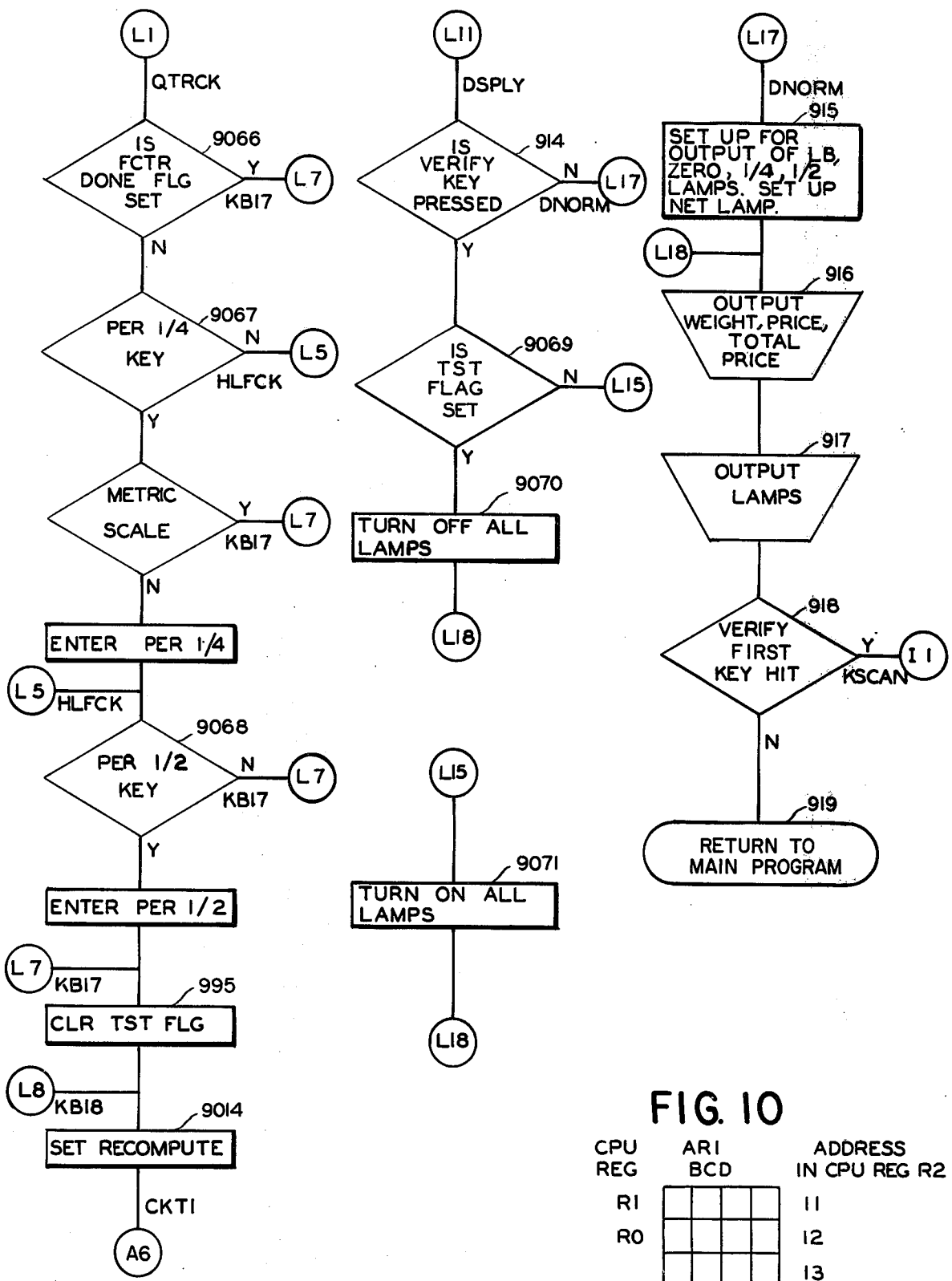
FIG. 10 shows the information stored in the ARI register spaces.

From block 941 the control advances to block 942 which directs that the keys are again scanned by the key scan KSCAN of FIG. 9I and then control transfers to the display routines of FIG. 9L in the manner described above. The control is then transferred back to the next operation of the main program which is indicated by block 943. In accordance with this block the automatic zero correction stored in the register space 813 is subtracted from the weight stored in the raw weight register. From block 943 control is advanced to block 944 and since the scale is not operating in the auto-zero inhibit mode control then advances to block 947.

In accordance with block 947 the CPU 610 determines if the weight recorded in the raw weight register 810 is less than or equal to 4 counts as heretofore processed from the analog-to-digital converter. Assuming that this weight is not less than 4 counts, the zero increment flag is updated by recording $\phi$ in the zero increment flag register 834 and then the control advances to block 945. Then since the raw weight is greater than 4 counts when the control sequence advances from block 945 to block 946, the control then transfers via transfer D1 to block 960 which causes a 4 ms delay and then control transfers to the KSCAN as indicated in block 956. After the KSCAN and the display routines as described above control returns to block 957 of the main program which transfers control to the FINDF routine.

FINDF ROUTINE

The Find Scale Factor FINDF routine is provided to first determine which of the four possible capacities is operative for the scale and second to determine the different factors required for this capacity of the scale. The routine is shown in FIG. 9H. The routine sets up a four bit word (with bits designated 8-4-2-1) in which bit 8 is zero, bit 4 is set (i.e. 1) if switch 6 is operated, bit 2 is set (i.e. 1) if switch 7 is operated, and bit 1 is zero. This value is then added to the lower half of an eight bit address which was initially set to the value FTABL (Scale factor table). The pointer may now point to any one of the places in the scale factor table FTABL as shown in the following Table C.

TABLE C

| SW Condition | SW7 Condition | Pointer Value | Scale Capacity |
|---|---|---|---|
| OFF | OFF | FTABL | 15 × .01 lb. |
| OFF | ON | FTABL+2 | 7kg × 5g |
| ON | OFF | FTABL+4 | 6 × .005 lb. |
| ON | ON | FTABL+6 | 3kg × 2g |

The factor word at the pointer address is read out and stored in the various register of the central control unit and the prior address value incremented and the next factor read out and entered in another of the central processing unit registers. These digits or words represent the various constants the computer requires for proper control of the weight output display and for descisions required for proper function and limits of operation. The factors are written in ARI Register shown at 840 in FIG. 8 from the registers in the CPU as shown in the following Table D.

TABLE D

| Scale Capacity | R6 | R7 | R0 | R1 | ARI |
|---|---|---|---|---|---|
| 15 × .01 lb. | 1 | 5 | 1 | 1 | 11015 |
| 7kg × 5g | 7 | 0 | 5 | 2 | 52070 |
| 6 × .005 lb. | 6 | 0 | 5 | 3 | 53060 |
| 3kg × 2g | 3 | 0 | 2 | 0 | 20030 |

The FACTOR is employed to multiply the raw weight to obtain the proper display weight, it is employed to determine over capacity of the scale, it is employed again to determine if the raw weight is less than 10 increments for use in the auto clear feature. The factor is also used to determine whether the final raw weight register value should be rounded to zero or five as in the 7 kg or 6 lb. mode or an even number in the 3 kg mode or not rounded for the 15 lb. capacity scale. The factor is also employed to determine the location of the decimal point depending upon the capacity of the scale.

It is also used to make sure that a keyboard tare entry is in proper scale increments. In other words the least significant digit is 0 to 5 for the 6 lb. or 7 kg capacity scale. The least significant digit of the keyboard tare entry must be even for the 3 kg capacity of the scale and may be any value for the 15 lb. capacity scale. The tare is accepted as a tare entry only if it meets these conditions of the least significant digit.

The flow chart for the FINDF routine is shown in FIG. 9H. In accordance with the first rectangle 9077 the address of the location of the first entry in the factor table stored in the memory of the computer is obtained.

Next in accordance with rectangle 9078 a four bit word using the option or mode switches numbers 6 and 7 is formed with the setting of the switches 6 and 7 in the second and third places in this four bit word. Then in accordance with rectangle 9079 this four bit word is added to the address of the first entry of the location of the factor table.

The factor table and address and information recorded therein in binary form is shown in the following Table E together with the explanation of this information.

TABLE E

| Address | Stored Information | | CPU Registers Which Receive Information | |
|---|---|---|---|---|
| FTABL | 00010101B | 15 lb. × .01 | R6=1 | R7=5 |
| FTABL+1 | 00000001B | FCTR=10 | R0=0 | R1=1 |
| FTABL+2 | 01110000B | 7kg × .005 | R6=7 | R7=0 |
| FTABL+3 | 01010010B | FCTR=50 | R0=5 | R1=2 |
| FTABL+4 | 01100000B | 6 lb. × .005 | R6=6 | R7=0 |
| FTABL+5 | 01010011B | FCTR=50 | R0=5 | R1=3 |
| FTABL+6 | 00110000B | 3kg × .002 | R6=3 | R7=0 |
| FTABL+7 | 00100000B | FCTR=20 | R0=2 | R1=0 |

Then in accordance with block 9080 CPU 610 is directed to indirectly fetch, in accordance with the address determined as above, the information recorded at the address in the factor table. This information is then stored in the computer registers R6 and 7 as indicated in the above Table E. This information is the capacity of this scale. Next in accordance with block 9081 the address or pointer is incremented by one. A second indirect fetch is made by the computer which then in accordance with block 9082 stores the information from the next position of the factor table in registers R0 and R1. This information is the factor by which weight must be modified or corrected to obtain the correct weight output indication, also to check the 10 increment value and over capacity when required as described herein.

Then in accordance with rectangle 9083 the information recorded in the registers R0, R1, R6, and R7 is recorded in the ARI register space 840 shown on FIG. 8 in the manner shown in FIG. 10. Thus, the information in register R1 is stored in the first register space in the ARI register. The information in register R0 in the CPU is recorded in the second register space in the ARI register. The information stored in R7 in the CPU is transferred to the fourth register space in the ARI register and the information in register R6 is stored in the fifth space in the ARI register. The information stored in the ARI register space is in the form of binary coded decimal information and is used at later times for determining the over capacity of this scale, the weight output indication, and other weight limits as described herein.

For example, for a 15 lb. capacity $\phi\phi\phi1$ will be recorded in the first register space in the ARI register space which is the binary coded decimal representation of one. $\phi\phi\phi\phi$ will be recorded in the second register space in ARI register representing $\phi$. $\phi1\phi1$ will be recorded in the fourth register space in the ARI register representing the binary decimal digit 5 and $\phi\phi\phi1$ will be recorded in the fifth register space in the ARI register space representing the decimal digit one.

For the 7 kg scale capacity $\phi\phi1\phi$ recorded in the first register space in the ARI register space which is the binary coded decimal representation of 2. $\phi1\phi1$ is recorded in the second register space in ARI register representing the decimal digit 5. $\phi\phi\phi\phi$ is recorded in the fourth register space in the ARI register representing $\phi$ and $\phi111$ is recorded in the fifth register space in the ARI register representing 7.

In accordance with the block 9084 address pointers are then set up for the information recorded in the ARI register space. These address pointers are shown in FIG. 10 adjacent to the corresponding register spaces in the ARI register space and comprising address numbers 11 through 15. This information is recorded in the memory register 2 and the CPU unit so that this information may be readily obtained when desired.

Next in accordance with the block 9085 the control is returned to the next order of the main program after the order directing the transfer to the FINDF routine. Thus control advances to block 958. If the scale capacity is 6 lb. or 7 kg control transfers via transfer 6D to block 962. If the scale capacity is not 6 lb. or 7 kg control transfers first to block 959 and then to block 962. Block 959 causes four millisecond delay which time is determined by counting cycles of the CPU.

In accordance with block 962 the raw weight stored in the raw weight register 810 is multiplied by the proper scale factor to obtain the proper output weight. This output weight is then restored in the raw weight register. Control then advances to block 948 where the result of the multiplication is checked to determine if there has been a carry in the sixth more significant digit place. If there has been such a carry, then control transfers via transfer F16 to blocks 9090 and 9091 where the weight output register 836 has blanks stored in it (i.e. 15 or each digit) and the total price register 822 is cleared (i.e. has 0's stored in it).

If such a carry does not occur control advances to block 963 where the control again advances through KSCAN routine of FIG. 9I as described above and then through the output routine of FIG. 9L in the manner described above. Next, in accordance with block 949 control advances through the FINDF routine of FIG. 9H in the manner described above. Then the control is returned to the next operation of the main program which operation is designated by block 964. Since the raw weight is not over capacity the control then advances to block 965. In block 965 it is determined whether or not the "zero done flag" has been set. Since, under the assumed conditions, this flag has not been set control then advances via transfer D21 to block 9034 where the price per lb., the fraction factor done flag, the per ⅛ and per ¼ registers are cleared and the 2 digit price flag is also cleared. Also the total price register 822 has blanks entered in it. From block 9034 control then advances via transfer E1 to block 9097 where the manual tare flag is cleared and the tare subtracted from the raw weight recorded in the raw weight register. Under the assumed conditions the tare is zero. Thereafter the control advances to block 9098 where the CPU operates in accordance with the routine FINDF of FIG. 9H as described above. Thereafter control is returned to the next operation of the main program designated by block 9099. In accordance with block 9099 the CPU unit is conditioned to check if the raw weight is less than or equal to two counts. Control then advances to block 9100. Since the assumed raw weight is not less than 2 counts the control then transfers by transfer E11 to block 950 where the zero light flag register 819 has 14 stored in it which causes the zero light to be turned off.

Next, since it is assumed that the raw weight is not less than or equal to ten increments, $\phi$ is recorded in the Rϕ register in the CPU 610 as indicated by block 954. Then in accordance with block 955 the carry in the CPU 610 is cleared since the auto clear register 826 does not have a 6 stored in it.

Then control advances to block 969 and since the weight is assumed to be greater than 10 increments control transfers to block 968 via transfer E20. Since ϕ is assumed to be stored in the auto clear flag register 826 control advances from block 968 to block 970 where the value ϕ in the auto clear flag register 826 is incremented by 1 to 1.

The control then advances to block 971 where the various operations of the KSCAN routine are again performed as shown in FIG. 9I and described above. The control then advances to the various display routines of FIG. 9L and then returns to the next operation of the main program designated by block 972 which causes the weight recorded in the raw weight register 810 to be rounded off to the proper value. That is, if the weight in this register is over a half of the least display increment the next higher display digit will be recorded in the raw weight register.

Thereafter the control advances to routine 973 which causes the system to progress through various operations of the FINDF routine of FIG. 9H in the manner described herein. After these operations have been performed, the control is then returned to the next operation of the main program designated by block 974. Since the scale is assumed to be operating in a 15 lb. capacity the control then transfers via transfer F3 to block 975 which causes the final raw weight stored in the raw weight register 810 to be subtracted from the output weight stored in the output weight register 836. Next control advances to block 976 and since the motion flag register is now set and has 14 recorded in it the control is transferred via transfer F1ϕ to block 977 which causes the four most significant digits of the raw weight stored in the raw weight register 810 to be transferred to the output weight register 836.

Next control advances to block 978 which causes the recompute flag 837 to be set again and the digital filter counter to be cleared by storing a ϕ in the register space 844. Then the control is transferred via transfer F19 to block 9092. Assume that the mandatory price/unit enable switch 3, FIG. 3, is not operated so the 2-digit price flag is clear. Consequently control transfers from block 9092 via F14 transfer to block 979 and, since motion blanking is not enabled, control is advanced via transfer G1 to block 980. Since the recompute flag register 837 is now set, control advances to block 981 and the KSCAN routine of FIG. 9I controls the operations of the CPU as described. This is followed by the sequences of the display routine as described above, since it is assumed that none of the keys are operated at the present time. After the sequences of the display routine have been performed control is then transferred back to the next operation of the main program which is block 982. In accordance with this block the recompute flag register 837 is cleared and control then advances to block 983 and then to block 984 and block 985. Since the output weight is not minus and the auto-zero inhibit mode switch is not actuated under the assumed conditions. Since the tare is assumed to not be mandatory, control is transferred via G8 to block 986 which causes the CPU to again advance through the FINDF routine to FIG. 9H. At the end of this routine control is turned to the next operation of the main program specified by block 987.

Block 987 causes the total price pointers and weight decimal point location to be adjusted. Then control is advanced to block 989. Since the per ½ or per ¼ switches are clear control then advances via transfer G14 to block 990. In accordance with this block the price is multiplied by the output weight and the result is rounded off. Block 991 then moves the result to the total price register 822.

Under the assumed conditions with no unit prices entered the total price is zero so the control advances through block 992 and block 993 to block 906 via transfer A6.

As described above in accordance with block 906 three of the mode switches SW6, SW7, and SW9 are read and also the condition of T1 lead and control advanced to block 907 which determines whether or not a one signal is present on the T1 lead.

By the time the control has returned to block 907 in the manner described in T1 lead usually will have the one signal removed from it and will have a zero signal applied to it by the analog-to-digital converter of the FIG. 2. As a result the control transfers to block 904 via transfer A4 and the idle routine or loop repeated as described above until the T1 lead again has a one signal applied to it by the analog-to-digital converter of FIG. 2.

When the analog-to-digital converter again applies a one signal to the T1 lead in the manner described above and when the control sequence advances to block 907 the one signal found on the T1 lead at this time causes the control sequence to advance to block 920 and then through the various routines described above with reference to the various blocks of the flow charts. When the control sequence advances to block 931, 14 is entered in the accumulator of the control unit CPU 610 in preparation for setting the motion flag register 831.

Assume now that the result of subtracting the previous raw weight from the present raw weight is equal to or less than 5 counts. Consequently, the control sequence advances to block 948 via transfer B1. In accordance with block 948 the motion flag 831 is read and under the assumed conditions 14 will be stored in this storage space so that 14 is read into the accumulator of the CPU unit 610. Next, the control is advanced to block 949.

Since the motion flag is not clear the control advances from block 949 to block 950 where the CPU 610 causes the number 14 stored in the CPU accumulator to be incremented by one so that a 15 is now stored in the accumulator. Then in accordance with block 933 the 15 is stored in the motion flag register 831. Thereafter the control sequence advances through the various routines described above and returns to block 904 via transfer A6. Then the sequences follow the idle routine or loop as described until a 1 signal is again applied to the T1 lead. Then the control sequence advances through block 920 and the subsequent blocks in the manner described above. On this cycle through the routine assuming that the weight signals received from the analog-to-digital converter of FIG. 2 have not changed by 5 counts the 15 is stored in the accumulator of the CPU as directed by block 948 will be incremented in accordance with block 950 to 16. However, since the register space 831 of the motion flag stores only 4 binary digits all zeros will be stored in this space in accordance with block 933 with the result that the motion flag is cleared since it has all zeros recorded on it. Consequently on the next sequence through the routine beginning with block 920 when the control sequence advances to block 949 the control is transferred via transfer B5 to block 934 with the result that zero or a clear signal remains stored in the motion flag register 831.

If at any time after the no motion signal is obtained as specified by block 932, the raw weight obtained by the analog-to-digital converter differs from the previous raw weight by the predetermined amount which in the exemplary embodiment described herein is 5 counts, then the control sequence advances via transfer B3 to block 933 with the result that the 14 is again stored in the motion flag register space 831 indicating a set condition of this flag. So long as the weight signals received from the analog-to-digital converter vary more than 5 counts from the previous signals in accordance with the exemplary embodiment of this invention, 14 will be continued to be stored in the motion flag register space 831 in the manner described above. If the signals received from the analog-to-digital converter do not vary more than 5 counts during three consecutive cycles of the analog-to-digital converter then the motion flag will be cleared and zeros recorded in the register space 831 in the manner described above.

KEY OPERATION

Assume now that one of the keys of the keyboard is operated or pressed. Assume, for example, that the numerical 1 key is operated. Then the next time the control sequence advances to the KSCAN subroutine as described above as shown in FIG. 9I the various pointers are initialized as indicated in block 908. Then in accordance with block 909 the ID key identify register is scanned. This register is designated 812 in FIG. 8. Since under the assumed conditions this register will have zeros recorded in it, it will not be set. the control then advances through blocks 910, 911, 912 in the manner described above wherein the keyboard keys are scanned four at a time to determine whether or not any of the keyboard keys are pressed or operated.

Under the assumed conditions, upon scanning of the first four keyboard keys, namely, 0, 1, 2, or 3 it will be determined that the one of these keys is operated with the result that the control sequence transfers from block 911 via transfer I8 to the block 9001. This block is employed first to clear the key flag of register 832 shown in FIG. 8. Since it is assumed that all zeros were recorded in these register spaces zeros will remain stored therein. In addition in accordance with block 9001 the various pointers are again initialized so that the keyboard keys will now be scanned one at a time to determine which one of the keys is operated.

In initializing pointers, one of the registers of the CPU has stored in it location of the address words designating the various groups of keys. Another one of the registers in the CPU will be employed as a key counter to identify the keys as they are being tested. From block 9001 the control sequence then advances to block 9002 and since an address of the word identifying the first group keys has not been entered in the CPU registers, control will advance from block 9002 to block 9003 where a control word designating the address of the first four keys is entered into the CPU 610. Next control advances to block 9004 where the key count in the register space in the CPU is incremented to zero to indicate that the first or zero key is scanned to be determined whether or not this key is depressed. Under the assumed conditions and it is not depressed so that when control then advances to block 9005 the sequence transfers via transfer J2 to block 9008. Since all 14 keys have not been checked control is then transferred back to block 9002 via transfer I9. Since only one of the four keys designated by the first address word have been tested it is not necessary to read a new key address word into the CPU 610 consequently control transfers to block 9004 again via transfer I11. Block 9004 causes the key count to be incremented to indicate the number one key and then control advances to block 9005. Since it is assumed that the number 1 key is depressed control then advances to block 9006 and as a result the zeros recorded in the key flag register 832 are complimented or changed to one's thus setting the key flag register. Then the control advances to block 9007 and since the key flag is now set control advances to block 9009. In accordance with block 9009 the key hit register 831 is read out and since under the assumed conditions this register is now set to all zeros control then transfers via transfer J1 to block 9010 where the key hit register is set by entering 13 in these register spaces. In addition, the key count in the CPU is transferred to the key ID register 812 indicating that the number 1 key is operated.

The control then advances to block 9008 and since all 14 keys are not checked the control then transfers via transfer I9 to block 9002. Since only two keys have been scanned there is no need to read a new key word and control therefore transfers via transfer I11 to block 9004 where the key count register in the CPU is incremented by 1 to indicate the third or number 2 key. This key is assumed not to be depressed so that when control advances to block 9005 control transfers to block 9008 via transfer J2.

Since all 14 keys have not been checked control then transfers via transfer I9 back to block 9002. Since the first four keys have not all been checked a new address key word is not required so that the control then advances via transfer I11 to block 9004 where the key count register and the CPU is incremented to indicate the next key. Thereafter, the above described routine is repeated. On the next cycle or sequence checking the keys a new key word will be required and thus the control advances from block 9002 to block 9003 where such a word is obtained and then the control advances to block 9004 and the above key checking routine repeated. These routines are then repeated once for each of the remaining keys and after all fourteen keys have been scanned and only one key found to be depressed, the control advances from block 9008 to block 9011 and since the key flag has been set, as described above, in response to finding the number 1 key depressed the control will be transferred to block 9015 via transfer J7. Since the key hit register has 13 stored in it and not 14 the control then transfers to block 914 via transfer L11 with the result that the display routines are then employed as described above. However, when control advances to block 918 of the display routine of FIG. 9L the key hit register will have 13 recorded in it indicating that this is the first KSCAN which found a key operated. Consequently, control transfers back to the KSCAN again via transfer I1 and the keys are scanned again.

Thus when control advances to block 909 the key ID register 812 will be set so the control is transferred to the individual scanning sequence via transfer I8 as described above. In accordance with this sequence the keys are scanned one at a time in the manner described above and upon finding number 1 key depressed when the control sequence is advanced to block 9005 when the number 1 key is scanned control sequence advances to block 9006 and 9007 to block 9009 in the manner described above. However, when the control sequences advance to block 9009 the key hit register 829 will not have a zero recorded in it as described above. Instead, it has 13 recorded in it with the result that the control sequence advances to block 9016. Since the number stored in the key hit register 829 is 13 and not 15, control advances from block 9016 to block 9017 where the number in the hit register 829 is incremented from 13 to 14. Next the number in the key count register in the CPU unit is compared with the number in the ID key identification register 812 and assuming that they are the same indicative that the same key is depressed, the control then transfers via transfer J2 to block 9008 and the remaining keys scanned one at a time in the manner described above. After all 14 the keys are scanned the control advances to block 9011 and then is transferred to block 9015 and since 14 is now stored in the key hit register 829 control advances to block 9019 and since a digit key, namely key 1, is assumed to be depressed the control the advances to block 9020. Under the assumed conditions the digit timer is not running, that is zeros are stored in the digit timer register space 830 of FIG. 8. Consequently the control sequence then advances to block 9021 where the price register 821 and the total price register 822 are cleared as well as the two digit price flag register space 827 and the per half and per quarter register space 825 and 824 in the status register are also cleared. Next the control sequence advances to block 9002 where the digit timer is started by entering 7 in the digit timer space register 830 of FIG. 8. Next block 9023 and 9024 are employed to enter the identity of the pressed key in the price register 821 and then the control is shifted to block 9025 since the price is not greater or equal to 00.10 the control advances to block 9026 where the two digit price flag is cleared by storing a zero in the two digit price flag register space 827. Then the control sequence is transferred via transfer L7 to block 9027 where the test flag is cleared by storing zero in the test flag register space 833 of FIG. 8 and then to block 9014 where the recompute flag is set by writing in one into the recompute flag register space 837 of FIG. 8. Thereafter, the control is transferred back to the main program via transfer A6 and the above cycles of operation repeated.

However, the next time the control sequence is transferred to the KSCAN routine, assuming that the number 1 key is still depressed the above described operations of the KSCAN are repeated until the control sequence is advanced to block 9017 of FIG. 9I the key hit register 829 is incremented so that the 14 previously recorded in this register is incremented to 15. Consequently, when the control sequence advances to block 9015 of FIG. 9J 14 is no longer recorded in this register with the result that the sequence is transferred via transfer L11 to the display routine in the manner described above. Thereafter the control is returned to the main program as described.

The next time the control is shifted to KSCAN routine and to block 9016, FIG. 9I, thereof, the number recorded in the hit register space 829 will be 15 with the result that the control is then transferred via transfer I18 to block 9018. Consequently, the key hit register 929 is not incremented so that it remains with 15 recorded in it. Thereafter, so long as the key remains operated the sequence control advances through the various routines in the manner described above.

Each time the main program sequence advances to block 965, FIG. 9D as described above, which occurs approximately 5 times a second, the zero done flag 839 will not be set. As a result, the program sequence transfers via transfer D21 to block 9034 where the price register 821, the per half flag 825, the per quarter flag 824, and the two digit price flag 827 and the fraction factor done flag 843 of status register FIG. 8 are all cleared and blanks (i.e. 15) are stored in the total price register 822 so that the identity of the value of the key depressed while initially recorded in the price register 821 is cleared therefrom a small fraction of a second after it has been recorded.

Thus, the above described sequences are repeated and as described it is impossible to enter any information from the keyboard after power is turned on and until the "Z" key is operated and maintained operated for a predetermined time. Also during this time it is necessary that the no motion condition of the scale platform or platter be maintained as will now be described.

OPERATION OF THE "Z" KEY

In order to use the scale it is necessary first to operate the "Z" key for a predetermined interval of time during which interval of time it is necessary that the no motion condition of the scale platform or platter be maintained. Such operation of the "Z" key zeros or nulls the scale and places it in condition for use and accurate weighing of anything placed on the platform or platter of the scale.

Assume now that the "Z" key is operated and maintained operated for a period of time. Also assume that the next time a 1 signal is applied to the T1 lead by the analog-to-digital converter and the above described subroutine of block 906 and extending through block 932 is employed to control a computer. Assume also that when the control advances to block 932 the difference between the previous raw weight and present raw weight is less than or equal to the predetermined limit indicating no motion which in the exemplary embodiment described herein is 5 counts. As a result control is transferred via transfer B1 to block 948 and then to block 949.

Assume further that the scale platform has been within the no motion condition sufficiently long so that the motion flag is clear. As a result when the control advances to block 949 the program transfers via transfer B5 to block 934. Thereafter the control advances from block 934 through block 939 in the manner described above.

Since the system is not operating in the expand mode (i.e. mode switch 11, FIG. 3 is not operated), control is transferred via transfer C3 to block 940, which is the beginning of the zero balance capture sequence ZCAPT.

Since under the assumed conditions the Z key is operated control is advanced to block 9027 from block 940. Since it also is assumed that the motion flag is not set, control advances from block 9027 to block 9028 and since the tare done flag is not set control advances from block 9028 to block 9029 where the zero key timer is incremented by 2. The zero key timer register space is designated 838, FIG. 8.

Under the assumed conditions zeros were previously stored in the Z key timer so that upon the incrementing of this timer by 2, 2 is stored therein in accordance with block 9029 of the flow charts FIG. 9C.

The control then advances to block 9030 and since the Z key timer register space 838 does not have zeros recorded in it, control then transfers via C12 to block 942 where control then transfers to the KSCAN as described above. Thereafter the control advances through the various blocks of the various subroutines of the KSCAN and display and then is transferred back to the main program. The control then advances through the main program as described above. It is noted that when the control advances to block 965, FIG. 9D, the Z done flag is still not set to control transfers via transfer D2, as described. The control then advances through the remainder of the main program as described herein. The control is then transferred by transfer A6 to the idle loop or routine comprising blocks 906, 907, 904, and 905 in the manner described above.

The next time a 1 signal is applied to the T1 conductor by the analog-to-digital converter the control will advance to block 920 instead of being transferred to block 904 via the A4 transfer. At this time the Z key will still be depressed so that when the control advances to block 904, as described above, control will then advance to block 9027 and since it is assumed that the motion flag is still not set control will be advanced to block 9028 and then to block 9029. In accordance with this block the Z key timer register 838 is again incremented by 2 and then the control advances through the other block subroutines as described and ultimately again returned to the idle routine via transfer A6.

Thus each time a one is received over the T1 lead from the analog-to-digital converter of FIG. 2, the Z key timer register 838 is incremented by two under control of the routines specified in block 9029.

After 8 times of progressing through the various subroutines in the manner described above the key timer register space 838 will be incremented for the 8th time and returned to zero. However, if during any of these 8 cycles through the various subroutines described above, the motion flag is set due to the fact that the difference between the present and previous raw weight is not less than or equal to 5 counts as required by the subroutines of block 932. Then during such routines when the control is advanced to block 9027 control is transferred via transfer C11 to block 941 which causes the Z key register timer space 838 to be cleared, that is, to be returned to zero. As a result the timing starts over again.

Similarly if the Z key is released before the end of the 16 counts recorded in the Z key timer 838, then when the control advances to block 940 control will be again transferred via transfer C11 to block 941 which causes the Z key timer register space 838 to be restored to zero, so that the count will have to be started over again when the Z key is reoperated.

However, assume that during the entire 8 counts, that is during 1.6 seconds, the scale platter remains at rest so the motion flag is not set and that the Z key remains operated. As a result when the control advances to block 9030, FIG. 9C, and the zero key timer spaces advance from the 14 count to zero in response to the 8th count control is advanced to block 9031 and under the assumed condition the raw weight will be less than 240 increments so that the control then advances to block 9032 where the raw weight recorded in the raw weight register 810 is transferred to the auto zero register 813 and the sign of the raw weight is transferred to the auto zero sign register 820. Thereafter the control advances to block 9033 which causes the zero done flag to be set.

That is a 15 is recorded in the zero done flag register space 839.

In addition, the price, total price, the per-half and per-quarter and the fraction factor done flag as well as the two digit price flag are all cleared by recording zeros in these various register spaces to FIG. 8.

The zero done flag can only be restored to zero by an interruption of power and then when the power is restored this register space as well as all of the other register spaces are returned to zero as described above.

From block 9033 the control sequence advances to block 941 which causes the Z key timer register 838 to be reset to zero. Then control advances to block 942 where the KSCAN routine of FIG. 9I is employed to control the sequence of operations as described above. Control is then returned to block 943. In accordance with block 943 the weight recorded in the auto zero register 813 is subtracted from the weight recorded in the raw weight register 810 and the result, which should be $\phi$ restored in the raw weight register 810. Control then advances to block 944 and since the scale is not assumed to be operating in the tare zero inhibit mode control advances to block 947. Under the assumed conditions the raw weight is less than 4 counts because in accordance with block 9032 the value recorded in the raw weight register 810 is moved to the auto zero register 813, the previous value of the raw weight recorded in the register 810 being left in this register. Then in accordance with block 943 the value in the auto zero register is subtracted from the value in the raw weight register 810 thus leaving zero recorded in the raw weight register 810. Consequently, from block 947 control advances to block 945 where the zero graduation flag is updated by recording 8 in this register space 834. Control is then advanced to block 946. Since the raw weight recorded in the raw weight register 810 is zero, control transfers to block 960 via transfer D1. In accordance with block 960 a 4 ms delay is provided. Control then advances through the routines of the main program as described above.

However, when control advances to block 965 FIG. 9D in the manner described above, the zero done flag will have been set at this time in the manner described above with the result that control is advanced to block 9035 instead of being transferred via transfer D21 to block 9034 and as a result the various registers which were cleared as described above by block 9034 are not cleared since the control does not advance to this block. Instead the control is advanced to block 9035, and since it is assumed that the motion flag is not set, control then advances to block 9036. Under the assumed conditions the zero increment flag will not be set so the control then advances to block 9037. Since the raw weight is equal to zero at this time the control advances from block 9037 to block 9038 which causes various pointers to be set up preparatory to moving the raw weight in the raw weight register 810 to the tare weight register 814. However, the weight in the raw weight register is not moved to the tare weight register at this time. Instead control advances to block 9039 and since the zero light is on at this time control advances to block 9040. In accordance with block 9040 pointers are set up in the CPU unit 610 to prepare for moving zeros in the tare register 814 back to this register. However, this operation does not take place at this time. Instead control advances to block 9041. Since the manual tare flag is not set control transfers via transfer E1 to block 9097 and then advances through the remainder of the routines of the main program.

So long as the Z key is held operated the above routines are repeated, first the idle cycles are repeated until a 1 signal is received on the T1 conductor and then the various routines of the main program are repeated as described above.

During the program cycle during which the zero done flag is set as described above, the raw weight stored in the raw weight register 810 will be less than 2 counts when control advances to block 9086 so the control then advances to block 9087. Since it is assumed that the scale is a 15 lb. scale control transfers via transfer E8 to block 966.

On previous cycles of the main program the zero light flag register 835 was set by recording 14 in this register. Consequently, control advances from block 966 to block 9076. In accordance with block 9076 the zero light flag register is incremented by one from 14 to 15 and then control advances to block 954 via transfer E12 and then through the remainder of the cycle.

On the next cycle of the main program, under the assumed conditions the zero light flag will be again incremented by 1 so zero is recorded in this register space thus causing the zero light to be turned on.

Thereafter, if the Z key is held operated the various cycles of routines is repeated as long as this key is held operated.

After the Z key is released then when control is advanced to block 940 control transfers to block 941 via transfer C11 in the manner described above and the scale is in condition for use.

Now when one of the digit keys for example number 2 is operated and the control then transferred to the KSCAN the various routines of the KSCAN as described above are employed to scan the various keys and determine which one is operated. Then the identity of this key is entered in the key identify register 812 when the control is transferred to block 9010 FIG. 9J. Later when the control is advanced to block 9022 the digit timer is started by causing a one to be entered in the digit timer register 830. Then when control advances to block 9023 the value represented by the operated key is entered in the price register 821 in the manner described above.

Still later when control has been returend to the main program and advanced to block 965 as described above the control is then advances to block 9035 since the zero done flag has been set by entering 15 in the zero done flag register 839.

Thereafter at approximately 0.2 second intervals control is advanced to the block 922 when a one signal has been received on the T1 conductor with the result that control is advanced to block 9051 which causes the digit timer to be incremented by adding one to the value recorded in the digit timer register space 830. At the end of approximately 3.2 seconds this digit timer register space will have advanced to a number 15 and then on the 16th time this register space is incremented it will be returned to the zero since it is a four-digit binary register.

If another key has not been operated during this 3.2 seconds then when another key is operated and the control advanced to block 9020, FIG. 9J the digit timer will not be running with result that control is advanced to block 9021 which causes price register 821 and also the total price register 822 and the various other flags such as 2 digit flag and the per half and per quarter register spaces will all be cleared with the result that any previous digits entered in the price register 821 are cleared and the digit designated by the operated digit key again entered in the price register space 821 and later displayed in the manner described herein.

However, if a previously operated digit key is released and another key operated before the end of this time interval which in the exemplary embodiment described herein is approximately 3.2 seconds, then when the control is advanced to block 9020 as a result of the control being advanced through the KSCAN as described above and in response to the operation of this second key, control is transferred via transfer J11 to block 9022 since the digit timer is still running. In accordance with block 9022 the digit timer is started over again by again recording a one in the digit timer register space 830. Then when control is transferred to block 9023 the digits previously recorded in the price register 821 in response to the previous operation of the digit keys are advanced to one higher denomination order space and the identity of the new operated key entered in the lowest denominational order.

KEYBOARD TARE ENTRY

In order to enter a tare weight in the scale by means of the keyboard 314, it is first necessary to operate the switch number 9 of the function switches 318 shown at the bottom of FIG. 3. If this switch is not operated it is not possible to enter a tare weight in the scale by means of the keyboard switches 314. As pointed out above the switch 9 is usually located under the scale cover and is set to provide the desired functions at the time the scale is installed. Assuming now that this switch 9 of the function switches 318 has been operated and that it is desired to enter a tare weight in the scale by means of the keyboard 314 which weight of course is subtracted from the gross weight on the scale platter to determine the net weight of the article or commodity being weighed.

Assuming that the scale has been nulled by the operation of the "Z" key for a period of greater than 1.5 seconds in the manner described above and also that the scale platter or platform is at rest and thus in the no motion condition.

Under these conditions the various digit keys of the keyboard 314 may be operated to represent the tare weight in the same manner as described above for entering a price by means of these keys. Each key when operated causes the corresponding value to be entered in the price register 821. As described above the successive keys must be operated within a time interval of approximately 3.2 seconds for each other. If this condition is met and the various digits of price or tare weight are entered in the respective register spaces of the price register 821 in the manner described. Thereafter, within a time interval of approximately 3.2 seconds after the last of the digit keys have been operated, it is necessary to operate the "T" key on the keyboard to cause value previously entered by the digit keys to be transferred to the tare register 814.

When the control is transferred to the KSCAN in the manner described above after the T key has been operated, the various keys are scanned to determine if any keys are operated, and which one, in the manner described above. When it is determined that a key has been depressed and control is transferred to block 9015, FIG. 9J, of the KB6B routine in the manner described above, it is determined whether or not the key hit register has 14 stored in it. When the key hit register space 829 has 14 stored in it, as it will have the second time, the control is transferred to the KSCAN after the "T" key has been operated, control advances from block 9015 to block 9019. At this time since a digit key has not been depressed but instead the "T" key, control is transferred via transfer K1 to block 9045 which block is employed to set the initial pointers to look for the command keys and determine which one of the command keys has been operated. From block 9045 control advances to block 9046 and since the verify key "V" of the keyboard has not been operated control is transferred via transfer K9 to block 9052. Under the assumed conditions the tare or T key is operated so control advances to block 9053. Again it is assumed that the motion flag is not set indicating that the scale platform platter is at rest; as a result control is then advanced to block 9054.

If the motion flag is set, indicating motion of the scale platter, control is transferred via transfer L7 to block 995, then block 9014 and then via transfer A6 to the main program so the operation of the T key is ineffective.

Since it is assumed that the T key was pressed within the time interval, which in the exemplary embodiment described herein, is assumed to be of the order of 3.2 seconds, control advances to block 9055. Since the net weight on the scale is assumed to be less than 10 increments of weight, control will advance from block 9055 to block 9056. Again as indicated above it is assumed that the various keys on the keyboard 314 have been operated to enter a tare weight which weight was entered in the price register spaces 821. Consequently, when the control advances to block 9056 the price entered in this register is not zero with the result that control is transferred via transfer H11 to block 9057. It was assumed above that the keyboard tare switch 9 at the bottom of FIG. 3 was operated so that control advances from block 9057 to block 9058.

However if switch 9 shown at the bottom of FIG. 3 was not operated then control would transfer via transfer H19 to block 9065. Since control later advances to this block operation in response to this block will be described below.

Since the net light flag has not been set control will advance from block 9058 to block 9059 where the FINDF routine is employed to control an operation of the scale. As described above this routine is employed to determine the setting of the mode switches 6 and 7 at the bottom of FIG. 3 which defines the capacity of the scale. Under the assumed conditions the scale is operating as a 15 pound capacity so that when control advances to block 9060 after the routine FINDF control is transferred via transfer K17 to block 9101.

Had the scale been operated in the 6 pound or 7 kilogram limits, control would have advanced to block 9061 instead of block 9101 where it would have been determined that whether or not the least significant digit in the price register was a 5 or 0. If it was not a 5 or 0 then control would have transferred via transfer L7 to block 995 and the information in the price register 821 would not be transferred to the tare register 814. Instead control would advance through block 995 and 9014 and transfer A6 back to the main program. If the least significant digit is not a 0 or a 5 it indicates that a mistake was made in entering a tare weight because the least graduation for these capacities is a 0.005 lb. or 5 g so this least significant digit of a tare weight should be a 0 or a 5.

Under the assumed conditions the control transfers to block 9101 via transfer K17. Since the scale is not operating as a 3 kilogram scale control again transfers via transfer K19 to block 9064. If the scale was operating as a 3 kilogram scale, control would advance to block 9063 instead of block 9064 where it would be determined whether the least significant digit and the price register 821 is even. If this digit was odd the control would advance via transfer L7 to block 995 with result that the information in the price register 821 would not be transferred to the tare register 814 as described above. When the scale has a capacity of 3 kg the least graduation is 2 g so the tare weight should have an even last digit.

However, since the scale is operating as a 15 pound scale under assumed conditions, control transfers from block 9060 FIG. 9H to block 9101 and then to block 9064 via transfer L19 as described above with the result that the tare register 814 is first cleared and then the values recorded in the price register 821 are moved to the tare register and the tare done flag is set by recording a 1 in the tare flag register space 815 shown in FIG. 8. In addition, the net light flag is set by recording a 1 in the net light flag register space 817 of FIG. 8 so that the net light will be energized on the next display routine.

From block 9064 control is advanced via transfer H19 to block 9065 where the price register 821, total price register 822 are cleared by recording zeros in these register spaces. In addition the per half, per quarter and the 2 digit price flag are all returned to zero by recording zeros in the register spaces 825, 824 and 827 of FIG. 8. In addition, zeros are recorded in the auto clear register space 826 and the factor done flag register spaces 843.

From block 9065 control is then transferred via transfer L1 to block 9066. Since under the assumed conditions the factor done flag is not set control advances to block 9067. Since the per quarter key is not set the control transfers from block 9067 via transfer L5 to block 9068. Since the per half switch is not operated the control transfers from block 9068 via transfer L7 to block 995 where the test flag is cleared by recording a zero in the test flag register space 833. Control then advances to block 9014 which causes the recompute flag to be set by recording any value other than zero and the recompute flag register spaces 837. From block 9014 control transfers back to block 906 of the main program via transfer A6.

The next time the control is transferred to the KSCAN sequence as described above, assuming that the tare key T of FIG. 3 is still operated, the control advances through this routine in the manner described above, to block 9017 where the key hit register 829 is incremented and advanced to 15. Thereafter the control advances through this sequence in the manner described above. On the succeeding times the control is transferred to the KSCAN routine key hit register 829 is maintained at 15 so long as the T key is held operated. The operation of the system in response to the KSCAN routine is substantially as described above.

Upon the release of the T key and the transfer to the KSCAN subroutine the operation is as described above when no keys are operated.

If it is desired to enter a price in the system at this time, price may be entered in the same manner as described above by the operation of the various keys of the keyboard 314 with the result that the price will be entered in the price register 821.

However, it is impossible to change the value entered in the tare register 814 at this time by again operating the T key of keyboard 314. Instead if the T key is again pressed then when control is advanced to block 9058 in the manner described above the net light flag will be set with the result that control is transferred via transfer H19 to block 9065 which causes the price register 821 to be cleared, the total price 822 to be cleared as well as the autoclear flags and factor done flag by recording zeros in the corresponding register spaces 826 and 843. In addition, the per-half and per-fourth register spaces 825 and 824 are also cleared by registering zeros in these spaces. Thereafter control is transferred via transfer L1 to block 9066 and then to the block 906 via transfer A6 in the manner described above. Thus not only is the tare register 814 maintained with previously entered tare recorded therein but in addition the value of the price entered in the register 821 is cleared and the register restored to zero. Thus it is not possible to again enter another tare or change the tare at the last moment in an effort to defraud the customer.

Likewise, it is impossible to remove the tare weight entered in the tare register 814 by the operation of the Z key of the keyboard at this time. Should the Z key be operated the control advances to the various routines as described above when the Z key was operated. However, when control is advanced to block 9028 FIG. 9C the tare done flag will be set with the result that the control transfers via transfer C11 to block 941 which causes the Z timer to be reset. Consequently, no matter how long the Z key is operated the Z timer is immediately reset every 2 tenths of a second so that operations of the Z key at this time produces no change in any information recorded in any of the register spaces.

If tare is mandatory, (i.e. switch 630 FIG. 6 is not operated), then each time a 1 signal is received on the T1 conductor from the analog-to-digital converter of FIG. 2, control will advance to block 922. The digit timer 830 will be running for only 3.2 seconds after each key is operated, at all other times it will not be running so it will be zero. Thus 3.2 seconds after any key has been operated this timer will not be running. Consequently control advances to block 926 via transfer A15 as described above. If the digit timer is running, indicating that a digit key has just been operated, then the control sequence advances to block 9051 and this timer register incremented by one. If the count in the timer advances from 15 to 0 then the carry in the CPU 610 is set. If the count does not advance from 15 to 0 then the carry is not set. In either case control advances to block 923. If the carry is not set control transfers to block 926 via transfer A15 as described. If carry is set the control advances to block 924. If tare has been entered (if the tare done flag 815 is set) control will transfer to block 926 via transfer A15. However if the tare done flag 815 is not set then control advances to block 925. If tare is mandatory control will transfer to the RESET routine block 900 via transfer A1. Consequently the price register is cleared in accordance with block 902 so under these circumstances (i.e. tare mandatory, the tare done flag set, and the digit timer advances from 5 to zero) price cannot be entered until tare is entered. However, once the tare done flag has been set as described above, then control will advance from block 925 to block 926 and the following routines as described herein.

MANUAL TARE

In addition to entering tare by means of the keyboard as described above, it is also possible to manually enter tare weight. In manually entering tare an empty container or tare weight is placed on the scale and the T key operated which causes the weight of the container or tare weight to be entered in the tare register 814 and the displayed weight to be 0 with the tare weight or container on the scale platter or platform. However, once tare is entered either by means of the keyboard or by manual arrangement described below it is impossible to change tare until the weighing operation is completed or until the tare weight register 814 and the tare done flag 815 are cleared.

Assume now that an empty container is placed on the scale platter or platform and that the tare key T is operated. When the container is placed on the scale and then scale comes to rest, its weight will be indicated in the usual manner. When the control is transferred to the KSCAN via transfer I1 from the main program as described above after the T key is operated, the various routines of the KSCAN will be employed to control the system. During this first KSCAN when control is advanced to block 9015, FIG. 9J, in the manner described above, the key hit register 829 will have 13 entered in it and not 14 with the result that the control transfers to block 914 via transfer L11. Since the verify key V was not pressed control then transfers via transfer L17 to the display blocks 915 through 918. In block 918 however, since this is the first hit or first time the control has been transferred to the KSCAN after any key has been operated control transfers via transfer I1 back to the beginning of the KSCAN. Thereafter the various routines of the KSCAN are employed to control the system in the manner described above. This time when control is advanced to block 9015 the key hit register 829 will have 14 stored in it with the result that control then advances through blocks 9015, 9019 and transfer K1 to blocks 9045 and 9046. Control then transfers via transfer K9 to block 9052 and since the tare key has been assumed to be operated, control then advances to block 9053. Under the assumed conditions the motion flag will not be set indicating that the scale platter or platform is not in motion with the result that control advances to block 9054. Under the assumed conditions where the T key was pressed without any of the other keyboard keys having been previously pressed or operated the digit timer will not be running. In other words, zero will be recorded in the digit timer register 830. Consequently, from block 9054 control is transferred via transfer H17 to block 9072. Inasmuch as it is assumed that tare had not been previously entered by the keyboard in the manner described above, the net light flag register 817 will not be set. In other words, zero will be recorded in the net flag register space 817.

However, if tare had been previously entered and the net flag set by having a one recorded in the register space 817, then control will transfer via transfer L7 to block 995 and 9014 and then via transfer A6 back to the beginning of the main program. When the control advances to block 9015 on the next KSCAN the key hit register 829 will have 15 recorded in it so control transfers via transfer L11 to the display routines and then back to the main program. On each of the succeeding KSCAN routines during which the T key is held operated the key hit register 829 will have 15 recorded in it so the various routines described above are repeated.

Thus the operation of the T key is ineffective to enter manual tare when the net lamp is on.

Assume now that the net light flag has not been set so that zero is recorded in the net light flag register space 817. As a result control advances from block 9072 to block 9073 where the manual tare flag is set by recording one in the manual tare flag register space 818.

The program then advances to block 9065 where the price and total price, registers 821 and 822 are cleared by recording all zeros in these register spaces. In addition, the per ½ and per ¼, the two digit price, the auto clear and the factor done flag register spaces are also cleared by recording zeros in the respective register spaces. Thereafter the control transfers via transfer L1 to block 9066. Since the factor done flag has been cleared the control then advances to block 9067 and since the per ¼ register space 824 is clear, i.e. the per ¼ key is not pressed, control then transfers via transfer L5 to block 9068 and since the per ½ key register space 825 is clear, i.e., the per ½ key is not pressed, control transfers via transfer L7 to block 995 which causes the test flag to be cleared by recording a zero in register space 833. Next control advances to 9014 where the recompute flag is set by recording a non-zero value in the recompute flag register spaces 837.

Thereafter the control is transferred via A6 transfer to block 906 of the main program where the various routines of the main program are employed to control the operation of the system. So long as the T key is held operated, each time the control is transferred to the KSCAN routines of FIG. 9I as described above, the key hit register 829 will have a 15 recorded in it with the result that when the control advances to block 9015 the control will then transfer via transfer L11 to block 914 and the remaining portions of the display routines employed to control the system in the manner described above.

However, when the control advances to block 965, FIG. 9D, the zero done flag will be set so that the control will advance to block 9035. Since under the assumed conditions the motion flag is not set control advances to block 9036. If a motion flag were set indicating that there was motion on the scale platform the control will transfer via transfer E1 to block 9077 with the result the various registers indicated by the block are cleared and then control advances through the various routines described herein. In addition, by thus transferring control the operation of the T key is not effective to enter tare.

However, assuming that the motion flag is not set, control advances to block 9036. Since the zero increment flag will not be set because the scale will not be indicating zero since an empty container or tare weight is on the scale platform or platter the control will advance to block 9037 and since the raw weight will be greater than zero control advances to block 9038. In accordance with block 9038 various pointers are setup to move the raw weight to tare after which the control advances to block 9039. Since the zero increment flag is not set, control transfers to block 9041 via transfer D18. The manual tare flag was set as described above in response to the operation of the tare key so that control advances to block 9074 with the result that the tare done flag is set by recording a one in the register space 815. Also the net light flag is set since the scale is not within the zero graduation. Also the recompute flag is set by recording one in the register space 837. Thereafter control advances to block 9075 which directs the movement of the raw weight recorded in the raw weight register 810, which will be the weight of the empty container, to the tare register 814. The control then advances to block 9034 where the price register is cleared as well as the two digit price flag and fraction factor done register flag. Control then transfers to block 9077 via transfer E1. In accordance with block 9097 the manual tare flag is cleared by recording a zero in the register space 818 and the tare weight in the tare register 814 is then subtracted from the raw weight in the raw weight register 810 which register thereafter will have zero recorded in it. The control then advances through the various blocks of the main program as described herein.

Thereafter so long as the tare key is held operated the various routines of the main program and the KSCAN routines are employed to control the system in the manner described above. The operator or attendant however, upon noting lighting of the net lamp will release the T key with the result that the various register space is controlled by the key KSCAN routines are returned to idle or normal condition wherein no keys are operated and the scale is in condition for weighing an article or commodity in the container on the platform or platter of the scale.

At this time the unit price may be entered from the keyboard in the manner described above after which the desired weight of the commodity may be measured.

If the T key is operated when nothing is on the platter so the zero lamp is lighted and there is no motion of the platter, i.e. the lb. or kg lamp is lighted and the net light flag is not set, zero tare will be entered in the tare register 814. When the T key is operated when the scale is in its zero and no motion condition the system works substantially as described above except that when the control advances to block 9036 the zero increment flag will be set, i.e. register 834 has 8 in it, so control transfers via transfer D15 to block 9038 where pointers are setup to move the weight stored in the raw weight register 810 to the tare register 814. Control then advances to block 9039 and since the zero increment flag is set control advances to block 9040 where the pointers are changed and setup to move or record zeros to the tare register 814. Thereafter control advances as described above. However, when control advances to block 9074 the zero light is on, so the net light flag is not set. Instead the zero light remains on. Then when control advances to block 9075 zeros are entered or registered in the tare register 814. Thereafter the system operates as described herein.

While as pointed out above once tare has been entered and the tare done flag register 839 set it is not possible to change the tare, it is nevertheless possible to clear the tare register and tare done flag register 839 and then start another weighing operations by first operating the numeral 0 key and then the tare or T key within 3.2 seconds providing the net weight on the scale is zero or less than a predetermined amount, such as 10 increments.

When control is advanced to block 9020 upon the operation of the numeral 0 key the digit timer will not be running so control advances to block 9021 and the price and total price registers are cleared as well as the other designated registers as described above. Then control is advanced to block 9022 so the digit timer is started. The control then advances through the various routines as described herein. Then if the numeral 0 key is released and the T key operated within 3.2 seconds, then when control advances to block 9054 the digit timer will be running so control advances to block 9055.

If the net weight on the scale is equal to or greater than 10 increments control transfers via transfer L7 to blocks 9027 and then to block 9014 and then transfers back to the main program via transfer A6. As a result the operation of the T key is ineffective.

However if the net weight on the scale is less than 10 increments at this time control advances to block 9056 and since zero price is now entered in the price register 821 due to the previous operation of the numeral 0 key, control transfers to block 900 of the reset routine via transfer A1 and through to block 901 so the tare register 814 and the tare done flag register 839 are both cleared. Thereafter the various routines are employed to control the system so another weighing operation may be performed.

OPERATION OF THE V KEY

Verification key V on the keyboard 314 is employed to verify that the display segments and lamps are all functioning properly. The first operation of this key causes all of the display lamps to be extinguished or put out. If any of the lamps are defective or permanently on they will remain on thus indicating a defective circuit arrangement. However, if all the lamps are extinguished on the first operation of the V key it indicates that none of the lamps or segments are permanently illuminated. The V key is then released and reoperated which causes all of the lamps and segments to be turned on. If any or all of them are not turned on it indicates faulty operation or burned out lamps or segments. If, however, all of the lamps segments are on and display 8 in every digit position and the lamps are all on the lamp and segments and their associated control circuits are operating properly.

Assume now that the verification key V is operated. The next time a control is transferred to the KSCAN after this key is operated the various routines of the KSCAN are employed to scan the keys and determine that the verification key has been operated. Thus when the control is transferred to block 9010, FIG. 9J the first KSCAN after the V key is operated 13 is stored in the key hit register 829 and the identity of verification key V stored in the KEY ID register 812. Control then advances through the remainder of the KSCAN and the display routines to block 918, FIG. 9L. Since 13 is recorded in the key hit register 829 indicating the first scan after a key is hit, control returns at once to the KSCAN via transfer I1. During this second KSCAN the key hit register 829 is incremented to 14 in accordance with block 9017. The control then advances as described above. Then when the control advances to block 9015, FIG. 9J, 14 is stored in the key hit register 829 so control advances to block 9019. Control is transferred via transfer K1 to block 9045 since a digit key was not operated but rather the verification key. From block 9045 control is advanced to block 9046 and since it is assumed that the verification key is operated control advances to block 9047 which tests the test flag register space 833. Since this register space is clear and not set at this time, control advances to block 9048 which causes 15 to be entered in this register space 833. In addition, blanks (i.e. 15) are loaded into all of the digit spaces of the output registers 836, 821, and 822, and then control advances to block 994 which causes the digit timer to be cleared by entering zeros in the digit timer register space 830.

Thereafter control is transferred via transfer L11 to the display routine beginning with block 914 as described above with the result that control advances to block 9069. Since the TST flag is set (i.e. 15 is recorded in the test flag register space 833) under the assumed conditions, control will then advance to block 9070 which causes all of the light flags to be conditioned to turn off the respective lamps, then control is transferred to block 916 via transfer L18. Control then advances through blocks 916 and 917 to block 918 in the manner described above. Inasmuch as blanks (i.e. 15) are stored in all the digit spaces of registers 836, 821, and 822 all of the segments of the displays 514 and 515 are turned off. Also all the lamps 430 are turned off due to the off indications stored in the respective flag register spaces. Control then advances to block 918 since 13 is not now stored in the key hit register 829, control advances to block 919 and then back to the main program as described. The KSCAN is then repeated so long as the verification key V is depressed. The key hit register is incremented to 15 on successive cycles as described and then remains at 15 for the remainder of the time during which verification key is held operated.

However, the first time the control is transferred to the KSCAN after the V key is released and control advances to block 909, FIG. 9I, the identity of the V key is still entered in the key ID register space 812, so control will be transferred via transfer I8 through block 9001 and the subsequent blocks in the manner described above during which the keys of the keyboard are scanned. At this time since none of the keys are depressed key flag register space 832 will not be set. Instead it will have been cleared in accordance with block 9001, FIG. 9J. Since the key flag is not set when control advances the block 9011, control then advances to block 9012. Since the identity of the V key is still stored in the key ID register space 812 this together with the fact that the key flag is not set indicates that the verify or V key was just released with the result that the control advances to block 9049 where the ID key register space 812 is cleared and so is the price, total price, the per ½, per ¼ and two digit price flag cleared. Thereafter, control transfers via L8 to block 9014 where the recompute flag 837 is set by having a non-zero value entered in this register space.

In accordance with block 9049 zeros are recorded in the price register space 821 and the total price 822 register spaces, these zeros will be displayed when the control advances through the display routines. Also when the new weight indication is received from the analog-to-digital converter this weight will be transferred to the output weight register space 836 with the result that this new weight indication will be displayed in the manner described herein.

From block 9014 control is transferred via transfer A6 back to the main program and the various routines as described above are employed to control the system.

If the V key is again pressed without any of the other keys being pressed or operated between the previous release of the V key and the reoperation of this key then upon the reoperation of the V key and the second transfer of control to the KSCAN, FIG. 9I, the various subroutines of the KSCAN are employed to control the system in the manner described above. However, when control is advanced to block 9047 at this time the test flag was previously set by having 15 recorded in the test flag register space 833 in response to the first operation of the V key in the manner described above. As a result control will transfer via transfer K7 to block 9050 where the test flag is cleared by recording zeros in the test flag register space 833. In addition, the minus sign is set by recording a 1 in the OUT WGT. SIGN register space 842. Eights are stored in all digit spaces of the output weight register space 836, the price register spaces 821, and the total price register spaces 822. Thereafter control is transferred via transfer K5 to block 994 where the digit timer register space 830 is cleared by having zeros recorded in it and then control advances to block 914 via transfer L11.

At this time the identity of the V key is recorded (block 9010) in the key identity space ID 812 with the result that control now advances to block 9069 and since the test flag register space 833 has been cleared control advances via transfer L15 to block 9071 which causes ones to be entered in the various register spaces to control the various lamps 430 shown at the top of FIG. 4.

Thereafter control advances via transfer L18 to block 916 and the subsequent blocks 917 which causes the various displays and lamps to be all turned on. As a result all of the lamps and every one of the segments of both displays should be turned on. If any of the lamps or segments are not turned on this indicates to the attendant a trouble condition so the scale should not be employed.

So long as the V key remains depressed the above subroutines of the KSCAN are employed to control the displays in the manner described above so that all of the lamps and display segments remain on.

Upon the release of the V key control will be transferred to blocks 9012 and 9049 of the KSCAN in the manner described above with the result that the key identity register ID 812, the price and total price registers are all cleared as are the per half, per quarter, and two digit price flags with the result that zeros will be displayed in the price and total price and the various lamps turned out in the manner described after which control returns to the main program.

WEIGHING AND COMPUTING OPERATIONS

In the foregoing description the no-motion operation was briefly described. This operation is similar to that disclosed in the application of R. C. Loshbough, Ser. No. 573,242, filed Apr. 30, 1975, which application is incorporated herein by reference.

In addition, it was assumed that the scale was on zero indication at the time of the various tare entries as described above. The zero compensation employed in the present scale arrangement is similar to that deposed in patent application of R. C. Loshbough, et al, Ser. No. 573,149, filed Apr. 30, 1975, which application is incorporated herein by reference.

Briefly as indicated above, a signal is applied to the T1 conductor by the analog-to-digital converter shown in FIG. 2, approximately every 2/10's of a second. At these times the control of the system usually is advancing through the idle loop comprising blocks 904, 905, 906 and 907. The next time after a 1 signal is applied to the T1 conductor, indicating that a new raw weight reading or measurement is available, control will be transferred to block 920 which transfers control to the KSCN and display routines and then back to the succeeding blocks 921, 922 to block 926, 927, 928 and 929, which cause the new weight reading to be read out from the analog-to-digital converter of the FIG. 2 and stored in the raw weight register 810, shown in FIG. 8 in the RAM 0 designated 611 in FIG. 6.

After the five digits of the new weight have been read out of the analog-to-digital converter and stored in the raw weight register 810, the previous raw weight stored in the register 811 is subtracted from the present raw weight block 930 and then the CPU is conditioned to set the motion flag register 831, in accordance with block 931. Control then advances to block 932 which determines whether or not the difference between the two raw weights is less than or equal to some predetermined value, 5 counts in the exemplary arrangement described herein. If motion is present, that is if this difference is greater than 5 counts control transfers to block 933 via transfer B3 and the motion flag is set by recording 14 in the motion flag register space 831. This operation takes place each time a new weight is read out which is approximately every 2/10's of a second. Thereafter control advances through the various routines of the program in the usual manner as described. On the other hand if the difference between the previous raw weight and the present raw weight is less than or equal to 5 counts then control advances via transfer B1 to block 948 which causes the condition of a motion flag stored in the motion register 831 to be read out. Thereafter in accordance with block 946 the motion flag is checked to determine if it is clear. Since the first time that the indication is within the 5 count limitation, the motion flag will not be clear so that control will advance to block 950 which conditions the CPU unit to prepare to increment the number stored inthe motion flag 831. Then in accordance with block 933 the motion flag is updated which will cause the 14 to incremented and 15 stored in the motion register 831. Thereafter the program control advances through the various routines as described. If, when the next weight is read out, the difference between the new weight reading and the previous one is still equal to or less than 5 counts then the motion flag register 831 will be again augmented from 15 which caused this register to be set to zero and thus cleared. Thereafter the control advances through the various routines in the manner described. If, at any time, the difference between the succeeding raw weight and the previous raw weight exceeds the limitation of 5 counts then the motion flag 813 will have a 14 recorded in it indicating that motion is present on the scale platform or platter in which case the various routines respond to this condition as described.

After the scale is nulled or zeroed by operating the Z key and maintaining this key operated for the predetermined interval of time, during which interval there is no motion, provision is also made for returning the scale to 0 after each weighing and maintaining it on 0 until the next weighing operation. The operations employed to return the scale to 0 and maintain it on 0 once it has returned to 0 until the next weighing operation are similar to the automatic zero correcting arrangements disclosed and described in U.S. Patent Application of R. C. Loshbough et al, Ser. No. 573,149, filed Apr. 30, 1975, which application is included herein by reference.

Briefly for each weight measurement received from the analog-to-digital converter of FIGS. 3 when a signal is applied to the T1 lead the control advances through the main program in the manners described herein. Thus with the no motion flag clear when the program advances to block 949 control transfers via transfer B5 to block 943 and then through the various block 935 through 939. Since the scale is not operating in the expand mode, control then transfers via transfer C3 to block 940. Since the Z button is not now pressed control then transfers via C11 to blocks 941, 942, to block 943, where the value in auto zero register 813 is subtracted from the raw weight recorded in the raw weight register 810 and the result returned to the raw weight register 810. Since the scale is not operating in the auto zero inhibit mode, control advances from block 943 through block 944 to block 947. The block 947 determines whether or not the corrected raw weight received from the analog-to-digital converter is within four counts. Then in accordance with block 945 the zero increment flag or register 834 is updated. If the raw weight register shows a raw weight which is less than or equal to 4 counts the zero increment register is set by having 8 recorded in it. Whereas if the raw weight register shows a raw weight which is greater than 4 counts the zero graduation register 834 is cleared by having a zero recorded in it.

In accordance with block 946 if the weight recorded in the raw weight register at this time is greater than 4 counts, it indicates that the scale is not within the auto correcting range. If the count stored in the corrected raw weight register is not within this range then the control transfers via transfer B1 to block 960 and the remainder of the program controls the system depending upon the various conditions and factors as described herein.

If, however, the corrected raw weight is equal to 4 counts or less but not equal to 0 then the weight range is within the auto correcting range which is assumed to be 4 counts in the exemplary embodiment described herein and control advances to block 951 which causes the weight recorded in the auto zero register 813 to be incremented one count towards the corrected raw weight recorded in the raw weight register 810. The result is then placed in the multiplication and subtraction result register 841 and then control advances to block 952. In accordance with block 952 the result recorded in the result register 841 is checked to be sure that the value recorded in the auto zero is within the auto zero range of 240 counts received from the analog-to-digital converter. If the result is now within this range then the control transfers via transfer D2 to block 956 and the control then advances through the remainder of the program without changing the value recorded in the auto zero registers 813.

However, if the value recorded at this time in the result register 841 is less than 240 counts or increments received from the analog-to-digital converter then control advances to block 953 where the value in the auto zero register 813 is updated and the new value which is the old value incremented by 1 count towards the corrected raw weight is now re-recorded in the auto zero register 813 where it will be used during the next cycle of the main program. Thereafter control transfers via transfer D2 to block 956 and then through blocks 957, 958 and 959 to block 962 in the manner described herein. In accordance with block 962 the raw weight from the raw weight register 810 is multiplied by the factor obtained from the FIND subroutine and returned to the raw weight register 810. This value is the value which has not been corrected in accordance with the capacity of the scale. From block 962 control advances to block 988 and if the multiplication causes a carry into the sixth more significant digit place this sixth digit will not be 0 then control transfers via transfer F16 to block 9090 and 9091 where the output weight is blanked and the total price register cleared. Thereafter the program returns to the idle routine via transfer A4.

However, if this sixth digit is 0 then the control advances through blocks 963, 9095, 964, to 965 as described. Since the zero done flag is now set control then advances to block 9035. The motion flag will not be set at this time so control will then advance to block 9036. If the zero increment flag is set control transfers via transfer D15 to block 9038. However, if the zero increment flag is not set then control advances to block 9037 and if the raw weight is minus then the control transfers via transfer E1 to block 9077. If the raw weight is not minus at this time, then control will transfer to block 9038 where pointers are setup in the CPU unit 610 to prepare to move the raw weight from the raw weight register 810 to the tare register 814. Thereafter control advances to block 9039 where the zero increment flag is again read and if this flag is not set control transfers via transfer D18 to block 9041. However, under the assumed conditions, the scale is within the zero increment so control advances to block 9040 so the CPU 610 is now changed to prepare to enter zeros in the tare register 814 and since there are already 0's there the zeros in the tare will be used to re-enter them in the tare register 814. Next the control advances to block 9041 and since under the assumed conditions the manual tare flag is not set control transfers to block 9077 via the transfer E1. In accordance with block 9097 the manual tare flag is cleared. Since it was already cleared it merely means that zero is re-recorded in this register space 818. In addition, the tare from the tare register 814 is subtracted from the raw weight and the result is re-recorded in the raw weight register 810. Next the routine advances to 9098 where the FINDF subroutine is again employed and then control returned to the main program block 9099 which sets up the proper number of counts to check the raw weight to determine if it is less than or equal to two counts. Next control advances to block 9100 and if the raw weight is not less than or equal to 2 counts the control transfers to block 950 via transfer E11 where the 14 is recorded in the zero light flag 836 which causes the lamp to be turned off if it was previously on. If the raw weight is less than or equal to 2 counts then the program control advances to block 9087 and if the scale is a 15 pound or a 3 kg capacity, control transfers to block 966 via transfer E8. If the scale is not a 15 lb. or 3 kg capacity but instead is the 7 kg or 6 lb. capacity then control advances to block 9088.

If the first four most significant digits of the weight are zero then control transfers from block 9088 via transfer E8 to block 966. If these four most significant digits are not zero then control advances from block 9088 to block 9089. If the fifth or least significant digit of the weight is zero control will advance to block 966. However, if this digit is not zero then control transfers via transfer E11 to block 950 where 14 is entered in the zero light register 835 thus ensuring that the zero lamp is turned off or remains off.

Returning now to block 966, if the zero light flag is zero thus indicating that the lamp is turned on, control will transfer from block 966 via transfer E12 to block 954. If zero is not registered in the zero light flag 835, then control advances from block 966 to block 9076 which increments the number stored in the zero light flag register 835. Then the control advances via transfer E12 to block 954 and then through the remainder of the main program subroutines as described herein.

Assume now that a weighing operation has been completed and the scale returns to approximately zero and then a weight signal on the T1 lead is received and the raw weight from the analog-to-digital converter read into the raw weight register 810 in the manner described herein. Thereafter when control is advanced to block 932 as described, assume that the result of comparing this raw weight with the previous raw weight is not equal to or less than 5 counts so that control will be transferred by transfer B3 to block 933 with the result that 14 will be recorded in the motion flag register 831 indicating motion of the scale platform. Assume also that when the control advances to block 943 and that the value stored in the auto zero register 813 is subtracted from the raw weight and that the control advances to block 947, the corrected raw weight will be equal to 4 counts with the result that the control is advanced to block 945 and the zero increment flag register space 834 updated by recording 8 in it. Then control advances to block 946 and since the corrected raw weight is equal to 4 counts control then advances to block 951 which causes an adjustment to be made to the value stored in the auto zero register space 813 by incrementing this value one count towards the value of the corrected raw weight. Later when control then advances to block 953 the information recorded in the auto zero register space 813 is updated so that upon the next cycle the corrected raw weight will be equal to 3 counts.

When the control then advances to block 9086, FIG. 9E, the corrected raw weight will not be less than or equal to 2 counts so that the control advances via transfer E11 to block 950 where 14 is recorded in the zero light flag 819 thus causing this zero lamp to be turned off or maintained off.

On the next cycle of operation of the main program, after another raw weight has been received from the analog-to-digital converter, assume that the difference between this raw weight and the previous raw weight is less than 5 counts so that when control advances to block 932 a control will be transferred via transfer B1 to block 948 and then to blocks 949, 950 and 933 with the result that the 14 recorded in the motion flag register 831 is incremented by 1 so that 15 is now recorded in this motion flag register space. Also, when the control advances to block 946, 951, 952 and 953, the value recorded in the auto zero correction register space 813 will again be incremented 1 count towards the raw weight. Furthermore when the control advances to block 9086 the corrected raw weight on this cycle is still greater than 2 counts so the control transfers via transfer E1 to block 950 with results described above. Thereafter control advances through the various routines of the remainder of the main program in the manner described.

Now in the next or third cycle of operation of the main program the comparison between the 3rd raw weight read out and previous raw weight will again be less than 5 counts so that the motion flag is again updated by incrementing the 15 by 1 which causes the number stored in the motion flag register space 831 to be zero since this is a four digit binary register space and on incrementing 15 by 1 to 16 or zero causes the zero to be recorded in this space indicating that the motion register flag is now clear. In addition when control advances to block 946, 951, 952 and 953, the weight recorded in the auto zero register 813 in incremented another count towards the weight recorded in the raw weight register. However, when the control advances to block 9100 during this third cycle of the main program the corrected raw weight will be equal to two counts so that the control advances to block 9087 and then via transfer E8, and block 966 to block 9076. Since the number recorded in the zero light flag register 819 is 14 at this time, the 14 is incremented to number 15. Thereafter control advances via transfer E12 to block 954 and then through the remainder of the various routines of the main program as described.

On the fouth cycle of the operation of the main program assuming that the raw weight readout still is within the 5 count limit of the previous raw weight the motion flag will remain clear and when control advances to block 946, 951, 952 and 953 the auto zero register space 813 will again be incremented one count towards the corrected raw weight so that upon the next or fifth cycle the corrected or raw weight should be zero. In addition when control advances to block 9076 in the manner described herein the zero light flag register 819 is again augmented 1 so that the 15 is augmented by 1 has become 16 or 0 thus causing the zero lamp to be turned on. Thus indicating that the scale is in condition for making the next weight measurement.

With one of the various tare functions performed if required and the zero light on the scale is in condition for making a weight measurement. Of course, if tare is mandatory then tare must be entered. If tare is not mandatory then tare may or may not be entered. Also, the price per unit pound must be entered if this is required. If it is not required then it need not be entered in order to make a weight measurement.

Assume now that tare has been entered and that the scale is on zero with the net light lighted and that a commodity or article is placed upon the scale platform to be weighed. Upon the next signal received over the T1 conductor the weight indication will be received from the analog-to-digital converter and entered in the raw weight register 810 in the manner described. This change in weight will cause the motion flag to be set. In addition the weight will be greater than 4 counts so that the auto zero register will not be augmented because control will be transferred by a transfer D1 to block 960 instead of advancing the block 951 from block 946, FIG. 9C. In addition, when the net weight exceeds 10 increments and the control advances to block 9055 in FIG. 9K during a KSCAN, control will be transferred via transfer L7 to block 9027 instead of being advanced to block 9056 with the result that the tare key if it should be operated will be ineffective to alter or change any tare weight entered in the scale. In addition, the zero light is turned off because the raw weight will not be less than 2 counts when the control advances to block 9086, FIG. 9E, in the manner described herein. Also the auto clear flag will be incremented when control advances to block 970, FIG. 9E, because the weight is not less than 10 increments when control advances to block 969 and then to block 968 via transfer E20.

When the scale comes to rest with the article on the platform and remains motionless for 2 cycles of the main program as described herein the motion flag is cleared. Also, the raw weight is multiplied by the proper factor in accordance with block 962 of FIG. 9D and the tare weight subtracted from the raw weight in accordance with block 9097 of FIG. 9E. Also, the raw weight is rounded off as required by the scale capacity. The zero light is turned off since the raw weight is greater than 2 counts when control advances to block 9086 so control transfers via transfer E11 to block 950. In addition, after 6 cycles of the main program with the weight in excess of 10 display increments the auto clear flag is incremented to 6 and remains at 6 so long as the weight remains on the scale. In addition, the digital filter counter, 844 and FIG. 9F, is incremented toward 3 and after 3 cycles this counter will equal 3 with the result that the new weight will be transferred to the output weight register and displayed.

If the mode switch number 3 is operated making it mandatory for a unit price to be entered then the unit price must be entered before an article or commodity may be weighed. If it is attempted to weigh an article or commodity under these conditions without entering a unit price the weight will be blanked out when the indicated weight exceeds a predetermined value. Thus, after the final raw weight has been rounded off when control advances to blocks 972, 973, and 974 control is then transferred via transfer F3 to block 975. In accordance with block 975 the final raw weight is then subtracted from the previous output weight and the result employed to control the digital filter counter register space 844 and then to check the 2 digit price flag 827. When control is transferred to block 9092 and if the switch 3 is operated control advances to block 9093. If the net weight is equal to or greater than 10 increments control advances to block 9094. If switch 3 is not operated or if the net weight is less than 10 increments control transfers to block 979 and then to block 980 as described. However, in accordance with block 9094 control transfers via transfer F16 to block 9090 if the two digit price flag is not set indicating that only one digit of price has been entered. Block 9090 causes the weight out to be blank and block 9091 clears the total price and then transfers control via transfer A4 to the idle routine thus preventing operation of the scale until at least two digits of unit price have been entered. If the full unit price is entered or not required the weight is employed to compute the total value from the cost per unit price. Control is transferred via transfers F14 and G1 and as a result both the unit price and the total value are displayed.

When the weight or article is removed from the scale, the scale will return to the zero condition where the above described zero operations are performed. If the auto clear switch is enabled then the tare is automatically cleared. If this switch is not enabled the tare weight remains stored in the tare register 814. In order to change the tare under these circumstances it is necessary to first operate the numeral zero key followed by the T or tare key as described above.

All of the various operations of the scale are clearly shown in the flow diagrams of FIGS. 9A through 9L inclusive. In addition, an exemplary list of orders have been included as an appendix hereto. This listing shows the individual orders which are stored in the various ROM's of the computer and the orders are subdivided into routines which are designated and which designations are shown on the flow diagram in order that the relationship between the orders and the flow diagrams may be clearly understood.

A P P E N D I X

SYMBOL TABLE

| ACLCK | 0169 | ADD   | 02EE | ARICL | 02FF | BLNK1 | 01E9 |
|-------|------|-------|------|-------|------|-------|------|
| CAPCK | 0206 | CKDLY | 00F3 | CKMTN | 01E1 | CKRCP | 01F1 |
| CKT1  | 0014 | CLRSB | 0301 | CLRT  | 0359 | CMPUT | 020D |
| CPBTP | 024E | CRTAZ | 00DC | CZTIM | 00BA | DFLT2 | 01CE |
| DFLT3 | 01D3 | DGFLT | 01AF | DLAY4 | 028A | DNORM | 03B1 |
| DPSCN | 03CF | DSPLK | 0490 | DSPLY | 0395 | DVFY  | 03C3 |
| D1    | 03E2 | EWSGN | 02BA | FINDF | 0370 | FTABL | 0368 |
| GWMCK | 0113 | HLFCK | 04F4 | IDLE  | 000D | IDLLK | 01EF |
| INCZL | 015F | KB0   | 040E | KB1   | 0415 | KB11B | 04CB |
| KB11C | 04CE | KB11D | 04E1 | KB17  | 04F8 | KB18  | 04FB |
| KB2   | 0420 | KB4   | 0439 | KB5   | 043F | KB6   | 0444 |
| KB6A  | 044B | KB6B  | 0455 | KB6C  | 0468 | KB7   | 046D |
| KB7A  | 0474 | KB8   | 047B | KSCAN | 03F7 | LDMEM | 027D |
| LTMAX | 02A0 | MANTR | 04DA | MAXAZ | 0291 | MCRET | 02B8 |
| MFCTR | 00FF | MGCHK | 02A8 | MINMI | 02EB | MOV4  | 0391 |
| MOV5  | 0343 | MTFCK | 012E | MULT  | 030B | MULT1 | 0310 |
| MULT2 | 0316 | MULT3 | 031F | MULT4 | 0322 | MULT5 | 032C |
| MULT6 | 0338 | NIXZL | 0166 | NMOTN | 0056 | NOTEQ | 02B3 |
| NOTOT | 04AA | PRCMP | 0227 | PRXWT | 0234 | QSCAN | 0401 |
| QTRCK | 04E5 | RDINP | 0360 | RDT1  | 0351 | RESET | 0000 |
| RETN  | 030A | RETRN | 0269 | RNDOF | 025D | RNDWT | 018A |
| RNDW1 | 01AB | RNDW2 | 01AD | RNDX5 | 01A2 | ROFF1 | 0262 |
| ROFF2 | 0266 | RSTLK | 0183 | SDONE | 02F5 | STARE | 013A |
| STMIN | 027A | STRSB | 0281 | SUB   | 02CE | SUBAZ | 00BF |
| SUBTR | 02C2 | SUB1  | 02CF | SUB2  | 02DC | SWSGN | 0340 |
| TARCK | 0493 | UDMTN | 005A | UDTGT | 005F | VBLLK | 024A |
| VBLNK | 01ED | VFCKA | 048C | VFYCK | 047E | WBLNK | 01E6 |
| WMGCK | 02A6 | WREAD | 0035 | WTOUT | 026A | XIDLE | 008D |
| ZCAPT | 0097 | ZLITE | 0143 |       |      |       |      |

PROGRAM

```
                    1          TITLE '8401 DCS MULTI-CAPACITY CANDY-DELI'
                    2          ;*        *        *        *        *        *
                    3          ;LOGIC 1 PCB SWITCH ASSIGNMENTS (NAME DEFINES ON)
                    4          ;SW1-    NOT USED-TURN OFF
                    5          ;SW2-    TARE OPTIONAL
                    6          ;SW3-    MANDATORY PRICE/UNIT ENABLE
                    7          ;SW4-    TWO DIGIT PRICE INTERLOCK ENABLE
                    8          ;SW5-    AUTO CLEAR ENABLE AT 10 DISPLAY INCREMENTS
                    9          ;SW6-    SCALE CAPACITY 1
                   10          ;SW7-    SCALE CAPACITY 2
                   11          ;SW8-    MOTION BLANKING ENABLE
                   12          ;SW9-    KEYBOARD TARE ENABLE
                   13          ;*        *        *        *        *        *
                   14          ;    CAPACITY             SW6(CAP1)        SW7(CAP2)
                   15          ;15 LB X .01  LB             OFF              OFF
                   16          ; 7 KG X 5 G                 OFF              ON
                   17          ; 6 LB X .005 LB             ON               OFF
                   18          ; 3 KG X 2 G                 ON               ON
                   19          ;*        *        *        *        *        *
0000   2819        20  RESET:  FIM   8,11001B
0002   2A30        21          FIM   10,110000B
0004   5359        22          JMS   CLRT         ;CLEAR TARE
0006   524E        23          JMS   CPBTP        ;CLR PR,FCTR,2 DIG PR FLG,BLNK TPR
0008   29          24          SRC   8
0009   E7          25          WR3                ;CLR AUTO CLR FLG
000A   2B          26          SRC   10
000B   D3          27          LDM   3
000C   E4          28          WR0                ;SET RECOMPUTE
000D   2C0A        29  IDLE:   FIM   12,10D
000F   FA          30          STC
0010   53F8        31          JMS   KSCAN+1      ;17.5 MS(DISP=13.7)
0012   528C        32          JMS   DLAY4+2      ;5.2 MS
0014   5351        33  CKT1:   JMS   RDT1         ;RD SW6,SW7,T1,SW9
0016   1A0D        34          JNC   IDLE
0018   53F8        35          JMS   KSCAN+1
001A   D6          36          LDM   6D
001B   5361        37          JMS   RDINP+1      ;RD SW4,8,5,3
001D   A2          38          LD    2
001E   E4          39          WR0
001F   D7          40          LDM   7D
0020   5361        41          JMS   RDINP+1      ;RD ZCAP,X10,AZINH,SW1
0022   A2          42          LD    2
0023   F6          43          RAR                ;FORM 0,ZCAP,X10,AZINH
0024   E5          44          WR1
0025   2223        45          FIM   2,100011B
0027   23          46          SRC   2
0028   E9          47          RDM                ;RD DIG TIMER
0029   142D        48          JZ    $+4          ;JMP NOT RUNNING
002B   F2          49          IAC
002C   E0          50          WRM                ;UPDATE DIG TIMER
002D   EF          51          RD3                ;RD TARE DONE
002E   F5          52          RAL                ;CZ:TARE NOT DONE,AN:TIMER JUST 0
002F   1F00        53          JCN   15D,RESET    ;JMP IF AN*CZ*TN
                   54          ;CLR SCALE IF TIMER JUST DONE,T REQ,NO T DONE
0031   2E2B        55          FIM   14,101011B
0033   2200        56          FIM   2,0D
0035   D8          57  WREAD:  LDM   8D
0036   23          58          SRC   2
0037   E1          59          WMP                ;PULSE A/D WGT DIG ADVANCE
0038   D5          60          LDM   5D
0039   E1          61          WMP
003A   F1          62          CLC
003B   EA          63          RDR                ;RD DIG SLCT
003C   F4          64          CMA
003D   FC          65          KBP
003E   93          66          SUB   3            ;SUB REQ SLCT
003F   1C35        67          JNZ   WREAD        ;JMP NOT RIGHT
0041   E4          68          WR0                ;CLR SUBTR SIGN STATUS
0042   D4          69          LDM   4D
0043   E1          70          WMP
0044   EA          71          RDR                ;RD WGT DIG
```

```
0045  F4    72          CMA
0046  E0    73          WRM              ;STORE IN RAW WGT
0047  63    74          INC   3
0048  7F35  75          ISZ   15,WREAD   ;LOOP 5 TIMES
004A  52C0  76          JMS   SUBTR-2    ;SUB PREVIOUS FROM INIT RAW
004C  2214  77          FIM   2,10100B
004E  245B  78          FIM   4,1011011B ;TEST FOR 5
0050  52AB  79          JMS   MGCHK      ;CK FOR RES <=00005
0052  2B    80          SRC   10
0053  DE    81          LDM   14D        ;PREPARE TO SET MOTN FLG
0054  1A5A  82          JNC   UDMTN      ;JMP IF IN MOTN
0056  E9    83  NMOTN:  RDM              ;RD MOTN F
0057  145F  84          JZ    UDTGT      ;JMP CLR
0059  F2    85          IAC              ;INC TOWARD 0
005A  E0    86  UDMTN:  WRM              ;UPDATE MOTN F
005B  D3    87          LDM   3D
005C  E4    88          WR0              ;SET RECOMPUTE
005D  29    89          SRC   8
005E  E0    90          WRM              ;SET DIG FLTR CNTR = 3
005F  2200  91  UDTGT:  FIM   2,0D
0061  2405  92          FIM   4,5D
0063  5343  93          JMS   MOV5       ;UPDATE TARGET WITH RAW WGT
0065  52FF  94          JMS   ARICL
0067  242D  95          FIM   4,101101B
0069  29    96          SRC   8
006A  EE    97          RD2
006B  F5    98          RAL              ;PUT CAPACITY 1 IN C
006C  D5    99          LDM   5D         ;DIG INIT = 500
006D  1A70  100         JNC   $+3        ;JMP OF 15LB OR 7KG
006F  D9    101         LDM   9D
0070  25    102         SRC   4          ;DIG INIT = 900
0071  E0    103         WRM              ;ENTER DIG INIT OF 500 OR 900
0072  52C0  104         JMS   SUBTR-2    ;SUB INIT FROM RAW WT
0074  5340  105         JMS   SWSGN
0076  242D  106         FIM   4,2DH
0078  52A6  107         JMS   WMGCK      ;LK FOR WT > 002XX
007A  ED    108         RD1              ;RD RAW WGT SIGN
007B  167F  109         JCN   6,$+4      ;JMP AZ+CN,WT PLUS OR <=2XX
007D  41E6  110         JUN   WBLNK      ;WT MINUS AND >2XX
007F  29    111         SRC   8
0080  ED    112         RD1
0081  F6    113         RAR
0082  F6    114         RAR              ;PUT X10 EXPD IN C
0083  1A97  115         JNC   ZCAPT      ;JMP IF CLR
0085  2200  116         FIM   2,0D
0087  526C  117         JMS   WTOUT+2    ;MOVE LS4D WT TO OUT
0089  220B  118         FIM   2,11D
008B  5301  119         JMS   CLRSB      ;CLR AZ REG
008D  53F8  120 XIDLE:  JMS   KSCAN+1
008F  528C  121         JMS   DLAY4+2    ;5.2 MS DELAY
0091  5351  122         JMS   RDT1       ;READ T1
0093  128D  123         JC    XIDLE      ;HOLD HERE IF T1 STILL SET
0095  4000  124         JUN   RESET
0097  F6    125 ZCAPT:  RAR              ;CONT RIGHT TO LOOK FOR ZERO KEY
0098  1ABA  126         JNC   CZTIM      ;JMP NOT PRESSED
009A  2B    127         SRC   10
009B  E9    128         RDM              ;RD MOTN FLG
009C  1CBA  129         JNZ   CZTIM      ;JMP IF SET
009E  2F    130         SRC   14
009F  EF    131         RD3
00A0  F6    132         RAR              ;PUT NET LITE FLG IN C
00A1  12BA  133         JC    CZTIM      ;NO ZERO ALLOWED IN NET
00A3  2621  134         FIM   6,100001B
00A5  27    135         SRC   6
00A6  E9    136         RDM              ;RD Z KEY TIMER
00A7  F2    137         IAC
00A8  F2    138         IAC
00A9  E0    139         WRM              ;UPDATE Z KEY TIMER
00AA  1CBF  140         JNZ   SUBAZ      ;JMP NOT TIMED OUT
00AC  2204  141         FIM   2,4D
00AE  5291  142         JMS   MAXAZ      ;CHK FOR < 240 INCS
00B0  1ABF  143         JNC   SUBAZ      ;JMP OF >= 240
00B2  ED    144         RD1              ;RD RAW WT SGN
00B3  E7    145         WR3              ;UPDATE AZ SGN
00B4  67    146         INC   7
```

```
00B5  27     147        SRC   6
00B6  DF     148        LDM   15D
00B7  E0     149        WRM                    ;SET Z DONE FLG
00B8  524E   150        JMS   CPBTP            ;CLR PR,FCTR,2 DIG PR FLG,BLNK TPR
00BA  2621   151 CZTIM: FIM   6,100001B
00BC  27     152        SRC   6
00BD  F0     153        CLB
00BE  E0     154        WRM                    ;CLR Z KEY TIMER
00BF  53F7   155 SUBAZ: JMS   KSCAN
00C1  2D     156        SRC   12
00C2  EF     157        RD3                    ;RD AZ SIGN
00C3  E4     158        WR0                    ;ENTER TO SUBTR SGN STAT
00C4  220B   159        FIM   2,11D
00C6  52BA   160        JMS   EWSGN            ;SUB AZ FROM WT
00C8  5340   161        JMS   SWSGN
00CA  29     162        SRC   8
00CB  ED     163        RD1
00CC  F6     164        RAR                    ;PUT AZ INH IN C
00CD  12F3   165        JC    CKDLY            ;JMP IF SET
00CF  244B   166        FIM   4,1001011B
00D1  52A6   167        JMS   WMGCK            ;CK FOR <= 4 CNTS
00D3  2224   168        FIM   2,100100B
00D5  23     169        SRC   2
00D6  F6     170        RAR
00D7  E0     171        WRM                    ;Z GRAD FLG=8:<=4 CNTS,0>4 CNTS
00D8  F5     172        RAL                    ;RESTORE MGCHK CONDITIONS
00D9  F3     173        CMC                    ;CZ IF <= 4 CNTS
00DA  16F3   174        JCN   6D,CKDLY         ;JMP WT 0(AZ) OR> 4 CNTS(CN)
00DC  52FF   175 CRTAZ: JMS   ARICL
00DE  2D     176        SRC   12
00DF  EF     177        RD3                    ;RD AZ SGN
00E0  F6     178        RAR                    ;PUT IN C
00E1  ED     179        RD1                    ;RD RAW WT SGN
00E2  F4     180        CMA                    ;COMPL
00E3  F5     181        RAL                    ;PUT IN AZ SGN
00E4  E4     182        WR0                    ;WRITE TO SUBTR SGN
00E5  23     183        SRC   2
00E6  D1     184        LDM   1D
00E7  E0     185        WRM                    ;WRITE A 1 TO ARI
00E8  240B   186        FIM   4,11D
00EA  52C2   187        JMS   SUBTR            ;ADJUST AZ BY 1
00EC  E7     188        WR3                    ;UPDATE AZ SGN
00ED  2214   189        FIM   2,10100B
00EF  5291   190        JMS   MAXAZ            ;CHK RESULT < 240
00F1  40F5   191        JUN   CKDLY+2          ;SKIP DELAY
00F3  528A   192 CKDLY: JMS   DLAY4            ;4 MS DELAY
00F5  53F7   193        JMS   KSCAN
00F7  5370   194        JMS   FINDF
00F9  A1     195        LD    1                ;R1=0:3KG,1:15LB,2:7KG,3:6LB
00FA  F6     196        RAR
00FB  1CFF   197        JNZ   MFCTR            ;JMP 7KG OR 6LB
00FD  528A   198        JMS   DLAY4
00FF  6A     199 MFCTR: INC   10               ;MULT 5 DIGS
0100  208E   200        FIM   0,10001110B      ;MULT BY 2 DIGS
0102  530D   201        JMS   MULT+2           ;MULT BY PROPER FACTOR
0104  63     202        INC   3
0105  5341   203        JMS   MOV5-2           ;UPDATE RAW WGT
0107  23     204        SRC   2
0108  E9     205        RDM                    ;RD MULT 6TH DIG RES
0109  1CE6   206        JNZ   WBLNK            ;OVERCAP IF NOT 0
010B  53F7   207        JMS   KSCAN
010D  5370   208        JMS   FINDF
010F  52C2   209        JMS   SUBTR            ;CK FOR OVERCAP
0111  14E6   210        JZ    WBLNK            ;JMP IF OVERCAP
0113  2222   211 GWMCK: FIM   2,100010B
0115  23     212        SRC   2
0116  E9     213        RDM                    ;RD Z DONE FLG
0117  1438   214        JZ    STARE-2          ;JMP IF NO Z DONE SINCE PWR UP
0119  2B     215        SRC   10
011A  E9     216        RDM                    ;RD MOTN FLG
011B  1C3A   217        JNZ   STARE            ;JMP IF SET
011D  2424   218        FIM   4,100100B
011F  25     219        SRC   4
0120  E9     220        RDM                    ;RD Z GRAD FLG
0121  F5     221        RAL                    ;CN IF WITHIN 0 GRAD
```

```
0122  2D            222          SRC   12
0123  ED            223          RD1                    ;RD RAW WT SGN
0124  1E3A          224          JCN   14D,STARE        ;JMP AN*CZ,WT NEG AND NOT 0 GRAD
0126  F3            225          CMC                    ;CZ IF WITHIN 0 GRAD
0127  2F            226          SRC   14
0128  2200          227          FIM   2,0D
012A  122E          228          JC    MTFCK            ;JMP NOT WITHIN 0 GRAD
012C  2225          229          FIM   2,100101B
012E  EE            230 MTFCK:   RD2                    ;RD MAN TARE FLG
012F  143A          231          JZ    STARE            ;JMP IF CLR
0131  F5            232          RAL                    ;HAVE 8 IF IN 0 GRAD, 9 IF NOT
0132  E7            233          WR3                    ;SET TARE DONE
0133  2B            234          SRC   10
0134  E4            235          WR0                    ;SET RECOMPUTE
0135  65            236          INC   5
0136  5343          237          JMS   MOV5             ;WT:NOT 0GRAD, 0:0GRAD TO TARE
0138  524E          238          JMS   CPBTP            ;CLR PR,FCTR,2 DIG PR FLG,BLNK TPR
013A  52FF          239 STARE:   JMS   ARICL
013C  E6            240          WR2                    ;CLR MAN TARE FLG
013D  2225          241          FIM   2,100101B
013F  52BA          242          JMS   EWSGN            ;SUB TARE FROM RAW WGT
0141  5340          243          JMS   SWSGN            ;MOVE RES TO RAW WT
0143  5370          244 ZLITE:   JMS   FINDF
0145  240B          245          FIM   4,0BH
0147  A0            246          LD    0                ;R0=1:15LB,2:3KG,5:7KG,6LB
0148  F5            247          RAL                    ;DOUBLE
0149  FB            248          DAA                    ;DECIMAL ADJUST
014A  B4            249          XCH   4                ;R4=2:15LB,4:3KG,0:7KG,6LB
014B  1A4F          250          JNC   $+4              ;JMP NOT 7KG OR 6LB
014D  64            251          INC   4                ;R4=1:7KG,6LB
014E  65            252          INC   5                ;WANT 4 CNTR
014F  F7            253          TCC                    ;PUT C IN ACC
0150  B0            254          XCH   0                ;R0=0:15LB,3KG;1:7KG,6LB
0151  52A6          255          JMS   WMGCK            ;CK FOR WT <=2 CNTS
0153  1A66          256          JNC   NIXZL            ;JMP IF GREATER
0155  A0            257          LD    0                ;RE-LD R0
0156  145F          258          JZ    INCZL            ;JMP IF 15LB OR 3KG
0158  A4            259          LD    4                ;R4=0 IF HAD 0001X
0159  1C5F          260          JNZ   INCZL            ;JMP IF HAD 0000X
015B  23            261          SRC   2
015C  E9            262          RDM                    ;RD WWWWX
015D  1C66          263          JNZ   NIXZL            ;JMP NOT 0
015F  2B            264 INCZL:   SRC   10
0160  ED            265          RD1                    ;RD Z LITE FLG
0161  1469          266          JZ    ACLCK            ;JMP IF WAS 0
0163  F2            267          IAC                    ;INC TOWARD 0: ON
0164  4168          268          JUN   $+4              ;GO UPDATE
0166  DE            269 NIXZL:   LDM   14               ;TURN OFF Z LITE
0167  2B            270          SRC   10
0168  E5            271          WR1                    ;UPDATE Z LITE FLG
0169  222D          272 ACLCK:   FIM   2,101101B
016B  5301          273          JMS   CLRSB
016D  222A          274          FIM   2,101010B
016F  52BA          275          JMS   EWSGN            ;CK FOR AUTO CLR WT
0171  29            276          SRC   8
0172  B0            277          XCH   0                ;R0=1 IF <BAND, 0 IF>=BAND
0173  EF            278          RD3                    ;RD AUTO CLR FLG
0174  8D            279          ADD   13               ;CN IF WAS 6
0175  A0            280          LD    0
0176  1485          281          JZ    RSTLK+2          ;JMP >= AUTO CLR BAND
0178  D0            282          LDM   0D
0179  E7            283          WR3                    ;CLR AUTO CLR FLG
017A  1A8A          284          JNC   RNDWT            ;JMP <BAND*FLG < 6
017C  1983          285          JT    RSTLK            ;MUST CLR IF TARE REQ
017E  EC            286          RD0
017F  F6            287          RAR
0180  F6            288          RAR                    ;PUT AUTO CLR ENB IN C
0181  1A8A          289          JNC   RNDWT            ;JMP IF DISABLED
0183  4000          290 RSTLK:   JUN   RESET
0185  128A          291          JC    RNDWT            ;JMP >= BAND*FLG = 6
0187  EF            292          RD3
0188  F2            293          IAC
0189  E7            294          WR3
018A  53F7          295 RNDWT:   JMS   KSCAN
018C  5370          296          JMS   FINDF
018E  A1            297          LD    1
```

```
018F  1495  298          JZ   $+6           ;SKIP RNDOFF IF 3KG
0191  2200  299          FIM  2,0D
0193  525D  300          JMS  RNDOF         ;ROUND OFF 5 DIG WT LSD
0195  2201  301          FIM  2,1D
0197  23    302          SRC  2
0198  A1    303          LD   1             ;R1=0:3KG,1:15LB,2:7KG,3:6LB
0199  F8    304          DAC
019A  14AF  305          JZ   DGFLT         ;JMP IF 15LB
019C  12A2  306          JC   RNDX5         ;JMP IF 6LB OR 7KG
019E  E9    307          RDM                ;3KG, RD 4 DIG LSD
019F  F6    308          RAR                ;PUT ODD BIT IN C
01A0  41AD  309          JUN  RNDW2
01A2  DC    310 RNDX5:   LDM  12D           ;6LB, CN
01A3  EB    311          ADM                ;ADD 4 DIG LSD,CZ IF 3
01A4  1AAA  312          JNC  RNDW1-1       ;JMP < 3
01A6  8D    313          ADD  13            ;CN, ADD 10, CZ IF LSD < 8
01A7  D5    314          LDM  5D
01A8  1AAB  315          JNC  RNDW1         ;JMP < 8
01AA  D0    316          LDM  0D
01AB  E0    317 RNDW1:   WRM                ;UPDATE LSD WITH 0 OR 5
01AC  63    318          INC  3
01AD  5262  319 RNDW2:   JMS  ROFF1         ;RND OFF NSD
01AF  A6    320 DGFLT:   LD   6
01B0  B0    321          XCH  0             ;R0=6;6LB,7:7KG,1:15LB,3:3KG
01B1  2201  322          FIM  2,1D
01B3  2434  323          FIM  4,110100B
01B5  2ACC  324          FIM  10,0CCH       ;SET UP 4 DIG SUBTR
01B7  52C4  325          JMS  SUBTR+2       ;SUB RAW WT FROM OUT WT
01B9  2B    326          SRC  10
01BA  E9    327          RDM                ;RD MOTN FLG
01BB  1CCE  328          JNZ  DFLT2         ;JMP IF SET
01BD  240C  329          FIM  4,12D
01BF  A0    330          LD   0
01C0  B4    331          XCH  4
01C1  2213  332          FIM  2,10011B
01C3  52A8  333          JMS  MGCHK         ;CHK FOR SUBTR RES>R0
01C5  29    334          SRC  8
01C6  14D5  335          JZ   DFLT3+2       ;JMP IF RES WAS 0
01C8  1ACE  336          JNC  DFLT2         ;JMP IF >R0
01CA  DC    337          LDM  12D           ;CN: DIG FLTR CNTR+12+1
01CB  EB    338          ADM                ;CK FOR DIG FLTR CNTR = 3
01CC  1AD3  339          JNC  DFLT3         ;JMP NOT 3
01CE  526A  340 DFLT2:   JMS  WTOUT         ;MOVE RAW WT TO OUT
01D0  E4    341          WR0                ;SET RECOMPUTE
01D1  29    342          SRC  8
01D2  E0    343          WRM                ;SET DIG FLTR CNTR=15
01D3  E9    344 DFLT3:   RDM                ;RD DIG FLTR CNTR
01D4  F2    345          IAC
01D5  E0    346          WRM                ;UPDATE DIG FLTR CNTR
01D6  EC    347          RD0
01D7  F4    348          CMA
01D8  F5    349          RAL                ;CN IF 2 DIG PR INT DSBLED
01D9  B0    350          XCH  0             ;SAVE REST OF STATUS
01DA  EF    351          RD3                ;RD AUTO CLR FLG,AZ:<10 GRAD NET
01DB  2B    352          SRC  10
01DC  16E1  353          JCN  6D,CKMTN      ;JMP AZ+CN,<10 GRAD OR INT DSBLED
01DE  EF    354          RD3                ;RD 2 DIG PRICE FLG
01DF  14E6  355          JZ   WBLNK         ;JMP IF NOT 2 DIGS IN PRICE
01E1  A0    356 CKMTN:   LD   0
01E2  F5    357          RAL                ;CN IF MOTN BLANK DSBLED
01E3  E9    358          RDM                ;RD MOTN FLG
01E4  16F1  359          JCN  6,CKRCP       ;JMP AZ+CN,NO MOTN OR BLNK DSBLD
01E6  2232  360 WBLNK:   FIM  2,110010B
01E8  DF    361          LDM  15D
01E9  527D  362 BLNK1:   JMS  LDMEM         ;LD BLANKS TO OUT WGT
01EB  7DE9  363          ISZ  13,BLNK1      ;LOOP 6 TIMES
01ED  5258  364 VBLNK:   JMS  CPBTP+10      ;BLANK TOTAL PRICE
01EF  400D  365 IDLLK:   JUN  IDLE
01F1  EC    366 CKRCK:   RD0                ;RD RECOMPUTE FLG
01F2  14EF  367          JZ   IDLLK         ;JMP IF CLR
01F4  53F7  368          JMS  KSCAN
01F6  2B    369          SRC  10
01F7  E4    370          WR0                ;CLR RECOMPUTE
01F8  2D    371          SRC  12
01F9  EE    372          RD2                ;RD OUT WT SGN
01FA  1CED  373          JNZ  VBLNK         ;JMP IF MINUS
```

| | | | | | |
|---|---|---|---|---|---|
| 01FC | 29 | 374 | | SRC | 8 |
| 01FD | ED | 375 | | RD1 | |
| 01FE | F6 | 376 | | RAR | ;PUT AZ INH IN C |
| 01FF | 124A | 377 | | JC | VBLLK ;JMP IF SET |
| 0201 | 2F | 378 | | SRC | 14 |
| 0202 | EF | 379 | | RD3 | |
| 0203 | F5 | 380 | | RAL | ;PUT TARE DONE IN C |
| 0204 | 1B4A | 381 | | JCN | 11D,VBLLK ;JMP CZ*TN,T NOT DONE BUT REQ |
| 0206 | 5370 | 382 | CAPCK: | JMS | FINDF |
| 0208 | A7 | 383 | | LD | 7 ;R7=5 IF 15LB |
| 0209 | 1C0C | 384 | | JNZ | $+3 ;JMP IF 15LB |
| 020B | 6F | 385 | | INC | 15 |
| 020C | 6F | 386 | | INC | 15 ;R15=1-15LB, 2-6LB/7KG&3KG |
| 020D | 52FF | 387 | CMPUT: | JMS | ARICL |
| 020F | 2438 | 388 | | FIM | 4,111000B |
| 0211 | 2B | 389 | | SRC | 10 |
| 0212 | EE | 390 | | RD2 | ;RD PER 1/2,PER 1/4 |
| 0213 | F6 | 391 | | RAR | |
| 0214 | 1434 | 392 | | JZ | PRXWT ;SKIP PRICE X 2 OR 4 IF CLR |
| 0216 | F5 | 393 | | RAL | |
| 0217 | 23 | 394 | | SRC | 2 |
| 0218 | E0 | 395 | | WRM | ;ENTER TO ARI |
| 0219 | 530B | 396 | | JMS | MULT ;FACTOR X PRICE |
| 021B | 242B | 397 | | FIM | 4,101011B |
| 021D | 29 | 398 | | SRC | 8 |
| 021E | EC | 399 | | RD0 | |
| 021F | F6 | 400 | | RAR | ;PUT MAND PRICE/UNIT ENB IN C |
| 0220 | F7 | 401 | | TCC | ;XFER TO ACC |
| 0221 | 1427 | 402 | | JZ | PRCMP ;JMP IF NOT ENABLED |
| 0223 | 2B | 403 | | SRC | 10 |
| 0224 | E6 | 404 | | WR2 | ;CLR PER 1/2,1/4,SET FCTR DONE |
| 0225 | 2438 | 405 | | FIM | 4,111000B |
| 0227 | 5391 | 406 | PRCMP: | JMS | MOV4 ;MOV NEW PR TO ARI OR PR |
| 0229 | DC | 407 | | LDM | 12D |
| 022A | 85 | 408 | | ADD | 5 |
| 022B | B5 | 409 | | XCH | 5 ;RESTORE P2 POINTER |
| 022C | 23 | 410 | | SRC | 2 |
| 022D | E9 | 411 | | RDM | ;RD PXX.XX |
| 022E | 1434 | 412 | | JZ | PRXWT ;JMP IF 0 |
| 0230 | 524E | 413 | | JMS | CPBTP ;OVERPRICE, CLR PRICE |
| 0232 | 4014 | 414 | | JUN | CKT1 |
| 0234 | 2234 | 415 | PRXWT: | FIM | 2,110100B |
| 0236 | 530B | 416 | | JMS | MULT ;PRICE X WT |
| 0238 | AF | 417 | | LD | 15 |
| 0239 | B3 | 418 | | XCH | 3 |
| 023A | 525D | 419 | | JMS | RNDOF ;RND OFF FINAL VALUE |
| 023C | AF | 420 | | LD | 15 |
| 023D | F2 | 421 | | IAC | |
| 023E | B3 | 422 | | XCH | 3 |
| 023F | 243C | 423 | | FIM | 4,111100B |
| 0241 | 5391 | 424 | | JMS | MOV4 ;MOVE RES TO TOTAL PRICE |
| 0243 | 63 | 425 | | INC | 3 |
| 0244 | 240E | 426 | | FIM | 4,14D |
| 0246 | 52A8 | 427 | | JMS | MGCHK ;CHK NEXT 2 TOT PRICE DIGS |
| 0248 | 144C | 428 | | JZ | $+4 ;JMP NOT OVERVALUE |
| 024A | 41ED | 429 | VBLLK: | JUN | VBLNK ;OVERVALUE IF NOT BOTH 0 |
| 024C | 4014 | 430 | | JUN | CKT1 |
| | | 431 | | ; | |
| | | 432 | | ;SUBROUTINE TO CLR PRICE, BLANK TOTAL PRICE | |
| 024E | 2238 | 433 | CPBTP: | FIM | 2,38H |
| 0250 | 5301 | 434 | | JMS | CLRSB ;CLR PRICE |
| 0252 | E6 | 435 | | WR2 | ;CLR PER 1/2,1/4 |
| 0253 | E7 | 436 | | WR3 | ;CLR 2 DIG PRICE FLG |
| 0254 | 2223 | 437 | | FIM | 2,23H |
| 0256 | 23 | 438 | | SRC | 2 |
| 0257 | E0 | 439 | | WRM | ;CLR DIG TIMER |
| 0258 | 223C | 440 | | FIM | 2,3CH |
| 025A | DF | 441 | | LDM | 15 |
| 025B | 4304 | 442 | | JUN | CLRSB+3 ;BLANK TOTAL PRICE |
| | | 443 | | ;SUBROUTINE TO DO 0-5 ROUND OFF OF NUMBER FIELD. | |
| | | 444 | | ;ROFF1 WILL INC ANY NUMBER FIELD IF CARRY SET | |
| | | 445 | | ;ROFF1+1 WILL ADD CALLER ACC TO ANY NUMBER FIELD | |
| | | 446 | | ;AND PERFORM NECESSARY CARRY | |
| 025D | 23 | 447 | RNDOF: | SRC | 2 |
| 025E | F1 | 448 | | CLC | |
| 025F | DB | 449 | | LDM | 11D |

```
0260  EB      450         ADM                  ;C WILL SET IF LSD GE 5
0261  63      451         INC   3
0262  F7      452 ROFF1:  TCC
0263  23      453         SRC   2
0264  EB      454         ADM                  ;ADD NEXT DIG
0265  FB      455         DAA
0266  E0      456 ROFF2:  WRM
0267  1261    457         JC    ROFF1-1
0269  C0      458 RETRN:  BBL   0D
                459                            ;SUBROUTINE TO MOVE FINAL RAW WGT TO OUTPUT WGT
026A  2201    460 WTOUT:  FIM   2,1D
026C  2434    461         FIM   4,110100B
026E  5391    462         JMS   MOV4           ;MOV 4 MSD OR LSD DIG TO OUT
0270  2D      463         SRC   12
0271  A1      464         LD    1              ;LD MOV 0 CNTR
0272  1475    465         JZ    $+3            ;JMP IF WT IS 0
0274  ED      466         RD1                  ;RD RAW WT SGN
0275  E6      467         WR2                  ;UPDATE OUT WT SGN
0276  F6      468         RAR                  ;PUT SGN IN C
0277  DF      469         LDM   15D
0278  1A7B    470         JNC   $+3            ;JMP IF SGN +
                471                            ;SUBROUTINE TO SET WGT DISPLAY MINUS SIGN
027A  DB      472 STMIN:  LDM   11D
027B  2232    473         FIM   2,110010B
                474                            ;SUBROUTINE TO WRITE ONE DIG(CALLER ACC) MEM AT P1
027D  23      475 LDMEM:  SRC   2
027E  E0      476         WRM
027F  63      477         INC   3
0280  CF      478         BBL   15D
                479                            ;ADD AND STORE SUBROUTINE USED IN SUBTR
0281  63      480 STRSB:  INC   3
0282  25      481         SRC   4
0283  65      482         INC   5
0284  EB      483         ADM                  ;ADD DIGIT
0285  FB      484         DAA                  ;DECIMAL ADJUST
0286  27      485         SRC   6
0287  67      486         INC   7
0288  E0      487         WRM                  ;STORE RESULT
0289  C0      488         BBL   0D
                489                            ;4 MILLI-SECOND DELAY SUBROUTINE
028A  2660    490 DLAY4:  FIM   6,11000000B    ;4 MS DELAY
028C  778C    491         ISZ   7,DLAY4+2
028E  768C    492         ISZ   6,DLAY4+2
0290  C0      493         BBL   0D
                494                            ;SUBROUTINE TO CK THAT RAW WGT OR AUTO ZERO+1
                495                            ;RESULT '240 INCS AND UPDATE AUTO ZERO IF IT IS
0291  242D    496 MAXAZ:  FIM   4,101101B
0293  52A8    497         JMS   MGCHK          ;CHK <= 002XX
0295  1A69    498         JNC   RETRN          ;JMP IF >
0297  A4      499         LD    4
0298  1CA0    500         JNZ   LTMAX          ;JMP IF < 002XX
029A  243F    501         FIM   4,111111B
029C  52AB    502         JMS   GCHK           ;CHK <= 0023X
029E  1A69    503         JNC   RETRN          ;JMP IF >
02A0  D0      504 LTMAX:  LDM   0D
02A1  B3      505         XCH   3              ;PT TO SOURCE LSD
02A2  240B    506         FIM   4,11D
02A4  4343    507         JUN   MOV5           ;UPDATE AZ
                508                            ;SUBROUTINE TO DO MAGNITUDE CK ON RAW WGT
02A6  2204    509 WMGCK:  FIM   2,4D
                510                            ;SUBROUTINE TO CK MAGNITUDE OF NMBR FIELD AGAINST
                511                            ;DIGIT IN R4 AT DIGIT COUNT IN R5(2'S COMPLEMENT)
02A8  23      512 MGCHK:  SRC   2
02A9  A3      513         LD    3
02AA  F8      514         DAC
02AB  B3      515         XCH   3              ;DEC PNTR
02AC  FA      516         STC
02AD  E9      517         RDM                  ;RD DIG
02AE  1CB3    518         JNZ   NOTEQ          ;JMP IF NOT 0
02B0  75A8    519         ISZ   5,MGCHK
02B2  C0      520         BBL   0D             ;ALL 0,CN, AZ
02B3  75B8    521 NOTEQ:  ISZ   5,MCRET        ;JMP IF TOO EARLY
02B5  94      522         SUB   4              ;SUB R4 FROM MEM DIG
02B6  B4      523         XCH   4              ;SAVE RES IN R4
02B7  64      524         INC   4              ;INC TO SHOW 0 IF EQ
02B8  F3      525 MCRET:  CMC
```

```
02B9  C1    526        BBL   1D         ;AN: CN IF X<=R4,CZ IF >R4
            527        ;SUBROUTINE TO ENTER RAW WGT SIGN TO SIGN STAT,
            528        ;SET UP RAW WGT POINTER AND SUBTRACT
02BA  2D    529 EWSGN: SRC   12
02BB  ED    530        RD1              ;RD RAW WT SGN
02BC  F6    531        RAR              ;PUT IN C
02BD  EC    532        RD0              ;RD SUBTR SGN STAT
02BE  F5    533        RAL              ;ENTER RAW WT SGN
02BF  E4    534        WR0
02C0  2400  535        FIM   4,0D
            536        ;SUBROUTINE TO SUB NUM AT P1 FROM NUM AT P2
            537        ;AND PLACE RESULT IN MULT/SUBTR RESULT
02C2  2ABB  538 SUBTR: FIM   10,10111011B
02C4  2610  539        FIM   6,10000B   ;DEST POINTER
02C6  2D    540        SRC   12
02C7  EC    541        RD0              ;READ SIGNS
02C8  F6    542        RAR              ;PUT MINUEND SIGN IN C
02C9  12EB  543        JC    MINMI      ;IF C SET MINUEND MINUS
02CB  F6    544        RAR              ;C=0, PUT SUBTRAHEND IN C
02CC  12EE  545        JC    ADD        ;IF MINUS WANT TO ADD
02CE  FA    546 SUB:   STC              ;SET C TO START SUB
02CF  F9    547 SUB1:  TCS              ;IF C=0 A=1001,C=1 A=1010
02D0  23    548        SRC   2
02D1  E8    549        SBM              ;SUB SUBTRHND
02D2  F1    550        CLC
02D3  5281  551        JMS   STRSB      ;ADD MINUEND AND STORE
02D5  7BCF  552        ISZ   11,SUB1    ;LOOP 5 TIMES
02D7  12F5  553        JC    SDONE      ;IF NO BORROW THEN DONE
02D9  F0    554        CLB
02DA  B7    555        XCH   7          ;RESET P3
02DB  FA    556        STC
02DC  F9    557 SUB2:  TCS
02DD  27    558        SRC   6
02DE  E8    559        SBM              ;DO 10 OR 9 COM
02DF  F1    560        CLC
02E0  FB    561        DAA
02E1  E0    562        WRM
02E2  67    563        INC   7
02E3  7ADC  564        ISZ   10,SUB2
02E5  2D    565        SRC   12
02E6  EC    566        RD0
02E7  F4    567        CMA              ;COM SGN
02E8  E4    568        WR0
02E9  42F5  569        JUN   SDONE
02EB  F6    570 MINMI: RAR              ;PUT SUBTRAHEND SIGN IN C
02EC  12CE  571        JC    SUB        ;IF C=1 WANT TO SUB
02EE  F1    572 ADD:   CLC
02EF  23    573        SRC   2
02F0  E9    574        RDM              ;LOAD FIRST NUM
02F1  5281  575        JMS   STRSB      ;ADD SECOND AND STORE
02F3  7BEF  576        ISZ   11,ADD+1   ;LOOP 5 TIMES
02F5  2A30  577 SDONE: FIM   10,110000B
02F7  2210  578        FIM   2,10000B
02F9  2D    579        SRC   12
02FA  EC    580        RD0              ;RD SIGN
02FB  F6    581        RAR              ;PUT SIGN IN C
02FC  12B8  582        JC    MCRET      ;JMP IF NEGATIVE
02FE  C0    583        BBL   0D
            584        ;SUBROUTINE TO CLR ARI AND SUBTR SIGN STATUS
02FF  222A  585 ARICL: FIM   2,101010B
            586        ;SUBROUTINE TO CLR MEM REG FROM P1 TO END
0301  F0    587 CLRSB: CLB
0302  2D    588        SRC   12
0303  E4    589        WR0              ;CLR SIGN STATUS
0304  23    590        SRC   2
0305  E0    591        WRM              ;CLR RAM WRD
0306  7304  592        ISZ   3,CLRSB+3
0308  222B  593        FIM   2,101011B
030A  C0    594 RETN:  BBL   0D
            595        ;SUBROUTINE TO MULTIPLY NUM AT P1 TIMES NUM AT P2
            596        ;AND PLACE RESULT IN MULT/SUBTR RESULT
030B  208C  597 MULT:  FIM   0,10001100B;LD 8CNTR & 4 CNTR
030D  2610  598        FIM   6,10000B   ;SET DEST POINTER
030F  F0    599        CLB
0310  27    600 MULT1: SRC   6
0311  E0    601        WRM
```

```
0312  67       602            INC   7
0313  7010     603            ISZ   0,MULT1       ;CLR MULT RES AREA
0315  B9       604            XCH   9             ;INITIALIZE SHIFT CNTR
0316  23       605  MULT2:    SRC   2             ;SEL MULTPLR DIG
0317  E9       606            RDM
0318  1438     607            JZ    MULT6         ;JMP IF DIG IS 0
031A  F4       608            CMA
031B  F2       609            IAC
031C  B8       610            XCH   8             ;R8 IS DIG ADD CTR
031D  A9       611            LD    9
031E  B7       612            XCH   7
031F  AA       613  MULT3:    LD    10            ;SET MULTI CTR=4
0320  F4       614            CMA
0321  B0       615            XCH   0             ;PUT IN R0
0322  25       616  MULT4:    SRC   4             ;SET MULTPLCND DIG
0323  E9       617            RDM
0324  27       618            SRC   6             ;DEST
0325  EB       619            ADM                 ;ADD TO PARTIAL RES
0326  FB       620            DAA
0327  E0       621            WRM                 ;UPDATE PARTIAL RES
0328  65       622            INC   5
0329  67       623            INC   7
032A  7022     624            ISZ   0,MULT4       ;LOOP4
032C  F7       625  MULT5:    TCC
032D  27       626            SRC   6
032E  EB       627            ADM                 ;ADD POSSIBLE CARRY
032F  FB       628            DAA
0330  E0       629            WRM
0331  AA       630            LD    10
0332  F4       631            CMA
0333  85       632            ADD   5
0334  B5       633            XCH   5             ;RESTOR MPLCND PTR
0335  F1       634            CLC
0336  781D     635            ISZ   8,MULT3-2     ;LOOP TILL ADDS DONE
0338  69       636  MULT6:    INC   9             ;INC SHIFT CNTR
0339  63       637            INC   3             ;INC MULT PNTR
033A  7116     638            ISZ   1,MULT2       ;LOOP TILL DONE
033C  2819     639            FIM   8,11001B      ;RESTORE PTR
033E  42F5     640            JUN   SDONE
               641            ;SUBROUTINE TO UPDATE RAW WGT SGN AND RAW WGT REG
0340  E5       642  SWSGN:    WR1                 ;UPDATE RAW WT SGN
0341  2400     643            FIM   4,0D
               644            ;SUBROUTINE TO MOVE 5 DIGS FROM P1 to P2
0343  20B0     645  MOV5:     FIM   0,0B0H        ;5 CNTR, 0'S CNTR
0345  23       646            SRC   2
0346  E9       647            RDM                 ;READ CHAR
0347  25       648            SRC   4
0348  E0       649            WRM                 ;WRITE TO DEST
0349  144C     650            JZ    $+3           ;JMP IF DIG 0
034B  61       651            INC   1             ;NOTE NON-0 DIG
034C  63       652            INC   3
034D  65       653            INC   5
034E  7045     654            ISZ   0,MOV5+2
0350  C0       655            BBL   0D
               656            ;SUBROUTINE TO READ A/D CONVERTER T1 SIGNAL
0351  D3       657  RDT1:     LDM   3D
0352  5361     658            JMS   RDINP+1
0354  A2       659            LD    2
0355  E6       660            WR2                 ;WRITE SW6,SW7,T1,SW9
0356  F6       661            RAR
0357  F6       662            RAR                 ;PUT T1 IN C
0358  C0       663            BBL   0D
               664            ;SUBROUTINE TO CLR TARE, MANUAL TARE FLG,
               665            ;TARE DONE FLG, NET LITE FLG
0359  2225     666  CLRT:     FIM   2,100101B
035B  5301     667            JMS   CLRSB         ;CLR TARE
035D  E6       668            WR2                 ;CLR MAN TARE FLG
035E  E7       669            WR3                 ;CLR TARE DONE
035F  C0       670            BBL   0D
               671            ;SUBROUTINE TO READ MULTIPLEXER INPUT
0360  A0       672  RDINP:    LD    0
0361  2D       673            SRC   12
0362  E1       674            WMP
0363  EA       675            RDR                 ;RD ROM DATA
0364  29       676            SRC   8
```

```
0365  B2    677            XCH   2              ;STORE DATA IN R2
0366  F1    678            CLC
0367  C0    679            BBL   0D
0368  15    680  FTABL:    DB    15H            ;15LB X .01,R6=1,R7=5
0369  11    681            DB    11H            ;FCTR=10,R0=1,R1=1
036A  70    682            DB    70H            ;7KG X .005,R6=7,R7=0
036B  52    683            DB    52H            ;FCTR=50,R0=5,R1=2
036C  60    684            DB    60H            ;6LB X .005,R6=6,R7=0
036D  53    685            DB    53H            ;FCTR=50,R0=5,R1=3
036E  30    686            DB    30H            ;3KG X .002,R6=3,R7=0
036F  20    687            DB    20H            ;FCTR=20,R0=2,R1=0
      688  ;SUBROUTINE TO DETERMINE FROM SWS 6 & 7 THE SCALE
      689  ;CAPACITY AND LOAD VALUES TO ARI FOR: CONVERSION
      690  ;OF COUNTS TO PROPER WGT, OVERCAP CK, 10 GRAD WGT
      691  ;AND SEVERAL CAPACITY CKS--USES FACTOR TABLE FTABL
0370  52FF  692  FINDF:    JMS   ARICL
0372  2068  693            FIM   0,FTABL-(256*(FTABL/256))
0374  29    694            SRC   8
0375  EE    695            RD2
0376  F6    696            RAR
0377  F6    697            RAR
0378  F1    698            CLC
0379  F5    699            RAL                  ;HAVE 0-CAP1-CAP2-0
037A  F1    700            CLC
037B  81    701            ADD   1              ;ADD SW CNT TO PNTR
037C  B1    702            XCH   1
037D  36    703            FIN   6              ;R6=WXXXX, R7=XWXXX
037E  61    704            INC   1
037F  30    705            FIN   0              ;R0=XXXWX, R1=XXXXW
0380  63    706            INC   3              ;LD DATA TO ARI
0381  A0    707            LD    0
0382  527D  708            JMS   LDMEM
0384  63    709            INC   3
0385  A7    710            LD    7
0386  527D  711            JMS   LDMEM
0388  A6    712            LD    6
0389  23    713            SRC   2
038A  E0    714            WRM
038B  222B  715            FIM   2,101011B
038D  2400  716            FIM   4,0D
038F  F1    717            CLC
0390  CD    718            BBL   13D
      719  ;SUBROUTINE TO MOVE 4 DIGS FROM P1 TO P2
0391  20C0  720  MOV4:     FIM   0,11000000B
0393  4345  721            JUN   MOV5+2
      722  ;DISPLAY SUBROUTINE
0395  B0    723  DSPLY:    XCH   0              ;SAVE KSCAN ACC
0396  2432  724            FIM   4,110010B
0398  260B  725            FIM   6,11D
039A  25    726            SRC   4
039B  DF    727            LDM   15D            ;RD MI SGN,11 IF ON, 15 IF OFF
039C  E8    728            SBM
039D  1CA3  729            JNZ   $+6            ;JMP IF ON
039F  2434  730            FIM   4,110100B
03A1  2600  731            FIM   6,0D
03A3  2D    732            SRC   12
03A4  DB    733            LDM   11D
03A5  E8    734            SBM                  ;SUB KEY ID,SEE IF VFY
03A6  1CB1  735            JNZ   DNORM          ;NORMAL DISPLAY IF NOT
03A8  DF    736            LDM   15D            ;MAKE END OF DSPLY
03A9  B0    737            XCH   0              ;THINK FIRST HIT
03AA  2F    738            SRC   14
03AB  ED    739            RD1                  ;RD TST FLG
03AC  F4    740            CMA                  ;BLNKS=0,8S=15
03AD  B1    741            XCH   1              ;WRITE TO LB,ZERO,1/2,1/4
03AE  A1    742            LD    1
03AF  43C3  743            JUN   DVFY           ;WRITE TO LITE OUTPUT
03B1  2B    744  DNORM:    SRC   10
03B2  ED    745            RD1                  ;RD Z LITE FLG
03B3  F5    746            RAL                  ;FLG=14,15:OFF,0:ON
03B4  D4    747            LDM   4D
03B5  1AB8  748            JNC   $+3            ;CZ:ZLITE ON
03B7  F0    749            CLB
03B8  B1    750            XCH   1              ;R1=ZLITE
03B9  E9    751            RDM                  ;RD MOTN FLG
03BA  F5    752            RAL                  ;FLG=14,15:MOTN,0:NMOTN
```

| | | | | | |
|---|---|---|---|---|---|
| 03BB | F3 | 753 | | CMC | |
| 03BC | EE | 754 | | RD2 | ;RD 1/4,1/2 |
| 03BD | F6 | 755 | | RAR | ;NMOTN LITE, 1/4, 1/2 DONE |
| 03BE | F1 | 756 | | CLC | |
| 03BF | 81 | 757 | | ADD 1 | ;ADD ZLITE |
| 03C0 | B1 | 758 | | XCH 1 | |
| 03C1 | 2F | 759 | | SRC 14 | |
| 03C2 | EF | 760 | | RD3 | ;RD TARE DONE FLG |
| 03C3 | F6 | 761 | DVFY: | RAR | ;PUT IN C |
| 03C4 | F3 | 762 | | CMC | |
| 03C5 | D3 | 763 | | LDM 3D | |
| 03C6 | F6 | 764 | | RAR | ;HAVE 9 IF NET OFF,1 IF ON, CN |
| 03C7 | B2 | 765 | | XCH 2 | |
| 03C8 | A5 | 766 | | LD 5 | |
| 03C9 | F6 | 767 | | RAR | |
| 03CA | F6 | 768 | | RAR | |
| 03CB | 12CF | 769 | | JC DPSCN | |
| 03CD | 62 | 770 | | INC 2 | |
| 03CE | FA | 771 | | STC | |
| 03CF | DC | 772 | DPSCN: | LDM 12D | |
| 03D0 | 87 | 773 | | ADD 7 | ;ADD 12 ON 1ST PASS, 0 REST(CN) |
| 03D1 | B7 | 774 | | XCH 7 | ;R7=8 FOR MINUS SGN,12 REST |
| 03D2 | DF | 775 | | LDM 15D | |
| 03D3 | 65 | 776 | | INC 5 | |
| 03D4 | 25 | 777 | | SRC 4 | |
| 03D5 | E2 | 778 | | WRR | ;BLANK DIG CATH |
| 03D6 | E9 | 779 | | RDM | |
| 03D7 | 29 | 780 | | SRC 8 | |
| 03D8 | E2 | 781 | | WRR | ;WRITE B BCD DATA |
| 03D9 | A2 | 782 | | LD 2 | |
| 03DA | 2F | 783 | | SRC 14 | |
| 03DB | E2 | 784 | | WRR | ;WRITE ADDR |
| 03DC | A5 | 785 | | LD 5 | |
| 03DD | F8 | 786 | | DAC | |
| 03DE | B5 | 787 | | XCH 5 | |
| 03DF | 25 | 788 | | SRC 4 | |
| 03E0 | E9 | 789 | | RDM | |
| 03E1 | E2 | 790 | | WRR | ;WRITE A BCD DATA UNBLANK |
| 03E2 | 76E2 | 791 | D1: | ISZ 6,D1 | |
| 03E4 | 77E2 | 792 | | ISZ 7,D1 | |
| 03E6 | 62 | 793 | | INC 2 | |
| 03E7 | 65 | 794 | | INC 5 | |
| 03E8 | 75CF | 795 | | ISZ 5,DPSCN | |
| 03EA | DF | 796 | | LDM 15D | |
| 03EB | E2 | 797 | | WRR | ;BLANK DIG CATHODE |
| 03EC | D7 | 798 | | LDM 7D | |
| 03ED | 82 | 799 | | ADD 2 | ;ADD 8 TO R2,CN |
| 03EE | 2F | 800 | | SRC 14 | |
| 03EF | E2 | 801 | | WRR | ;OUT NET LITE |
| 03F0 | 2640 | 802 | | FIM 6,40H | |
| 03F2 | A1 | 803 | | LD 1 | |
| 03F3 | 27 | 804 | | SRC 6 | ;ENB ROM4 |
| 03F4 | E2 | 805 | | WRR | ;WRITE LB,ZERO,1/2,1/4 |
| 03F5 | 700A | 806 | | ISZ 0,RETN | ;IF KSCN ACC=15,WAS 1ST HIT |
| | | 807 | | ;KEYBOARD SCAN SUBROUTINE | |
| 03F7 | F1 | 808 | KSCAN: | CLC | |
| 03F8 | 200C | 809 | | FIM 0,12D | |
| 03FA | 2E20 | 810 | | FIM 14,100000B | |
| 03FC | 2B | 811 | | SRC 10 | |
| 03FD | D0 | 812 | | LDM 0D | |
| 03FE | E2 | 813 | | WRR | ;ENABLE PER 1/4, 1/2 KEYS |
| 03FF | 2D | 814 | | SRC 12 | |
| 0400 | E9 | 815 | | RDM | ;RD KEY ID |
| 0401 | 1C0E | 816 | QSCAN: | JNZ KB0 | ;JMP IF KEY IN PROCESS OR SET |
| 0403 | A0 | 817 | | LD 0 | ;LD MPLXER ADDR |
| 0404 | E1 | 818 | | WMP | |
| 0405 | EA | 819 | | RDR | ;RD KEY INPUTS |
| 0406 | 60 | 820 | | INC 0 | |
| 0407 | 7101 | 821 | | ISZ 1,QSCAN | ;LOOP 4 TIMES |
| 0409 | F5 | 822 | | RAL | |
| 040A | F1 | 823 | | CLC | |
| 040B | F5 | 824 | | RAL | |
| 040C | 143C | 825 | | JZ KB4+3 | ;JMP LAST 2 KEYS CLR |
| 040E | 20FC | 826 | KB0: | FIM 0,11111100B | |
| 0410 | 26F2 | 827 | | FIM 6,11110010B | |
| 0412 | 2F | 828 | | SRC 14 | |

```
0413  F0         829          CLB
0414  E4         830          WRO              ;CLR KEY FLG
0415  F1         831  KB1:    CLC
0416  A6         832          LD    6
0417  F6         833          RAR              ;PUT LSB IN C
0418  1A20       834          JNC   KB2        ;JMP IF EVEN
041A  F6         835          RAR              ;PUT NSB IN C
041B  1A20       836          JNC   KB2        ;JMP IF NOT 3,7,11,15
041D  60         837          INC   0
041E  5360       838          JMS   RDINP      ;RD 4 KEYS
0420  B2         839  KB2:    XCH   2
0421  F6         840          RAR              ;PUT KEY BIT IN C
0422  66         841          INC   6          ;INC KEY CNT
0423  B2         842          XCH   2          ;SAVE REST OF KEY DATA
0424  1A44       843          JNC   KB6        ;JMP KEY NOT PRESSED
0426  2F         844          SRC   14
0427  EC         845          RDO              ;RD KEY FLG
0428  F4         846          CMA              ;COM IT
0429  E4         847          WRO
042A  144B       848          JZ    KB6A       ;JMP IF WAS SET
042C  E9         849          RDM              ;RD KEY HIT
042D  143F       850          JZ    KB5        ;JMP 1ST HIT
042F  F2         851          IAC
0430  1433       852          JZ    $+3        ;JMP IF 15
0432  E0         853          WRM              ;INC KEY HIT UP TO 15
0433  2D         854          SRC   12
0434  F1         855          CLC
0435  E9         856          RDM              ;RD KEY ID
0436  96         857          SUB   6          ;SUB KEY CNT
0437  1444       858          JZ    KB6        ;JMP IF MATCH
0439  F0         859  KB4:    CLB
043A  2D         860          SRC   12
043B  E0         861          WRM              ;CLR KEY ID
043C  2F         862          SRC   14
043D  448F       863          JUN   DSPLK-1    ;CLR KEY HIT
043F  DD         864  KB5:    LDM   13D
0440  E0         865          WRM              ;INIT KEY HIT
0441  2D         866          SRC   12
0442  A6         867          LD    6
0443  E0         868          WRM              ;UPDATE KEY ID
0444  7715       869  KB6:    ISZ   7,KB1
0446  2F         870          SRC   14
0447  F1         871          CLC
0448  EC         872          RDO              ;RD KEY FLG
0449  1C55       873          JNZ   KB6B       ;JMP IF HAD KEY
044B  2D         874  KB6A:   SRC   12
044C  DA         875          LDM   10D
044D  E8         876          SBM              ;SUB KEY ID FROM 10
044E  1C39       877          JNZ   KB4        ;JMP IF LAST WAS NOT VFY
0450  E0         878          WRM              ;CLR KEY ID
0451  524E       879          JMS   CPBTP      ;CLR PR,FCTR,2 DIG PR FLG,BLNK TPR
0453  44FB       880          JUN   KB18       ;SET RECOMPUTE
0455  E9         881  KB6B:   RDM              ;RD KEY HIT
0456  8E         882          ADD   14         ;ADD A 2
0457  2D         883          SRC   12
0458  1C90       884          JNZ   DSPLK      ;JMP NOT 2ND HIT(=14)
045A  F1         885          CLC
045B  E9         886          RDM              ;RD KEY ID
045C  FB         887          DAA              ;V>0,T>1,1/4>2,1/2>3
045D  2423       888          FIM   4,100011B
045F  127B       889          JC    KB8        ;JMP IF >9
0461  B6         890          XCH   6          ;PUT IN R6
0462  25         891          SRC   4
0463  E9         892          RDM              ;RD DIG TIMER
0464  1C68       893          JNZ   KB6C       ;JMP IF RUNNING
0466  524E       894          JMS   CPBTP      ;CLR PR,FCTR,2 DIG PR FLG,BLNK TPR
0468  25         895  KB6C:   SRC   4
0469  D7         896          LDM   7D
046A  E0         897          WRM              ;START DIG TIMER
046B  2237       898          FIM   2,110111B
046D  63         899  KB7:    INC   3
046E  23         900          SRC   2
046F  E9         901          RDM              ;RD OLD PRICE DIG
0470  B6         902          XCH   6          ;OLD TO R6, NEW TO ACC
0471  E0         903          WRM              ;WRITE NEW PRICE DIG
0472  716D       904          ISZ   1,KB7      ;UPDATE 4 PRICE DIGS
```

```
0474  240D   905 KB7A:   FIM   4,13D
0476  52A8   906         JMS   MGCHK      ;PR=00,0X RETNS AZ, OTHERWISE AN
0478  E7     907         WR3              ;2 DIG PR FLG SET IF PR>= 00.10
0479  44F8   908         JUN   KB17
047B  F4     909 KB8:    CMA              ;V=15,T=14
047C  B6     910         XCH   6          ;1/4=13,1/2=12
047D  2B     911         SRC   10
047E  7693   912 VFYCK:  ISZ   6,TARCK    ;JMP NOT VERIFY
0480  2232   913         FIM   2,110010B
0482  2F     914         SRC   14
0483  ED     915         RD1
0484  F4     916         CMA              ;15=BLANKS,0=8S
0485  E5     917         WR1              ;UPDATE TEST FLAG
0486  1C8C   918         JNZ   VFCKA      ;JMP IF WANT BLANKS
0488  527A   919         JMS   STMIN      ;PUT 11 IN MINUS SGN:MINUS ON
048A  63     920         INC   3
048B  D8     921         LDM   8D
048C  5304   922 VFCKA:  JMS   CLRSB+3    ;8S OR BLNKS TO DSPLY
048E  25     923         SRC   4
048F  E0     924         WRM              ;CLR DIG TIMER
0490  F1     925 DSPLK:  CLC
0491  4395   926         JUN   DSPLY
0493  76E5   927 TARCK:  ISZ   6,QTRCK    ;JMP NOT TARE
0495  E9     928         RDM              ;RD MOTN FLG
0496  1CF8   929         JNZ   KB17       ;NO TARE ALLOWED IF MOTN
0498  25     930         SRC   4
0499  E9     931         RDM              ;RD DIG TIMER
049A  14DA   932         JZ    MANTR      ;JMP NOT RUNNING
049C  223B   933         FIM   2,111011B
049E  240C   934         FIM   4,12D
04A0  52A8   935         JMS   MGCHK      ;CK FOR 0 PR, AZ IF 0, AN IF NOT
04A2  29     936         SRC   8
04A3  1CAA   937         JNZ   NOTOT      ;JMP IF NON-ZERO
04A5  EF     938         RD3              ;RD AUTO CLR FLG
04A6  1CF8   939         JNZ   KB17       ;JMP NOT <10 GRADS NET
04A8  4000   940         JUN   RESET      ;CLR SCALE IF OT*WT<10 INCS
04AA  EE     941 NOTOT:  RD2
04AB  F6     942         RAR              ;PUT KBD TARE ENB IN C
04AC  1AE1   943         JNC   KB11D      ;JMP IF DSBLED
04AE  2424   944         FIM   4,24H
04B0  25     945         SRC   4
04B1  E9     946         RDM              ;RD ZERO GRAD FLG
04B2  14F8   947         JZ    KB17       ;JMP NOT ZERO GRAD
04B4  2F     948         SRC   14
04B5  EF     949         RD3
04B6  F6     950         RAR              ;PUT NET LITE FLG IN C
04B7  12E1   951         JC    KB11D      ;NO TARE ALLOWED IF LITE ON
04B9  5370   952         JMS   FINDF      ;DETERMINE SCALE TYPE
04BB  2238   953         FIM   2,111000B
04BD  80     954         ADD   0          ;CN:X5,CZ:X2,X1
04BE  B0     955         XCH   0          ;IF R0 WAS 1, NOW 14
04BF  23     956         SRC   2
04C0  E9     957         RDM              ;RD P/P LSD
04C1  1AC8   958         JNC   KB11B      ;JMP IF X2 OR X1
04C3  14CE   959         JZ    KB11C      ;JMP IF P/P LSD 0
04C5  8D     960         ADD   13         ;CN: ADD 10
04C6  1CF8   961         JNZ   KB17       ;JMP IF NOT 5
04C8  F6     962 KB11B:  RAR
04C9  1ACE   963         JNC   KB11C      ;JMP IF P/P LSD EVEN OR 5
04CB  60     964         INC   0          ;IF R0 WAS 1;NOW 15
04CC  70F8   965         ISZ   0,KB17     ;JMP NOT 15LB
04CE  5359   966 KB11C:  JMS   CLRT       ;CLR TARE
04D0  2238   967         FIM   2,111000B
04D2  2426   968         FIM   4,26H
04D4  5391   969         JMS   MOV4       ;MOVE P/P TO TARE
04D6  D9     970         LDM   9D
04D7  E7     971         WR3              ;SET TARE DONE, NET LIGHT FLGS
04D8  44E1   972         JUN   KB11D
04DA  2F     973 MANTR:  SRC   14
04DB  EF     974         RD3
04DC  F6     975         RAR              ;PUT NET LITE FLG IN C
04DD  12F8   976         JC    KB17       ;NO TARE ALLOWED IF LITE ON
04DF  D4     977         LDM   4D
04E0  E6     978         WR2              ;SET MAN TARE FLG
04E1  524E   979 KB11D:  JMS   CPBTP      ;CLR PR,FCTR,2 DIG PR FLG,BLNK TPR
04E3  29     980         SRC   8
```

```
04E4  E7    981         WR3              ;CLR AUTO CLR FLG
04E5  EE    982  QTRCK: RD2              ;RD PER 1/2,1/4
04E6  F6    983         RAR              ;PUT FCTR DONE FLG IN C
04E7  12F8  984         JC    KB17       ;JMP IF FCTR DONE
04E9  29    985         SRC   8
04EA  EE    986         RD2
04EB  F5    987         RAL
04EC  F5    988         RAL              ;PUT CAPACITY 2 IN C
04ED  2B    989         SRC   10
04EE  76F4  990         ISZ   6,HLFCK    ;JMP NOT PER 1/4
04F0  12F8  991         JC    KB17       ;JMP IF METRIC SCALE
04F2  D4    992         LDM   4D
04F3  E6    993         WR2              ;FCTR=1/4
04F4  76F8  994  HLFCK: ISZ   6,KB17     ;JMP NOT PER 1/2
04F6  D2    995         LDM   2D
04F7  E6    996         WR2              ;FCTR=1/2
04F8  F0    997  KB17:  CLB
04F9  2F    998         SRC   14
04FA  E5    999         WR1              ;CLR TST FLG
04FB  2B    1000 KB18:  SRC   10
04FC  D1    1001        LDM   1D
04FD  E4    1002        WR0              ;SET RECOMPUTE
04FE  4014  1003        JUN   CKT1
            1004        END
```

What we claim is:

1. Digital weight measuring apparatus comprising, in combination, receiving apparatus to receive material to be measured, signal generating means for generating a digital weight signal connected to said receiving apparatus, digital display apparatus, control means connected to said receiving apparatus and to said digital display apparatus, manual switch means connected to said control means, timing means for timing a visually observable interval of time, means responsive to the operation of said manual switch means to initiate the operation of the timing means, said control means including means responsive to the continued operation of said manual switch means for said visually observable interval of time to cause said display apparatus to display zero when no material is applied to said receiving apparatus.

2. Digital weight measuring apparatus in accordance with claim 1 in combination with detecting means for detecting motion of said receiving apparatus, and means for restarting said timing means responsive to the detection of motion of said receiving apparatus during said visually observable time interval.

3. Digital weight measuring apparatus comprising, in combination, receiving apparatus to receive material to be measured, signal generating means for generating a digital weight signal connected to said receiving apparatus, digital display apparatus, control means connected to said signal generating means and to said digital display apparatus, manual switch means connected to said control means, means for detecting no motion of said receiving apparatus, said control means including means jointly responsive to the operation of said manual switch means and to no motion detected by said means for detecting no motion to cause said display apparatus to display zero when no material is applied to said receiving means.

4. Digital weight measuring apparatus comprising, in combination, scale means, generating means connected to said scale means for generating digital signals representing the weight on said scale means, digital weight display means, control means interconnected with said generating means and with said display means, switch means connected to said control means for entering a unit price in said control means, said control means including means jointly responsive to a unit price less than a predetermined value and to a weight greater than a predetermined value to blank said digital weight display means.

5. Digital weight measuring apparatus in accordance with claim 4 in combination with manually controlled null means connected to the control means to null the digital weight measuring apparatus, and means to inhibit the entry of a unit price value in said control means until said manually controlled null means has been operated.

6. Digital weight measuring apparatus comprising, in combination, scale means, generating means connected to said scale means for generating digital signals representing the weight on said scale means, digital display means, program controlled means interconnected with said generating means and with said digital display means, manually controlled nulling means connected to said program control means to cause said digital display means to display zero when no material is applied to said scale means, manual switch means connected to said program control means to enter unit prices in said program control means, said program control means including means to inhibit the entering of unit prices in said program control means, and means responsive to the operation of said manually controlled nulling means to render said means to inhibit the entering of unit prices inactive.

7. Digital weight measuring apparatus in accordance with claim 6 in combination with means responsive to interruption of power to said digital weight measuring apparatus to reactivate said means to inhibit the entering of unit price.

8. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, manually controlled null means connected to said control means to null the digital weight measuring apparatus, and means to inhibit the entering of tare weight in said control means until said manually controlled null means has been operated.

9. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, said control means including means to inhibit the entry of tare weight in said control means when the weight on the scale exceeds a small predetermined weight range.

10. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, a net lamp, means responsive to the entry of a positive finite tare weight by said switch means to light said net lamp and to display net weight by said digital weight display means, and means responsive to a zero tare weight by said switch means to prevent lighting of the net lamp and to display gross weight by said digital weight display means.

11. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, means responsive to the entry of a positive tare weight by said switch means to prevent the entry of a changed positive tare weight by said switch means.

12. Digital weight measuring apparatus comprising, in combination, weight receiving apparatus to receive weight to be measured, signal generating means for generating a digital weight signal connected to said weight receiving apparatus, digital display apparatus, control means interconnected with said signal generating means and with said digital display apparatus, detecting means for detecting no motion of said weight receiving apparatus, digital switches connected to said control means, a tare switch connected to said control means, said control means including means responsive to the operation of said digital switches and the operation of the tare switch and the detecting means of no motion by said detecting means for entering a tare weight in said control means.

13. Digital weight measuring apparatus comprising, in combination, weight receiving apparatus to receive weight to be measured, signal generating means for generating a digital weight signal connected to said weight receiving apparatus, digital display apparatus, control means interconnected with said signal generating means and with said digital display apparatus, digital switches connected to said control means, a tare switch connected to said control means, means responsive to the operation of said digital switches and the operation of said tare switch to enter a tare weight in said control means, means responsive to the operation of said tare switch and a weight on said weight receiving apparatus to enter said weight as a tare weight in said control means, and means responsive to the entry of a positive tare weight in said control means to inhibit the entry of a different positive tare weight in said control means.

14. Digital weight measuring apparatus in accordance with claim 13 in combination with a net weight light, and wherein said control means includes means responsive to entering a positive discrete tare in said control means to light said net light and to display on said digital display apparatus the net weight on said weight receiving apparatus.

15. Digital weight measuring apparatus in accordance with claim 14 wherein said control means includes means responsive to entry of zero tare in said control means for turning off the net light and for displaying on said digital display apparatus the gross weight on said weight receiving apparatus.

16. Digital weight measuring apparatus comprising, in combination, weight receiving apparatus to receive weight to be measured, signal generating means for generating a digital weight signal connected to said weight receiving apparatus, digital display apparatus, control means interconnected with said signal generating means and with said digital display apparatus, digital switches connected to said control means, a tare switch connected to said control means, means responsive to the operation of said digital switches and the operation of said tare switch to enter a tare weight in said control means, means responsive to the value of the least significant tare weight digit other than the values of the least significant weight display digit for preventing the entering the tare weight.

17. Digital weight measuring apparatus comprising, in combination, scale means, generating means connected to said scale means for generating digital signals representing the weight on said scale means, digital display means, program control means interconnected with said generating means and with said digital display means, inhibiting means for inhibiting operation of said display means, manual switch means connected to said control means, timing means for timing a visually observable interval of time, means responsive to the operation of said manual switch means to initiate operation of the timing means, said program control means including means responsive to the continued operation of said manual switch for said visually observable interval of time to make said inhibiting means ineffective.

18. Digital weight measuring apparatus in accordance with claim 17 in combination with means responsive to interruption of power to said digital weight measuring apparatus to reactivate said inhibiting means.

19. Digital weight measuring apparatus comprising, in combination, scale means, generating means connected to said scale means for generating digital signals representing the weight on said scale means, digital display means, program control means interconnected with said generating means and with said digital display means, inhibiting means for inhibiting operation of said display means, manual switch means connected to said control means, means for detecting no motion of said scale means, said program control means including means jointly responsive to the operation of said manual switch means and to no motion detected by said means for detecting no motion to make said inhibiting means ineffective.

20. Digital weight measuring apparatus in accordance with claim 19 in combination with means responsive to interruption of power to said digital weight measuring apparatus to reactivate said inhibiting means.

21. A multiple capacity digital weight measuring apparatus comprising, in combination, weight receiving apparatus to receive weight to be measured, signal generating means for generating a digital weight signal representing the weight on said weight receiving apparatus connected to said weight receiving apparatus, digital display apparatus, control means interconnected with said digital display apparatus and with said signal generating means, said control means including means for multiplying the value represented by said digital weight signal representing the weight on said receiving apparatus by a different factor for each different capacity, and means for displaying the product of said multiplication on said digital display apparatus.

22. A multiple capacity digital weight measuring apparatus comprising, in combination, weight receiving apparatus to receive weight to be measured, signal generating means for generating a digital weight signal representing the weight on said weight receiving apparatus connected to said weight receiving apparatus, digital display apparatus, control means interconnected with said digital display apparatus and with said signal generating means, said control means including a table of factors for the respective different capacities, means for obtaining the respective factor from said table for a given capacity, multiplying means for multiplying the value represented by said digital weight signal by said respective factor and means for displaying the result of said multiplication on said digital display apparatus.

23. A multiple capacity digital weight measuring apparatus in accordance with claim 22 in combination with means for rounding off the result of said multiplication to the nearest display increment of the given capacity.

24. Digital weight measuring apparatus comprising, in combination, scale means, generating means connected to said scale means for generating digital signals representing the weight on said scale means, digital display means, programmed control means interconnected with said generating means and with said digital display means, said programmed control means including means for multiplying the value represented by said digital weight signal representing the weight on said scale means by a factor to change the value of the weight increments to be displayed, and means for displaying the product of said multiplication on said digital display apparatus.

25. Digital weight measuring apparatus comprising, in combination, receiving apparatus to receive material to be measured, signal generating means for generating a digital weight signal connected to said receiving apparatus, digital display apparatus, microcomputer control means connected to said signal generating means and to said digital display apparatus, manual switch means connected to said microcomputer control means, said microcomputer including means for detecting no motion of said receiving apparatus, and including additional means jointly responsive to the operation of said manual switch means and to no motion detected by said means for detecting no motion to cause said display apparatus to display zero.

26. Digital weight measuring apparatus in accordance with claim 25 wherein the microcomputer control means includes timing means for timing the operation of the manual switch means for a visually observable interval of time, and including means for preventing response of the additional means until said manual switch means has been continuously operated for the visually observable interval of time.

27. Digital weight measuring apparatus comprising, in combination, scale means, generating means connected to said scale means for generating digital signals representing the weight on said scale means, digital display means, program control means interconnected with said generating means and with said digital display means, manually controlled nulling means connected to said program control means, said program control means including means responsive to said manually controlled nulling means to cause said digital display means to display zero, manual switch means connected to said program control means to enter unit price in said program control means, said program control means including means to inhibit the entering of unit prices in said program control means, and including means responsive to the operation of said manually controlled nulling means to render said means to inhibit the entering of unit prices inactive.

28. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, a net lamp, said control means including means responsive to the entry of a positive finite tare weight by said switch means to light said net lamp and to display net weight by said digital weight display means, and also including means responsive to a zero tare weight by said switch means to prevent lighting of the net lamp and to display gross weight by said digital weight display means.

29. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, said control means including means responsive to the entry of a positive tare weight by said switch means to prevent the entry of a change positive tare weight by said switch means.

30. Digital weight measuring apparatus comprising, in combination, scale means, generating means connected to said scale means for generating digital signals representing the weight on said scale means, digital weight display means, control means interconnected with said generating means and with said display means, switch means connected to said control means for entering tare weight in said control means, manually controlled null means connected to said control means to null the digital weight measuring apparatus, said control means including means to inhibit the entering of tare weight in said control means until said manually controlled null means has been operated.

* * * * *